United States Patent
Grosse-Vehne et al.

(10) Patent No.: US 10,730,355 B2
(45) Date of Patent: Aug. 4, 2020

(54) PRESSURIZED-MEDIUM SUPPLY DEVICE, WHEEL UNIT HAVING A PRESSURIZED-MEDIUM SUPPLY DEVICE, AND DISTRIBUTED SYSTEM FOR SUPPLYING PRESSURIZED MEDIUM

(71) Applicant: ILLINOIS TOOL WORKS INC., Glenview, IL (US)

(72) Inventors: Klemens Grosse-Vehne, Heimsheim (DE); Konstantin Tsiberidis, Heilbronn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 392 days.

(21) Appl. No.: 15/125,507

(22) PCT Filed: Mar. 11, 2015

(86) PCT No.: PCT/EP2015/055102
§ 371 (c)(1),
(2) Date: Sep. 12, 2016

(87) PCT Pub. No.: WO2015/136006
PCT Pub. Date: Sep. 17, 2015

(65) Prior Publication Data
US 2018/0186197 A1    Jul. 5, 2018

(30) Foreign Application Priority Data

Mar. 11, 2014  (DE) .................. 10 2014 103 217
Nov. 27, 2014  (DE) .................. 10 2014 117 459

(51) Int. Cl.
*B60C 23/00* (2006.01)
*B60C 23/10* (2006.01)
*B29C 73/06* (2006.01)

(52) U.S. Cl.
CPC .......... *B60C 23/004* (2013.01); *B29C 73/066* (2013.01); *B60C 23/003* (2013.01); *B60C 23/10* (2013.01)

(58) Field of Classification Search
CPC ....... B60C 23/004; B60C 23/10; B60C 23/14; B60C 23/16
See application file for complete search history.

(56) References Cited

U.S. PATENT DOCUMENTS 5,178,701 A * 1/1993 Taylor ..................... B29C 73/22
                                                  152/418
5,325,902 A * 7/1994 Loewe ................... B60C 23/004
                                                  152/418

(Continued)

FOREIGN PATENT DOCUMENTS

CN              2596067 Y    12/2003
DE    10 2008 062 071 A1     6/2010
FR         2 897 015 A1       8/2007

*Primary Examiner* — Jason R Bellinger
(74) *Attorney, Agent, or Firm* — Pauley Erickson & Kottis

(57) ABSTRACT

A distributed system (54) for supplying pressurized medium, in particular compressed air, in a vehicle (10), a wheel unit (14) for a vehicle (10), and a decentralized integrated pressurized medium supply device (70) for a wheel unit (14) with a rotatably supported vehicle tire (16). The pressurized medium supply device (70) has a decentralized compressor unit (74) and has a pressurized medium path (98) that extends between the decentralized compressor unit (74) and a rim body (92) of the vehicle tire (16), which rim body is associated with a wheel body side (80) of the wheel unit (14). The decentralized compressor unit (74) has an energy supply connection, which can be connected to an energy supply unit (104) via an energy supply path (106). The pressurized medium supply device (70) is associated with a support side (82) and the wheel body side (80) of the wheel (Continued)

unit (14). The pressurized medium path (98) or energy supply path (106) includes a rotary/stationary transition (116, 158) between the support side (82) and the wheel body side (80).

38 Claims, 48 Drawing Sheets

(56) References Cited

U.S. PATENT DOCUMENTS

| | | | | |
|---|---|---|---|---|
| 7,237,590 | B2* | 7/2007 | Loewe | B60C 23/004 |
| | | | | 152/418 |
| 9,789,739 | B1* | 10/2017 | Hennig | B60C 23/003 |
| 2007/0182241 | A1 | 8/2007 | Dombroski et al. | |
| 2007/0240803 | A1* | 10/2007 | Marin-Martinod | |
| | | | | B60C 23/004 |
| | | | | 152/418 |
| 2012/0234447 | A1* | 9/2012 | Narloch | B60C 23/004 |
| | | | | 152/418 |
| 2016/0121667 | A1* | 5/2016 | Benedict | B60C 23/004 |
| | | | | 152/419 |

\* cited by examiner

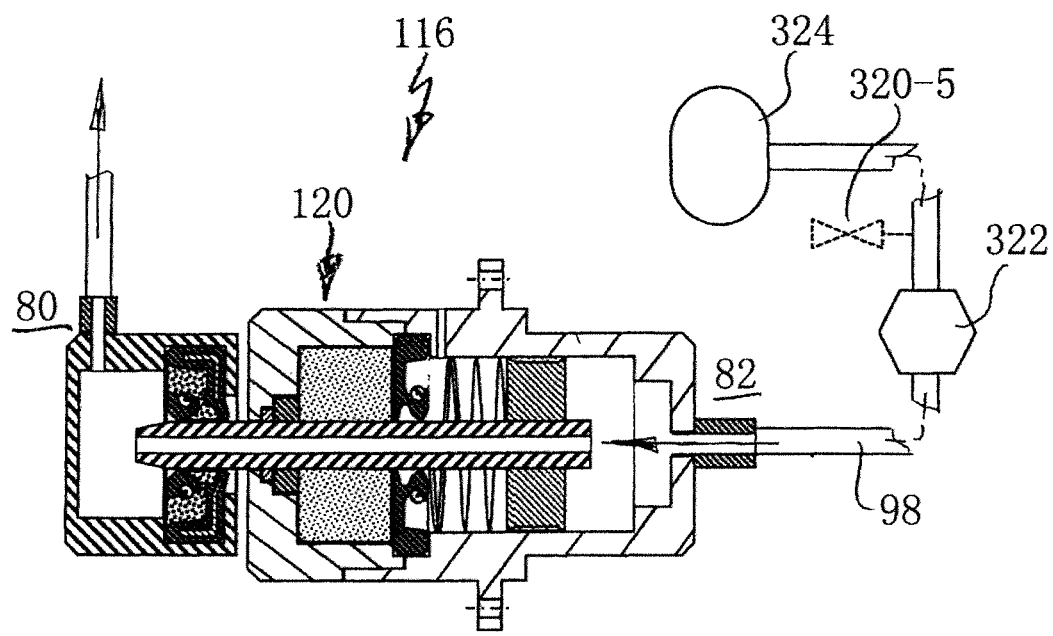
FIG. 34E
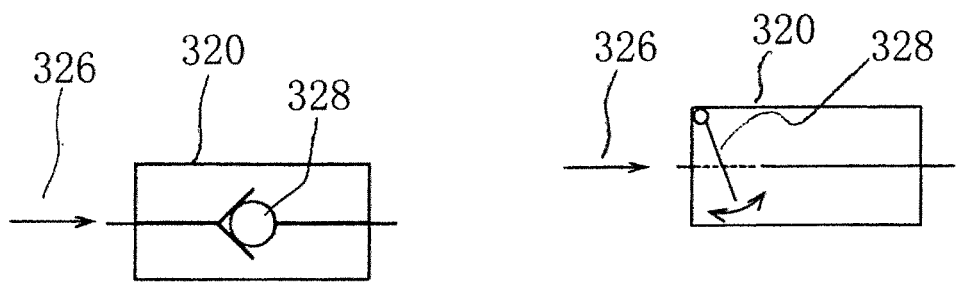
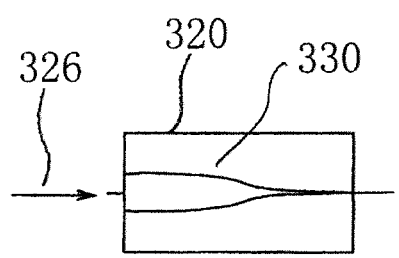
FIG. 35A
FIG. 35B
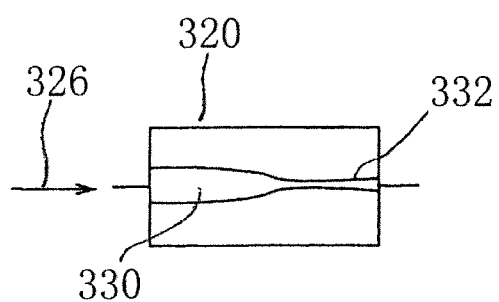
FIG. 35C
FIG. 35D

PRESSURIZED-MEDIUM SUPPLY DEVICE, WHEEL UNIT HAVING A PRESSURIZED-MEDIUM SUPPLY DEVICE, AND DISTRIBUTED SYSTEM FOR SUPPLYING PRESSURIZED MEDIUM

BACKGROUND OF THE INVENTION

Field of the Invention

The invention relates to a decentralized integrated pressurized medium supply device, in particular for supplying compressed air, for a wheel unit having a rotatably supported vehicle tire. The invention also relates to a wheel unit with an integrated pressurized medium supply device and a distributed system for supplying pressurized medium, which has a plurality of wheel units with integrated pressurized medium supply devices.

Discussion of Related Art

Vehicle tires are usually inflated with compressed air. It is also conceivable for them to be inflated with other pressurized mediums, for example nitrogen. For the purposes of the present disclosure, vehicle tires can, for example, be tubed tires or tubeless tires. Vehicle tires are used, for example, in passenger vehicles, busses, commercial vehicles, but also for example in aircraft.

Conventional vehicle tires are usually supplied via external connections with a pressurized medium, for example compressed air or a nitrogen filling. Usually, standardized valves are used for this. Vehicle tires customarily have an optimal operating pressure or inflation pressure, which depends on the respective use conditions or operating conditions. For land vehicles such as passenger cars, busses, or trucks, for example, there are operating pressures or pressure ranges that can ensure an optimum of rolling resistance, lateral guidance, longitudinal guidance, heat build-up, and/or wear behavior.

An existing actual pressure in a tire can, for example, fluctuate within certain limits along with the ambient temperature or operating temperature. Furthermore, over the long term, a certain amount of pressure loss, for example a so-called gradual pressure loss, is often impossible to avoid completely. There are known systems for vehicles that make it possible to monitor the operating pressure or inflation pressure in tires. These can be so-called active or passive systems. Passive systems can, for example, be embodied to determine rolling circumferences of the tires of an axle and compare them to one another. If this reveals significant differences, then this is an indication that there are pressure differences between the respective tires. Active systems for measuring and/or monitoring compressed air usually include sensors for pressure detection, which are integrated into a wheel unit. Pressure sensors of this kind can, for example, be embodied to transmit corresponding pressure signals wirelessly or by wire from the (rotating) tires to stationary components of the vehicle.

Furthermore, there are generally known systems that make it possible to independently adjust the inflation pressure of vehicle tires. Systems of this kind can be found, for example, in agricultural vehicles, military vehicles, or specialized vehicles of the like. The systems can basically be embodied to permit adjustment of the inflation pressure at rest, i.e. when the vehicle is not moving.

Known systems for independent pressure regulation in vehicles have a central structure. In other words, there is only one device for supplying the pressurized medium for inflating the tires. It is also conceivable to provide a few devices for supplying the pressurized medium, for example in a tractor/trailer combination. A central supply device of this kind for compressed air is nevertheless provided for inflating a plurality of wheel units, particularly on different axles. For this purpose, the central compressed air or pressurized medium supply unit is coupled to a plurality of wheel units. Usually, the supply unit is mounted to the frame, the chassis, or the body of the vehicle. The supply unit can, for example, include a compressor or air compressor. Leading from the supply unit, it is then necessary to route a plurality, or a large number, of compressed air lines or pressurized medium lines to the individual wheel units. In this case, it is usually necessary to provide a plurality of so-called rotary feed-throughs for the pressurized medium lines. This is necessitated by the fact that the tires of the wheel units are usually mounted in rotary fashion on axles of the vehicle.

As a result, central compressed air supplies for vehicle tires have various disadvantages. One basic disadvantage lies in the fact that the pressurized medium lines must bridge very long line distances. This results in a corresponding construction expense, an increased maintenance cost, and an increased risk of leaks. A pressurized medium supply unit of the compressed air supply must also be correspondingly dimensioned and/or regulated in order to ensure the ability to provide the volumetric flow rates and pressures required to inflate the tires. Central compressed air supplies are also relatively susceptible to malfunction, particularly for leaks that are caused by external stresses.

The aspects enumerated above result in an increased production cost. As a result, tire pressure regulating systems in vehicles are frequently accompanied by a high installation expense or retrofitting expense. The prevalence of such systems is thus very limited.

SUMMARY OF THE INVENTION

In light of these circumstances, the object of the invention is to disclose a pressurized medium supply device for a wheel unit, a wheel unit with a pressurized medium supply device, and a system for supplying pressurized medium, which can be implemented at a significantly lower cost. It should be possible to regulate and/or adapt the tire pressure while driving, i.e. when the wheels are rotating. It should also be possible to change a wheel or tire without additional expense. The pressurized medium supply device should be particularly suitable for use as a retrofitting solution. It is likewise preferable if the pressurized medium supply device can also be advantageously used to repair flat tires. In many cases, it should be possible for a repair or temporary repair of the damage to be carried out without installation work.

This object is attained according to the invention by a decentralized integrated pressurized medium supply device, in particular for supplying compressed air, for a wheel unit with a rotatably supported vehicle tire, having a decentralized compressor unit, in particular a compressor unit that can be driven by an electric motor, and having a pressurized medium path that extends between a decentralized compressor unit and a rim body of the vehicle tire, which rim body is associated with a wheel unit that is part of the wheel body; the decentralized compressor unit has an energy supply connection that can be supplied via an energy supply path, which can be coupled to an energy supply unit; the pressurized medium supply device is associated, at least in some sections, with a support side and with the wheel body side of the wheel unit; and at least the pressurized medium path or the energy supply path includes a rotary/stationary transition, in particular a rotary feed-through, between the support side and the wheel body side.

According to the invention, it is specifically possible to provide each wheel unit with a pressurized medium supply device that is a structurally integrated into the wheel unit. Structurally, the pressurized medium supply device can be provided at least partially on the wheel body side of the wheel unit. In addition, the pressurized medium supply device can be at least at least partially provided on the support side of the wheel unit. The wheel body side of the wheel unit is the side that is accommodated in rotary fashion relative to the support side. The support side can thus include an axle body, for example. The wheel body side can include a hub or hub body with a wheel mount, a rim, and a tire. The wheel body side and the support side can be coupled to each other via a wheel bearing.

The decentralized integrated medium supply device in particular makes it possible to "shorten" the pressurized medium path, i.e. to shorten pressurized medium lines. If a communication or exchange with central components of the vehicle is required, this can occur for example by means of electrical lines. If primarily information is exchanged, then it is conceivable for there to be a wireless communication between the pressurized medium supply device and central components of the vehicle. It is thus possible to eliminate (physical) lines.

Even if the communication with central components of the vehicle takes place via electrical lines, it is possible to significantly improve the ruggedness of a system for monitoring and/or adjusting compressed air. In particular, it is possible to reduce the tendency for leaks to develop in the pressurized medium path. In centralized systems for producing compressed air, it is necessary to provide compressed air lines in a web-like or star-like fashion in the region of a chassis of the vehicle. This region, however, is particularly exposed and is potentially subject to harmful environmental conditions. It is therefore advantageous to be able to eliminate a majority of the necessary lines (compressed air lines).

The decentralized compressor unit can in particular include a compressor. In addition, the decentralized compressor unit can include or be coupled to a motor for driving the compressor. Basically, the decentralized compressor unit can also be associated with a buffer unit, which for example supplies (electrical) energy for a limited operating time.

The rotary/stationary transition between the support side and the wheel body side can on the one hand be provided in the pressurized medium path. The rotary/stationary transition can, however, basically also be provided in the energy supply path. The energy supply path is particularly embodied to supply electrical energy.

The compressor unit can be mounted or fastened in various preferred positions. On the support side, this can, for example, relate to an axle body. As a result, the rotary/stationary transition would be situated in the pressurized medium path. The compressor unit can, however, also be positioned on the wheel body side and be situated, for example, in the vicinity of a wheel hub (i.e. not necessarily on the wheel itself) or in the vicinity of a rim of the wheel. In this case, the rotary/stationary transition can be embodied in the energy supply path.

Basically, there are also conceivable embodiments in which the compressor unit is positioned on the wheel body side, for example on a rim, in such a way that the flow can travel directly to the tires. In other words, the compressor unit can be situated "in" the tire. With such a design, the pressurized medium path is in particular embodied for an intake of the pressurized medium.

Usually, the vehicle tire can be inflated with compressed air passing via an isolation valve. This can, for example, be a conventional valve that can be activated (even externally) and can be used for filling in the usual way. The pressurized medium supply device can basically be embodied so that the compressor unit acts on such an isolation valve. The pressurized medium supply device can, however, also be embodied so that the compressor unit can act on the tire in parallel with the isolation valve.

The pressurized medium path can in particular be a pressurized medium line, a pressurized medium conduit, or the like. Energy for driving the compressor unit can be supplied in the form of electrical energy, but also in the form of mechanical energy or the like.

According to another embodiment, the compressor unit has a compressor and a motor, which are in particular integrated into a common housing. It can also be advantageous for a buffer unit, for example a battery unit or a capacitor unit, to be provided in the compressor unit. The buffer unit can also be integrated into the common housing. As a result, the compressor unit can have a compact, cartridge-like design, thus making it possible to protect the components from external influences.

Basically, the compressor of the compressor unit can also be embodied in the form of a mechanically driven compressor. Such a design can include the fact that the compressor is mechanically activated and driven as needed. It is conceivable for the kinetic energy of the tire or wheel, which is rotating (relative to the support side), to be used for this purpose.

According to another embodiment, the rotary/stationary transition is embodied in the pressurized medium path. The compressor unit is thus mounted on the support side. The compressor unit can be positioned on the axle body. The compressor unit can in particular be positioned in the axle body. This can provide improved protection of the compressor unit from environmental influences. The axle body can define an axle around which the wheel, which is supported on the axle body in rotary fashion, can rotate along with the rim and the tire. The compressor unit can be accommodated coaxially relative to this axle. Basically, the compressor unit can also be positioned on the axle body so that it is offset in parallel or is skew relative to this axle.

According to another embodiment, the rotary/stationary transition in the pressurized medium path includes a fluidic, rotary feed-through.

According to another embodiment, the rotary/stationary transition can be switched between an activated state and a deactivated state; particularly in the activated state, a contact is produced between a stationary component and a rotatable component of the rotary/stationary transition. As a result, the stationary component and rotatable component can be triggered in such a way that an engagement between them only occurs if there is a need for pressure regulation. For example, an actuator can be triggered to produce the switching between the active and the inactive state.

According to another embodiment, the rotary/stationary transition can be switched as a function of a pressure of the pressurized medium that contacts it. In other words, the rotary/stationary transition can be associated with a pressure-controlled valve. The valve can thus on the one hand be switched by the pressure of the fluid that contacts it and in the switched (active) state, the fluid can flow through the valve. For example, a stationary component of the valve, which is coupled to the axle body, can include an extendable piston through which an axial flow can pass. On the one hand, a flow can in fact pass through the piston axially, but on the other, the piston can include an end surface by means of which the pressurized medium can act on the piston. The valve can be suitably designed so that a pressure that contacts it is sufficient to extend the piston and thus produce a contact with the rotatable component.

According to another embodiment, the rotary/stationary transition is positioned coaxially relative to a wheel axle of the wheel unit.

According to another embodiment, the rotary/stationary transition is positioned in an off-center fashion, in particular eccentrically, relative to a wheel axle of the wheel unit. This design can include the fact that a support-side section of the pressurized medium path is routed radially away from the wheel axle and, spaced apart from the wheel axle, feeds into an annular gap or a similar element that is associated with the wheel body side. The annular gap can basically be an annular gap that is separately provided on the wheel body side. It is also conceivable, however, to use an existing annular gap that is associated with a transition between the wheel body side and the support side. For example, it can be the wheel bearing gap. It is conceivable to provide the wheel bearing gap with shaft sealing rings that seal it in a pressure-tight fashion. The shaft sealing rings can be modified so that the pressurized medium path feeds into the wheel bearing gap at a stationary sealing ring and exits the wheel bearing gap at its outer circumference, for example via a bore.

According to another embodiment, the rotary/stationary transition is embodied in the energy supply path, with the compressor unit being at least partially affixed to the wheel body side.

As mentioned above, the compressor unit can include a compressor, a drive unit, and possibly a buffer unit. According to this embodiment, the compressor unit can rotate together with the wheel body side relative to the support side. This embodiment has the advantage that the rotary/stationary transition does not have to be positioned in the pressurized medium path. In this way, it is possible to provide even greater assurance against leaks in the pressurized medium path. It is also possible to further reduce the cost for producing the pressurized medium supply device.

This embodiment can be modified in that the rotary/stationary transition in the energy supply path includes at least one slip ring contact. This allows the electrical contacting via the rotary/stationary transition to be provided in a particularly simple way.

According to another embodiment, the rotary/stationary transition for the energy supply path has at least a selectively activatable contacting unit, which can be moved between a contact position and a non-contact position in order, in the contact position, to contact at least one annular or disc-shaped contact section; the at least one contacting unit is associated with the support side while the at least one contact section is associated with the wheel body side. This has the advantage that a contact only actually exists when energy is to be transmitted. This makes it possible to significantly reduce wear.

According to a modification of this embodiment, the at least one contacting unit includes an actuator that can be activated when the contacting unit is supplied with current for energy transmission purposes. The actuator can, for example, be embodied in the form of a magnetic actuator or in the form of an electromotive actuator. Preferably, the activation of the actuator occurs when power is supplied to the energy supply path. This has the advantage that no separate lines are required for the activation.

According to another embodiment, two contact sections are provided on the wheel body side, which are spaced axially apart from each other and which constitute opposing poles; the contacting unit includes a contact body that has a corresponding polarization and can be radially inserted into an intermediate space between the contact sections in order to contact them both. A required pressing force can thus be produced in a simple way. The actuator basically only needs to execute a simple linear inserting and retracting motion. On the contact body, contact surfaces can be provided that constitute corresponding poles.

According to yet another embodiment, a contact section is provided on the wheel body side and is provided with contact surfaces that are spaced apart from each other and that constitute opposite poles; the contacting unit has two contact bodies that are spaced apart from each other and that constitute the poles associated with the contact surfaces; and the contact bodies can be moved radially or axially toward the contact section in order to embrace it between them and to contact the contact surfaces.

According to an alternative embodiment, the rotary/stationary transition in the energy supply path is embodied as a crossover for contactless energy transmission.

In particular, the rotary/stationary transition in the energy supply path can be embodied for transmitting electrical energy. Electrical energy can, for example, be transmitted in an inductive, capacitive, or electromagnetic fashion.

It is basically conceivable to provide the rotary/stationary transition, for example, in a gap or air gap between a stator and a rotor of an electric machine for the compressor unit. In this way, the rotary/stationary transition could be provided by the motor itself, so to speak. According to this embodiment, for example kinetic energy of the wheel body side during driving can be used to drive the compressor unit.

It is also conceivable, however, to embody the energy supply path in the form of contactless conductors for energy transmission. The energy can be transmitted in an inductive, capacitive, or electromagnetic fashion. It is conceivable for a rectified energy signal to be converted into an inverted energy signal or vice versa in the rotary/stationary transition. It is also conceivable, however, to maintain the type of signal (rectified or inverted) in the rotary/stationary transition.

According to another embodiment, the rotary/stationary transition in the energy supply path is embodied to convert electrical energy into mechanical energy. In this case, for example, kinetic energy of the wheel body side can be converted into electrical energy. In other words, the rotary/stationary transition can include a stator and a rotor that cooperate with each other in generator fashion.

According to another embodiment, the rotary/stationary transition in the energy supply path is embodied to convert mechanical energy into fluidic energy. This design can also make use of a relative movement, in particular a relative rotation between the wheel body side and the support side. Such a relative rotation can produce a fluid flow, in particular an air flow, that drives the compressor unit. It is also conceivable, however, for such a flow to be conveyed in the direction of the tire, directly via the pressurized medium path.

According to another embodiment, the compressor unit is situated coaxial to a wheel axle of the wheel unit. For example, the compressor unit can be provided centrally on a hub body.

According to an alternative embodiment, the compressor unit is positioned in an off-center fashion, in particular eccentrically, relative to a wheel axle of the wheel unit. This can include the fact that the compressor unit mounted on the hub body is basically also mounted on the wheel body or the rim. A rim body of this kind can in particular include a rim well and a so-called wheel disc. The rim well can have an approximately U-shaped cross section, which includes two flanges and a recessed surface extending between these. The U-shaped cross section can extend in a rotationally symmetrical fashion around the wheel axle and can thus constitute the rim well. The wheel disc usually produces a connection between the rim well and a central, axial region of the rim. The wheel disc can be embodied to be mounted to a hub body, in particular to a wheel mount.

Accommodating the compressor unit on the hub body has the advantage that the compressor unit can remain in place on the hub body when the wheel or tire is replaced. Accommodating the compressor unit on the rim has the advantage that the compressor unit can form a unit with the rim. If the compressor unit is positioned on the rim, then the pressurized medium path can be completely or almost completely integrated into the rim. In other words, it is not necessary to interrupt the pressurized medium path when replacing the wheel.

But if the compressor unit is positioned on the hub body, i.e. not on the rim, then it is advantageous to make special provisions that permit a simple wheel replacement. These can, for example, include at least one shutoff valve, which is situated in the pressurized medium path at the interface between the hub body and the rim. When the rim is removed, for example, a shutoff valve of this kind can automatically close and prevent dirt from getting inside. It can also be advantageous to provide an annular gap on the rim or on the wheel hub or its wheel mount. This can be accompanied by the advantage that the wheel can be fastened to the wheel mount in any (rotational) orientation and a connection for the pressurized medium path is always produced via the annular gap.

In analogous fashion, an electrical contacting could also be produced by means of a slip ring so that here, too, a reliable connection in the energy supply path is assured regardless of a (rotational) orientation of the mounted wheel relative to the wheel mount.

According to another embodiment, the pressurized medium supply device also has a buffer unit, in particular for electrical energy. The buffer unit can be positioned between the energy supply unit and the compressor unit. In particular, the buffer unit can be connected to the energy supply path. The buffer unit can, for example, be a capacitor, a battery, or storage cells of this kind. In particular, the buffer unit can comprise a so-called package together with the compressor unit.

The buffer unit can supply energy to the motor of the compressor unit, which drives the compressor of the compressor unit. The buffer unit can, for example, have a limited capacity, which is designed for a particular number of control cycles or a particular quantity of air. It is thus conceivable for the buffer unit to be recharged as needed. This can occur, for example, while driving by using the relative rotation between the support side and the wheel body side to produce electrical energy, which is supplied to the buffer unit. The buffer unit can, however, alternatively or additionally be connected to the central onboard electronics and in particular, can be supplied from an onboard electrical system of the vehicle. The buffer unit can output its stored energy at any time. It is thus possible to regulate pressure even when the vehicle is at rest or while driving at a low speed.

According to another embodiment, the compressor unit also has an additional interface for supplying energy, in particular for providing an emergency supply. This can, for example, be a plug interface or socket interface, which is accessible from the outside. In this way, the compressor unit could be supplied with electrical energy for triggering a regulating procedure, for example when the vehicle is at rest.

According to another embodiment, the compressor unit can be coupled to a reservoir of tire sealant as needed in order to act on the tire sealant with pressure and supply it along the pressurized medium path to the wheel body side; in particular, at least one on/off valve is also provided in order to control the reservoir as needed.

In other words, the reservoir can be integrated into the wheel unit as a component of the pressure supply unit. Consequently, the pressurized medium supply device can also function as a "flat tire kit." If damage to a tire occurs, then the wheel unit can be made drivable again.

Advantageously, the reservoir can then be triggered, for example, when a tire pressure detecting element reports a pressure drop. It is thus possible to react to any damage automatically.

A connection to the reservoir can be produced by means of the on/off valve. For example, the on/off valve can be provided in the pressurized medium supply path. If the on/off valve is activated, the pressurized medium that is produced and compressed in the compressor unit can be redirected in order to exert pressure on the reservoir for the tire sealant. In this way, the tire sealant can be acted on with pressure, supplied to the pressurized medium path, and finally supplied to the tire.

According to another embodiment, a coupling valve is also provided in the pressurized medium path, which in particular makes it possible to disconnect the pressurized medium path between the hub body and the rim. This makes it possible to simplify replacement of the tire or wheel.

According to another embodiment of the pressurized medium supply device, an annular conduit or annular segment conduit constituting a section of the pressurized medium path is embodied on the hub body or on the rim body and permits the rim body to be mounted on the hub body in a plurality of relative positions. This measure makes it possible to appreciably facilitate the installation or replacement of a wheel. To be specific, the pressurized medium supply device is ideally integrated into the rim body and hub body in such a way that from the point of view of an installer, there is no apparent or perceptible difference from the usual components.

In the automotive sector, wheels usually have a plurality of fastening elements that are evenly distributed around the circumference of the rim body and hub body. The fastening elements can be embodied as threaded bores or as stationary wheel studs. In the passenger car sector, usually four or five such fastening elements are provided. In the commercial vehicle sector, up to twelve or even more fastening elements are provided, for example. When installing a wheel, it is often simply irrelevant which current relative position the rim body and the hub body assume relative to each other, as long as the fastening elements and corresponding openings are aligned with one another.

The annular conduit or annular segment conduit permits pressurized medium to be conveyed regardless of the current rotational orientation between the wheel and hub. The driver or installer does not have to worry about exactly how the rim body is aligned relative to the hub body.

According to a modification of this embodiment, the annular conduit has a plurality of connections that are adapted to a wheel lug arrangement in such a way that in a plurality of positions, a contact element of the rim body produces a contact with a respective one of the connections and permits pressurized medium to be conveyed from the hub body to the rim body. For example, the number of connections can correspond to the number of fastening elements. The distribution of the connections on the circumference preferably corresponds to the distribution of the fastening elements. To connect the fluid path, it is therefore sufficient to roughly align the wheel in the known way in order to be able to bring for example wheel studs or threaded bores for lug bolts and corresponding bores in the rim body into congruent positions.

According to another embodiment, the annular conduit has a plurality of reflux blocking elements, which close the pressurized medium path in a closed position and open it in an open position; in the mounted state, the contact element of the rim body acts on one of the connections in order to switch its reflux blocking element into the open position. Preferably, each reflux blocking element is associated with a connection in the annular conduit. The contact element can include a peg-like or pin-like projection that acts on the reflux blocking element. The reflux blocking elements have the advantage that for example if a wheel is not currently mounted, no dirt can get into the pressurized medium path. Furthermore, the reflux blocking elements that are not currently activated can seal the annular conduit even when the wheel body is mounted.

According to another embodiment, the compressor unit includes an electrical machine that can be operated as a motor or as a generator; the electrical machine is in particular embodied so that when operating as a generator, it is able to charge a buffer unit and when operating as a motor, can be supplied by the buffer unit with energy for driving the compressor unit. In this way, the pressurized medium supply device can be operated in a hybrid mode, so to speak. A motor associated with the compressor unit can simultaneously also function as a generator. As a result, the motor can, for example, drive a compressor of the compressor unit. If the motor is being used as a generator, then it can store energy in the buffer unit.

In this way, the pressurized medium supply device can be embodied as almost entirely independent. There are also conceivable embodiments in which a coupling to the onboard electrical system no longer appears to be necessary.

According to another embodiment of the pressurized medium supply device, a pressure-reducing opening is provided in the pressurized medium path, which when pressurized, produces a defined leakage and, preferably as a function of a pressure level in the pressurized medium path, can be driven between an open position in which a small quantity of the pressurized medium is able to escape, and a closed position in which the pressurized medium path is protected from external contamination.

The defined leakage can facilitate a resetting motion of the control piston after a pressure regulating procedure. Specifically, if the system and in particular, the pressurized medium path, were sealed in an ideal fashion, then after a regulating procedure, a considerable amount of pressure would be present in the pressurized medium path, which the control piston would have to overcome in order to disengage so as to isolate the wheel body side from the support side as much as possible. It is therefore advantageous to intentionally provide the system with a small leak so that the pressure in the pressurized medium path decreases when there is no replenishing flow of pressurized medium. Then the required restoring force for the control piston also decreases. This defined leak has significant repercussions on the regulating procedure and on the achievable pressure in the tire.

The pressure-reducing opening can basically be positioned anywhere in the pressurized medium path, as long as a controlled pressure decrease is ensured when no replenishing flow of pressurized medium toward the wheel is occurring. Preferably, the pressure-reducing opening is embodied as self-controlling or self-regulating and is controlled by means of the pressure in the pressurized medium path.

According to a modification of this embodiment, the pressure-reducing opening has a flow direction and a blocking direction. The pressure-reducing opening can be embodied in the form of a check valve or a safety valve, but is deliberately provided with a small flow rate. Preferably, the pressure-reducing opening is embodied in the form of a diaphragm seal. Alternatively or in addition, the pressure-reducing opening can have a sleeve-like design. It is preferable for the pressure-reducing opening to be closed when there is no excess pressure or only a slight excess pressure prevailing in the pressurized medium path. This has the advantage that no dirt from the outside can get into the pressurized medium path.

For example, the pressure-reducing opening can be embodied as similar to a tubular sleeve and can be made of a sufficiently flexible material. The pressure-reducing opening can be embodied as similar to a slotted diaphragm and when a particular excess pressure is present, can permit a defined amount of pressurized medium to cross over to the outside in order to achieve a desired pressure decrease.

The object of the invention is also attained by a wheel unit for a vehicle, which has an axle body and a rim body with a tire; the rim body is coupled to the axle body and in particular, is supported on the axle body in rotary fashion; and the wheel unit also has an integrated pressurized medium supply device according to one of the preceding aspects. In this way, a decentralized supply of pressurized medium in the vehicle can be provided either for individual wheel units of the vehicle or for all of them. The pressurized medium supply device can be associated with the wheel unit and in particular, can be integrated into it structurally and functionally.

According to a modification of the wheel unit, a pressure sensor is also provided, which is positioned on the wheel body side and is embodied to monitor a fluid pressure in the tire; the pressure sensor is preferably embodied to transmit the detected fluid pressure to a tire pressure regulating unit. The pressure sensor can basically be embodied as an active and/or passive pressure sensor. The pressure sensor can be connected to the tire pressure regulating unit either wirelessly or by means of a measurement line. The pressure sensor can be embodied to detect an actual pressure in the tire and to output a signal that corresponds to this. Depending on the detected signal, the tire pressure regulating unit can trigger the pressurized medium supply device of the wheel unit to carry out a pressure regulating procedure.

The pressure sensor can basically be provided on the isolation valve. It would basically also be conceivable to provide a pressure sensor in the compressor unit.

The object of the invention is also attained by means of a distributed system for supplying pressurized medium, in particular for supplying compressed air in a vehicle, in which the vehicle has a plurality of wheel units that are in particular associated in pairs with at least one axle; at least one of the wheel units is provided with an integrated pressurized medium supply device according to one of the preceding aspects, and the system has a tire pressure regulating unit that is embodied to selectively activate the compressor unit of the respective pressurized medium supply device.

The tire pressure regulating unit can basically be embodied as a central control unit. The tire pressure regulating unit can thus monitor and regulate the air pressure or fluid pressure of a plurality of tires in parallel. Basically, it would also be conceivable to assign each wheel unit its own regulating unit. A central monitoring and control can nevertheless be advantageous. It is thus conceivable to centrally provide a pressure specification in order to indicate a target range for the pressure regulation. In this way, for example, a driver of the vehicle can perform pressure adjustments centrally. This can, for example, be dictated by a change in driving surface, as a function of a load status of the vehicle, or other circumstances. Basically, however, the tire pressure regulating unit can also automatically set a desired target pressure or desired target pressure range for each wheel unit.

A necessary exchange of regulating signals, measurement signals, and control signals between the tire pressure regulating unit and the pressurized medium supply devices can basically be carried out wirelessly or by wire.

Another aspect of the present disclosure, which can also be the subject of an independent invention, relates to advantageous embodiments of compressors that are particularly suitable for use in pressurized medium supply devices for vehicles. This can apply to both centralized and decentralized (distributed) pressurized medium supply devices. In the prior art, various types of compressors are known that can have specific disadvantages and advantages. For example, so-called piston compressors that have at least one piston/cylinder combination are suitable for supplying pressurized medium, in particular for supplying compressed air. Compressors of this kind are basically similar to an internal combustion engine. The at least one piston of the piston compressor can be paired with a cylinder in order to reciprocate therein. The piston can thus execute an intake motion and a compression motion. In a suitable fashion, a plurality of piston/cylinder combinations can be connected to one another in order to achieve a higher flow rate or higher output pressures. In addition, a plurality of piston/cylinder combinations can be connected to one another in order to compensate for pressure fluctuations at the outlet, which are caused by the cyclical reduction of pressure in only one piston/cylinder combination.

It has turned out that in particular, the piston/cylinder combinations of piston compressors can experience a significant amount of wear. Usually, the piston is accommodated in its mated cylinder with only an extremely small amount of play. Also, a sealing device is usually provided, which for example includes a piston ring and usually a plurality of piston rings (two, three, or even more of them). The piston rings are generally embodied in the form of split rings and rest with a prestressing force against the cylinder. The piston/cylinder movement is thus frequently also encumbered with friction. If it is not possible to achieve a sufficient lubricant supply and/or lubricant wetting, this frequently results in flat (scraping) metal/metal tribological pairings. Such a relative movement between metal parts can on the one hand result in a significant heat build-up and on the other hand, can be accompanied by a large amount of mechanical wear.

In light of these circumstances, in another aspect of the present invention, which can also be the subject of an independent invention, a compressor unit is proposed, which is particularly suitable for a pressurized medium supply device according to one of the preceding aspects. The compressor unit has a compressor, in particular a piston compressor. The compressor has at least one piston; the sliding surface of the piston is provided with a recess, in particular a recess extending circumferentially and accommodating a lubricant depot.

In the installed state, the lubricant depot preferably contacts a wall of a cylinder of the piston/cylinder combination. According to another embodiment, the recess is positioned between a first groove and a second groove for piston rings; the grooves are spaced apart from each other by a distance that preferably constitutes at least 25%, more preferably at least 40%, and even more preferably at least 50% of an overall length of the sliding surface of the piston. According to another embodiment, the recess in the sliding surface of the piston has a length that constitutes at least 30%, more preferably at least 50%, and even more preferably at least 60% of an overall length of the sliding surface of the piston.

These embodiments are based on the knowledge that in order to minimize wear in piston compressors, it is necessary to provide either expensive lubricant supply systems, which require the corresponding lines, reservoirs, and conveying means for the lubricant. This frequently results in a high construction cost and cannot be easily implemented particularly in applications in which it is necessary to take into account restrictions with regard to overall space and costs. Conceivable applications can, for example, include tire pressure monitoring systems and tire pressure adjusting systems that are integrated into vehicles. On the one hand, such systems are frequently not in continuous operation. In addition, only a limited (operating) service life is required in order, for example, to cover an entire lifecycle of a vehicle that is equipped with a corresponding system. On the other hand, there are often restrictions with regard to overall space and general cost aspects that must be taken into account.

Consequently, the embodiment according to the above-described aspects takes advantage of the fact that a reasonable operating service life can be covered, for example, if a sufficiently large lubricant depot can be provided on the piston itself and a lubricant supply can thus be implemented that is integrated into the piston as it were. The piston itself usually has a certain guidance length in order to prevent it from tilting in the cylinder. This guidance length can now be used to accommodate a corresponding lubricant depot in (the middle of) it. The lubricant depot can include at least one recess, in particular a circumferential recess, which is provided, for example, in the form of a circumferential groove with a sufficiently large width and/or length dimension and a sufficiently large depth dimension. A suitable lubricant, such as a lubricating grease, lubricating oil, or a similar wear-reducing substance can then be introduced into the resulting recess. The lubricant can be in a carrier material or can be integrated into the latter. The carrier material can, for example, be a sponge-like material or a generally porous material. Suitable carrier materials can also include a sintered material that can be correspondingly impregnated with oil or grease.

Preferably, the lubricant depot is positioned in pistons, between two piston rings. In this way, the piston rings can also function as a seal for the lubricant depot. It is therefore possible to ensure that the consumption of lubricant remains within tolerable limits. It is thus possible, for example, to introduce into the recess in the piston a defined quantity of lubricant that is adapted to the expected service life or operating service life of the piston/cylinder combination. On the one hand, this has the advantage that it is no longer necessary to provide a complex lubricant supply in the piston compressor and reckon with the accompanying cost. An efficient lubrication between the piston and cylinder can nevertheless be provided. Another advantage lies in the fact that to a certain extent, the lubricant is available even from the first piston stroke. This is frequently not the case with known lubricant supply devices since in them, the lubricant must be supplied to the cylinder wall and piston. Another advantage lies in the fact that the plane between the piston (or piston rings) and the cylinder can be minimized further since an efficient lubrication can be provided. It is thus possible for the piston compressor to produce even higher output pressures.

Naturally, the features of the invention mentioned above and explained in greater detail below can be used not only in the respectively indicated combination, but also in other combinations or by themselves without going beyond the scope of the present invention.

BRIEF DESCRIPTION OF THE DRAWINGS

Other features and advantages of the invention ensue from the following description of a plurality of preferred exemplary embodiments taken in conjunction with the drawings. In the drawings:

FIGS. 35A-35D are schematic, highly simplified block diagrams of blocking elements of sample pressure-reducing openings for the arrangement according to FIG. 34.

DETAILED DESCRIPTION OF THE INVENTION

Figure 1:
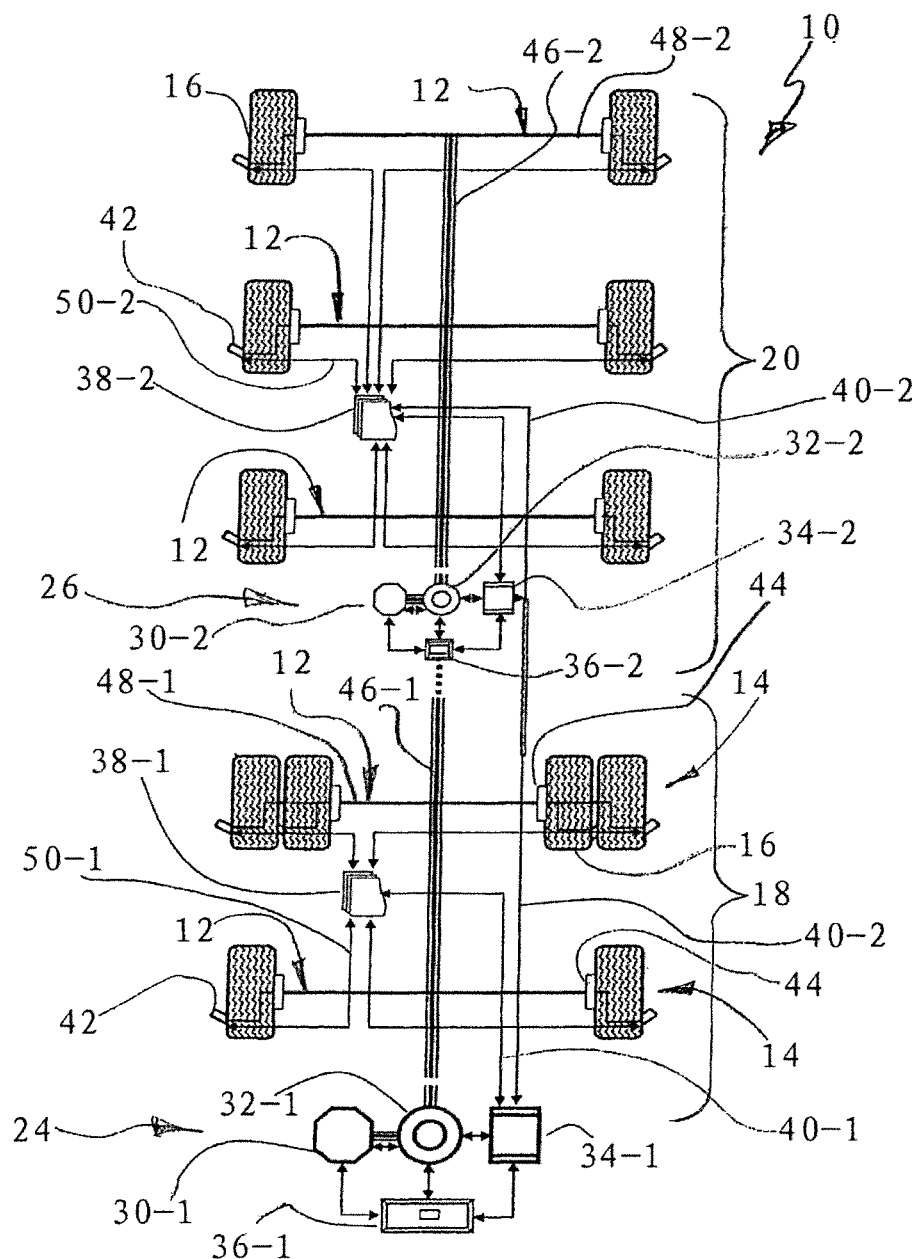
FIG. 1 is a schematic, highly simplified view of a vehicle with a pressure regulating system that has a central compressed air supply.

FIG. 1 shows a highly simplified schematic view of a vehicle, which is labeled as a whole with the reference numeral 10. The vehicle 10 can in particular be a commercial vehicle. The vehicle 10 can, for example, include a tractor 18 and a trailer 20. Naturally, the vehicle 10 can also be embodied in the form of a passenger car, a truck, or the like.

The vehicle 10 has a plurality of axles 12, which are each associated with pairs of wheel units 14 with tires 16.

The vehicle 10 has a central compressed air supply 24, 26 for adjusting and/or regulating the pressure in the tires 16. For example, a compressed air supply labeled with the reference numeral 24 can be provided for the tractor 18 and a compressed air supply labeled with the reference numeral 26 can be provided for the trailer 20. This can be necessary due to the fact that the tractor 18 and trailer 20 are essentially separable from each other. Even if in the present example, two (centralized) compressed air supplies 24, 26 are provided, each of the compressed air supplies 24, 26 is nevertheless responsible for a plurality of axles 12 and tires 16.

The central compressed air supplies 24, 26 can include a compressor 30-1, 30-2, a storage device 32-1, 32-2, and a control unit 34-1, 34-2. In addition, a respective user interface 36-1, 36-2 can be provided, which permits a user to input information. The user interface 36-1, 36-2 can also be used to provide the user with information such as an actual tire pressure.

The compressed air supplies 24, 26 can also include (central) control elements 38-1, 38-2. The control elements 38 can, for example, be embodied as data collecting elements, data storage devices, or the like. The control elements 38 can be coupled to the control units 34 to permit a data exchange. The central compressed air supply 24, 26 also has a (central) data line 40-1, 40-2 that can connect the control units 34-1, 34-2 to the control elements 38-1, 38-2 to permit a data exchange.

The tires 16 can each be associated with a wheel unit 14. Each tire 16 can have a valve 42 that is accessible from the outside. The valve 42 can in particular be a conventional compressed air valve. Each of the wheel units 14, however, can also include a pressure regulating unit 44 and these units are each coupled to the respective (compressed air) storage device 32-1, 32-2. The coupling is produced by means of a branched line network. The line network can have central pressure lines 46-1, 46-2 and pressure line sections or pressure line branches 48-1, 48-2. The pressure line sections 48 constitute the "branches" of the pressure lines 46. Each wheel unit 14 can be (centrally) supplied with compressed air via the pressure lines 46, 48. A communication or data transmission between the pressure regulating units 44 and the control units 34 and/or their control elements 38 can take place via central data lines 40-1, 40-2 and via (decentralized) data lines 50-1, 50-2, which can constitute the branches of the (central) data lines 40-1, 40-2.

The simplified system shown in FIG. 1, with the central compressed air supply 24, 26, can only be implemented for a relatively high price and is relatively maintenance-intensive. In particular, the laying of pressure lines 46, 48 requires a considerable amount of work and can entail relatively high costs.

Figure 2:
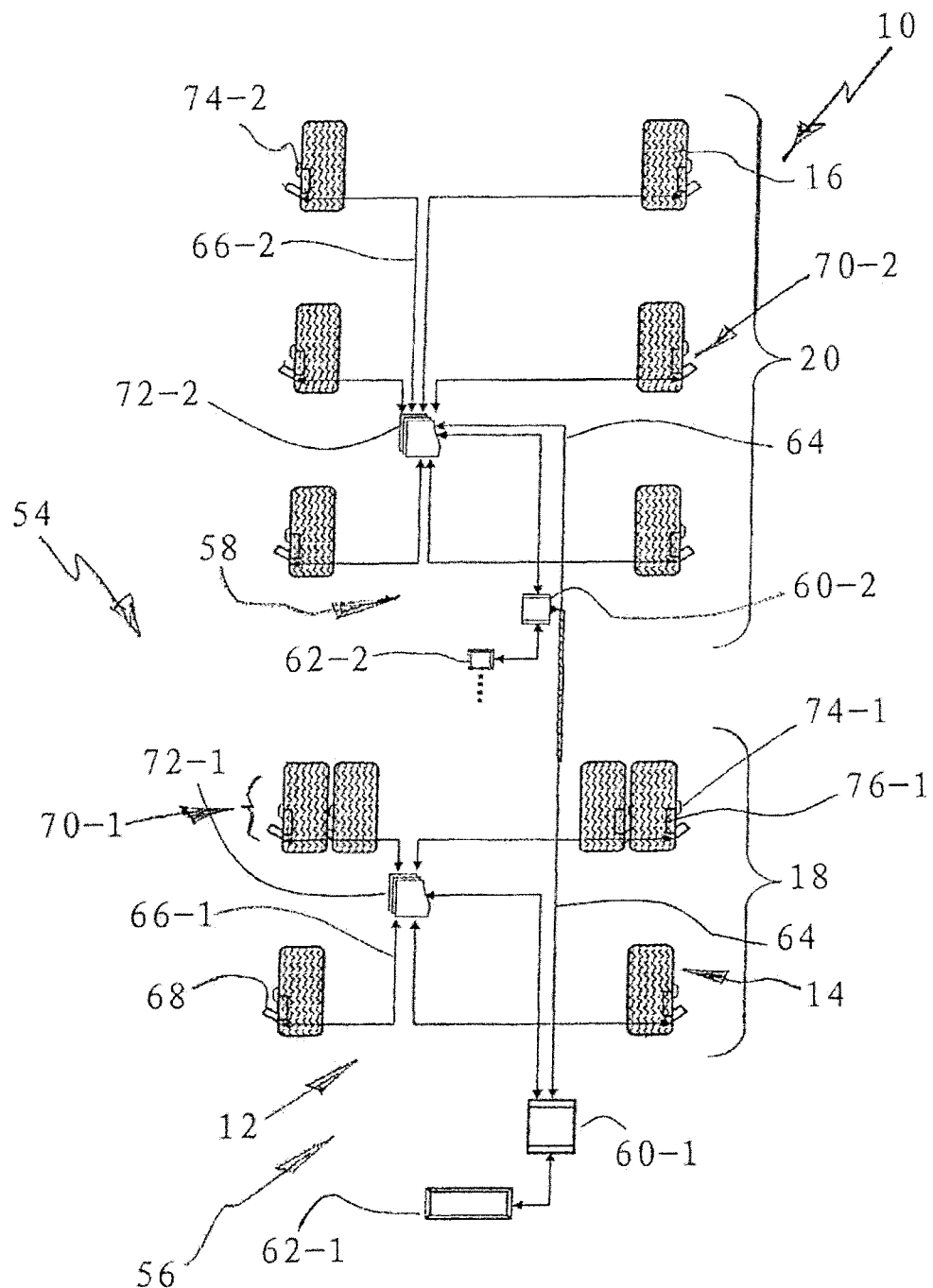
FIG. 2 is a schematic, highly simplified view of a vehicle with a decentralized tire pressure regulating system with decentralized pressurized medium supply devices.
Figure 3:
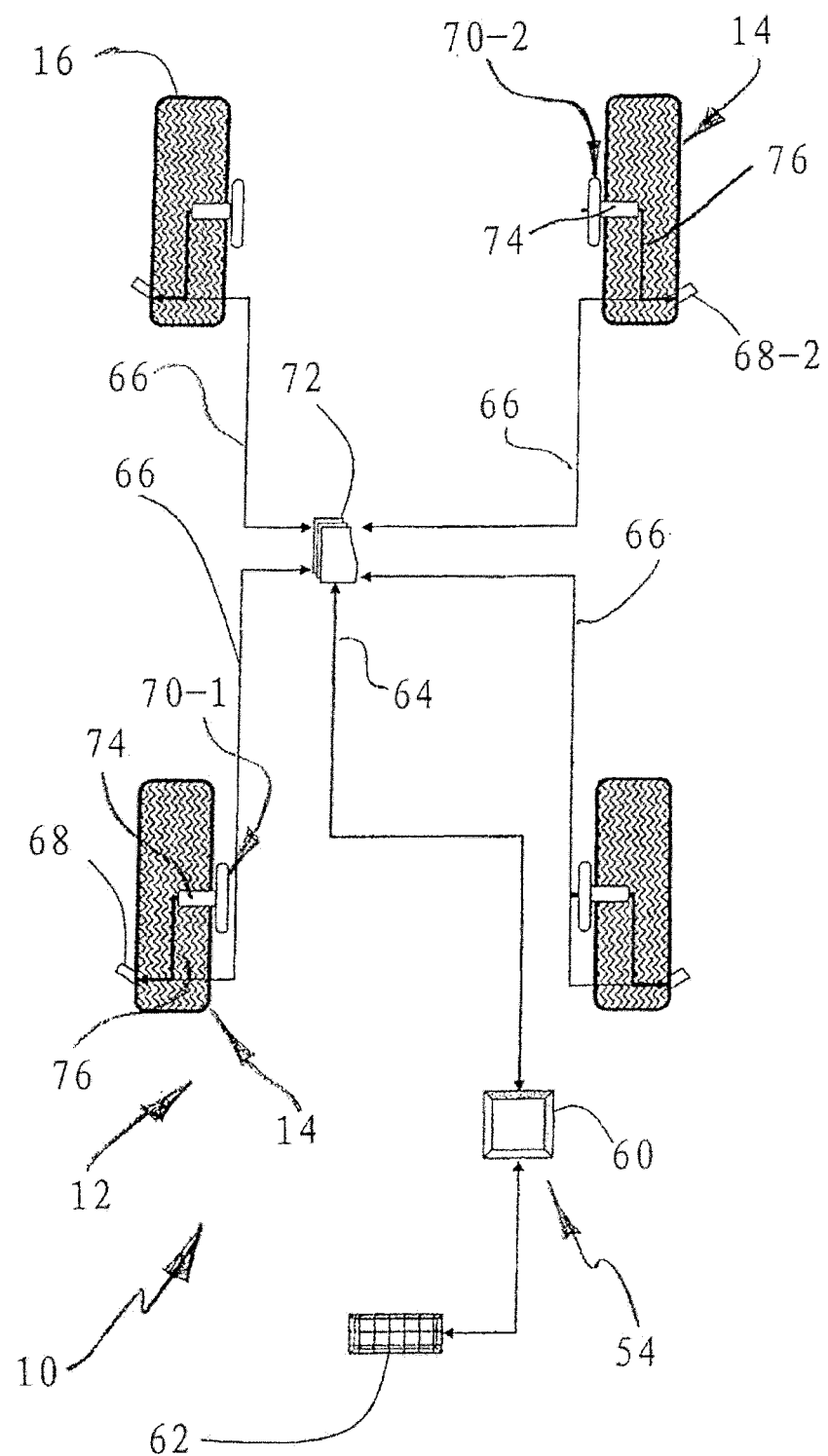
FIG. 3 is a schematic, highly simplified view of a vehicle with a decentralized tire pressure regulating system, which is similar to the system according to FIG. 2.

FIG. 2 and FIG. 3 show alternative embodiments of compressed air supply systems in vehicles 10 that have a decentralized system. Various aspects and embodiments of decentralized pressurized medium supply devices are shown in FIGS. 4 through 29b and will be described in greater detail below based on these figures.

FIG. 2 is a highly simplified schematic depiction of a vehicle 10, which, as in FIG. 1, can include a tractor 18 and a trailer 20. The vehicle 10 has a plurality of wheel units 14, which include tires 16 and are associated with axles 12 of the vehicle 10.

The vehicle 10 is provided with a decentralized distributed system 54 for regulating and/or supplying compressed air. The system 54 can have a section 56 and a section 58. The section 56 can be associated with the tractor 18. The section 58 can be associated with the trailer 20. The system 54, in particular each of the sections 56 and 58, can include a control unit 60-1, 60-2 for controlling the supply and/or regulation of compressed air. In addition, a user interface 62-1, 62-2 can be provided, which can be embodied in a fashion analogous to the user interface 36 of the vehicle 10 shown in FIG. 1.

The system 54 differs from the central compressed air supply 24, 26 essentially in that no central pressure lines are required. It is likewise possible to dispense with central compressors, storage devices, and similar components. Instead, the decentralized system 54 has decentralized pressurized medium supply devices 70 in at least some of its wheel units 14. A communication between the control unit 60-1, 60-2 and the pressurized medium supply devices 70 can take place via lines 64, 66. The line 64 can be a central line or data line. The lines labeled with the reference numerals 66 can be embodied as branches or decentralized lines. The lines 64, 66 can basically be embodied to transmit information. Alternatively or additionally, however, the lines 64, 66 can also be embodied to transmit and/or convey energy. At least some of the lines 64, 66 can be implemented in the form of wireless connections, provided that this primarily involves the transmission of data and/or information. The central communication and/or control, however, does not take place via compressed air lines. The lines 64, 66 can basically be implemented more simply and with less structural complexity than corresponding compressed air lines.

In addition, each of the tires 16 in FIG. 2 is provided with a valve or isolation valve 68. The isolation valve 68 can basically be an externally accessible valve that is accessible for external compressors and the like.

The decentralized distributor system 54 can also include control elements 72-1, 72-2 that are coupled to the control unit 60-1, 60-2 and that can also be embodied, for example, in the form of data acquisition units, data storage devices, or the like. The control elements 72-1, 72-2 can particularly be embodied for data acquisition and/or data transmission. The control elements 72-1, 72-2 can be embodied as branches or nodes, so to speak, in the network of the lines 64, 66. Naturally, the control unit 60-1, 60-2 and the control element 72-1, 72-2 can basically also be structurally coupled to one another and integrated into a common housing or a common subassembly.

FIG. 3 shows another vehicle 10, which, like the embodiment shown in FIG. 2, can have a decentralized, distributed system 54 for regulating tire pressure. By contrast with FIG. 2, however, the vehicle shown in FIG. 3 is not divided into a tractor 18 and trailer 20. The vehicle 10 according to FIG. 3 can therefore be a passenger car, for example, or generally speaking, a vehicle without a trailer.

The vehicle 10 also has a plurality of axles 12, which are associated with wheel units 14 with tires 16. The decentralized, distributed system 54 for controlling tire pressure can be equipped with a control unit 60, a control element 72, and a user interface 62. Communication between the components and the system 54 can take place via lines 64, 66. Each of the wheel units 14 shown in FIG. 3 is equipped with a corresponding pressurized medium supply device 70-1, 70-2. The pressurized medium supply devices 70-1, 70-2 each have a respective compressor or compressor unit 74, which can be connected to the tire 16 via a decentralized pressurized medium path or a decentralized pressurized medium line 76. In other words, a separate compressor 74 and a separate pressurized medium line 76 can be provided for each wheel unit 14. The pressurized medium line 76 can, for example, be coupled to the isolation valve 68 in order to supply the tire 16.

It is basically also conceivable for the decentralized pressurized medium line 76 of each pressurized medium supply device 70 to feed into the tire 16 independently of the respective isolation valve 68. It is thus possible to install a separate valve. It is also conceivable, however, for the pressurized medium line 76 and the (possibly externally accessible) isolation valve 68 to be coupled to a common line via which the tire 16 can be filled.

With the distributed system 54, which is shown by way of example in FIGS. 2 and 3 and whose components are described in greater detail below by way of example based on FIGS. 4 through 29b, it is possible to achieve a number of advantages. The system 54 can basically be embodied to regulate compressed air while driving or while at rest. Ideally, however, it doesn't matter whether the vehicle is currently moving or stationary. It is possible to reduce the malfunction susceptibility of the pressure regulating system 54. This is made possible, for example, by shorter line lengths. Required compressed air lines or pressurized medium lines can be installed on the vehicle 10, particularly on its wheel units 14. This makes it possible to significantly reduce pressure losses.

It is likewise possible to limit the number of required seals and/or branches. The system 54, in particular its pressurized medium lines 76, can be protected from environmental influences. Generally, fewer closing valves are required in the pressurized medium lines 76. For example, a central system for monitoring compressed air requires an expensive valve block for connecting and disconnecting the respectively desired pressurized medium line. The regulation of this kind can be replaced with an electric regulation or electronic regulation. As a result, an "electric" or "electronic" control block can be embodied less expensively and with a lower weight requirement in comparison to a "pneumatic" control block.

The system 54 can easily be integrated into existing vehicles 10 without significant retrofitting and/or conversion expense. Each wheel unit 14 can basically be supplied with compressed air independently of the overall system. It is thus possible to simplify the control of the overall system since fewer interdependencies occur. A necessary exchange of information and/or data (for example relating to an actual pressure in the tire) can basically be carried out wirelessly or by wire. Energy, in particular electrical energy, can be supplied to the compressor 74 wirelessly, for example inductively. As a result, it is possible to significantly reduce the wear in a necessary rotary/stationary transition.

The compressor unit 74 can be operated in a so-called hybrid mode. This can, for example, include the fact that when the vehicle 10 is at rest, the compressor unit 74 can be supplied with energy by means of an integrated buffer unit in order to drive an installed compressor. A regulation during driving can, for example, be carried out using the onboard electrical system. In addition, the buffer unit can be charged during driving. This can basically also be carried out using the onboard electrical system. It would also be conceivable to provide the compressor unit 74 with a generator that charges the buffer unit. Preferably, the drive motor of the compressor unit 74 is embodied so that it can be operated both as a motor and as a generator. This makes it possible to produce a pressurized medium supply device 70 that is almost entirely independent. In other words, the relative rotation between the wheel units 14 and the axles 12 of the vehicle 10 can be used to produce energy for the pressurized medium supply device 70.

Various conceivable configurations relating to the embodiment and placement of pressurized medium paths, compressor units, and buffer units are depicted in FIGS. 4 through 7. Naturally, the embodiments according to FIGS. 4 through 7 are basically interchangeable and can be combined with one another. The basic design of a wheel unit 14 will also be discussed in connection with FIGS. 4 through 7.

Figure 4:
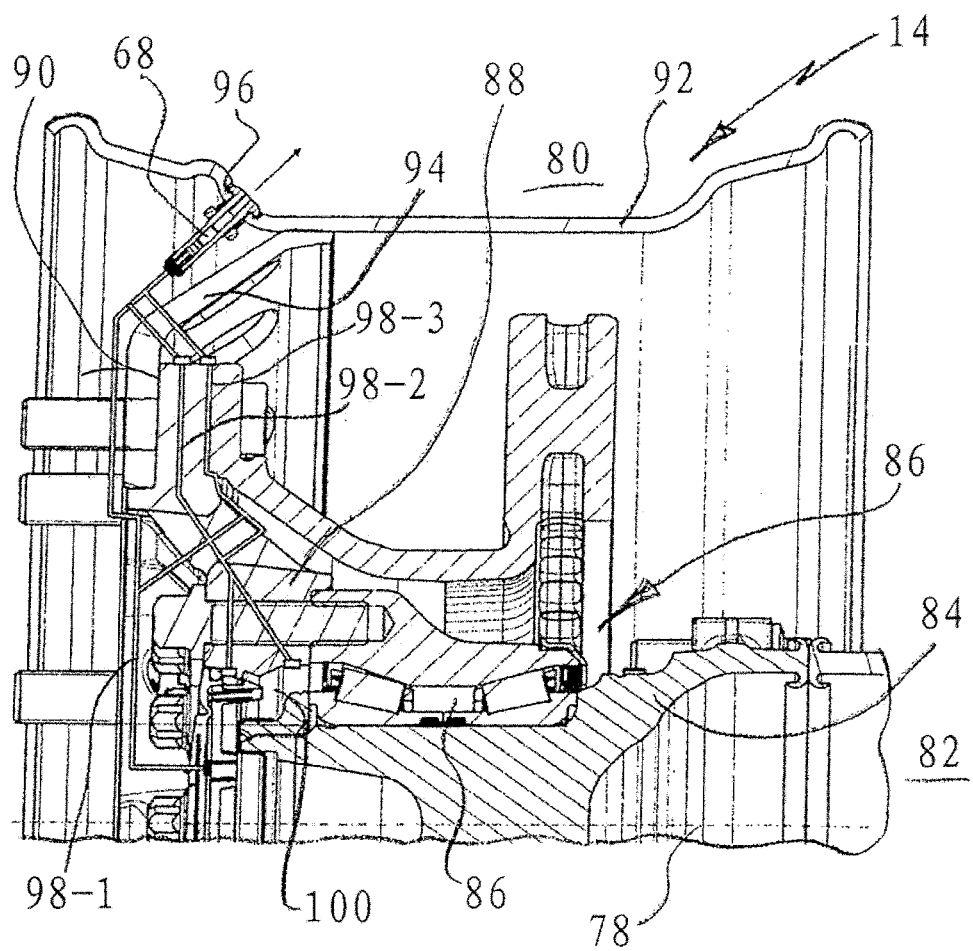
FIG. 4 is a partially sectional view of a wheel unit showing possible pressurized medium paths.

FIG. 4 shows a wheel unit 14 in a sectional partial depiction. The wheel unit 14 has an axle 78. The wheel unit 14 can basically be divided into a wheel body side 80 and a support side 82. Usually, the support side 82 is the side that is affixed to the frame of the vehicle 10. As a result, the wheel body side 80 is basically the side that is able to rotate around the axle 78 relative to the support side 82. The support side 82 can in particular be embodied as an axle body 84, which has a flange for accommodating the wheel body side 80. The axle body 84 can define the axle 78.

The wheel body side 80 and the support side 82 can in particular be coupled to each other by means of a wheel bearing 86. The wheel bearing 86 constitutes a connection between the support side 82 and the hub cap side 80.

The wheel body side 80 can be associated with a hub body 88, which is accommodated on the axle body 84, in particular on its axle mount, in rotatable fashion by means of the wheel bearing 86. The hub body 88 can provide a wheel mount 90, which can accommodate a rim body 92, for example. Since wheels of a vehicle 10 are usually replaceable, the rim body 92 can be affixed to the wheel mount 90 of the hub body 88 by means of lug nuts or lug bolts, for example. The rim body 92 can be coupled to the wheel mount 90 by means of a wheel disc or a wheel flange 94, for example. The rim body 92 is also provided, for example, with a valve seat 96, which is embodied to accommodate the isolation valve 68. The tire 16 is not shown in FIGS. 4 through 29b.

Even if the pressurized medium supply device 70 according to the present disclosure basically manages with shorter pressure line sections than known systems, it is necessary, at least in some parts of the wheel unit 14, to provide a pressurized medium path for the pressurized medium. In particular, the pressurized medium path can extend between the valve 68 and the compressor unit 74.

FIG. 4 shows different configurations and embodiments of pressurized medium paths 98-1, 98-2, and 98-3. The pressurized medium path 98-1, for example, is routed outside of the wheel flange 94 and guided along it in the direction toward the valve 68. By contrast, the pressurized medium paths 98-2 and 98-3, for example, lead at least partially through the hub body 88 and are connected to it.

Figure 5:
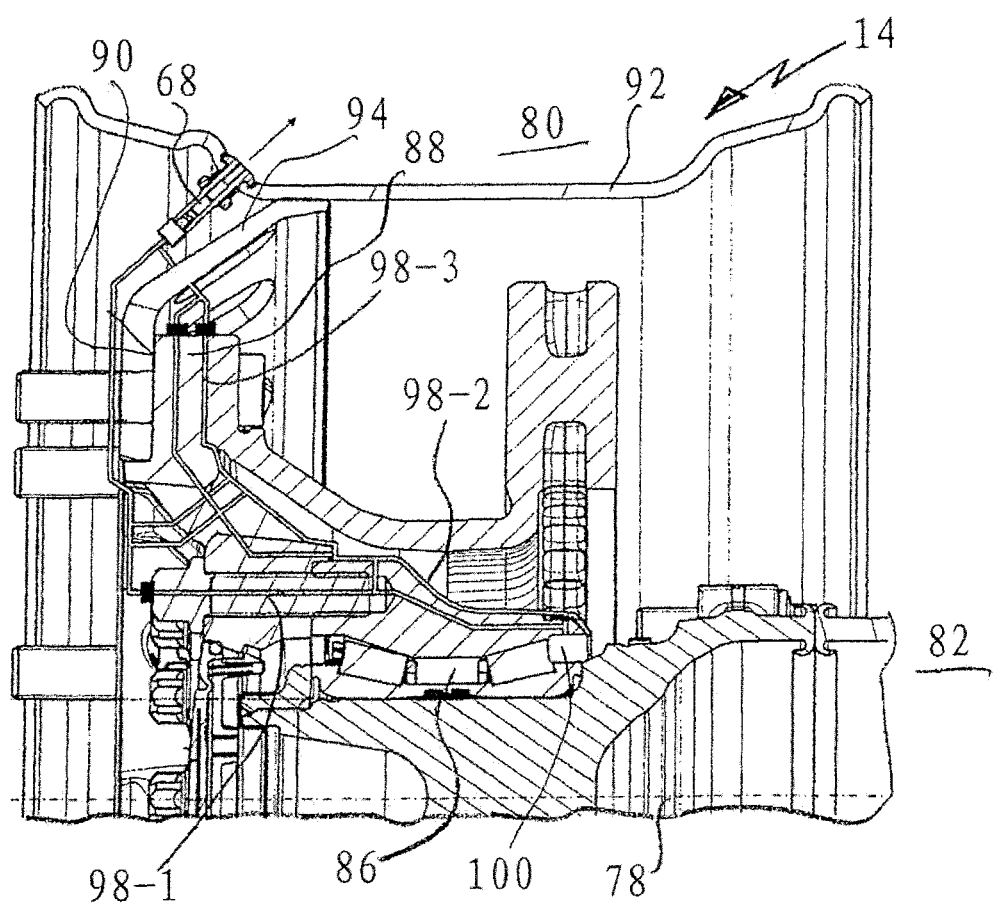
FIG. 5 is another partially sectional view of a wheel unit showing other alternative pressurized medium paths.

FIG. 5 shows other alternative embodiments of pressurized medium paths 98-1, 98-2, and 98-3. The pressurized medium paths shown in FIGS. 4 and 5 essentially extend on the wheel body side 80 of the wheel unit 14. The embodiments according to FIGS. 4 and 5 differ from each other essentially in that the pressurized medium paths in FIG. 5 feed into an annular gap 100 at the vehicle end of the bearing 86. By contrast, the pressurized medium paths shown in FIG. 4 are coupled to an annular gap 100 at an opposite end of the bearing 86 that points away from the vehicle. The annular gap 100 can be positioned at the vehicle end of the bearing 86. Alternatively, the annular gap 100 can be positioned at the end of the bearing 86 pointing away from the vehicle. The annular gap 100 can, for example, be used to implement the rotary/stationary transition for the pressurized medium paths.

Figure 6A:
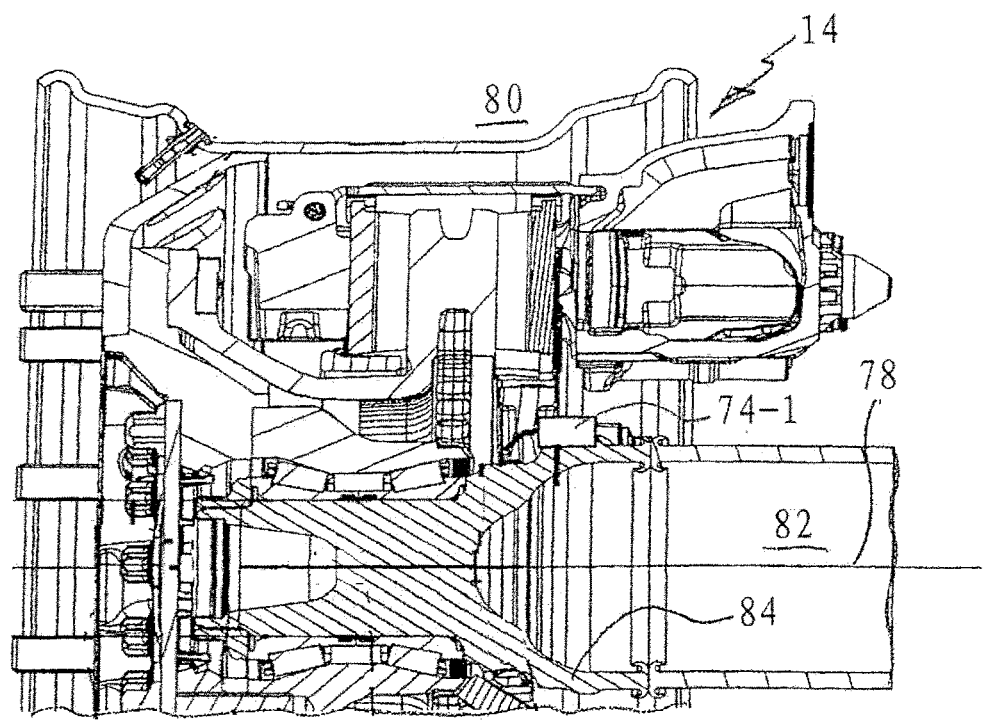
FIGS. 6A-H each show a sectional view of a wheel unit showing possible installation locations of compressor units.
Figure 6B:
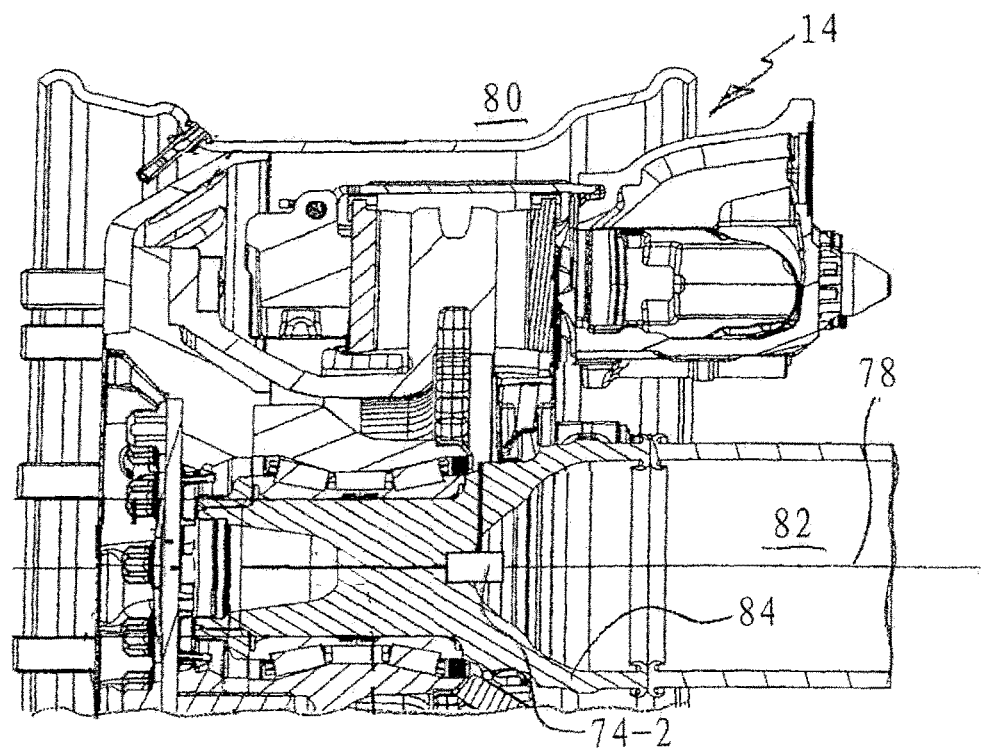
Figure 6C:
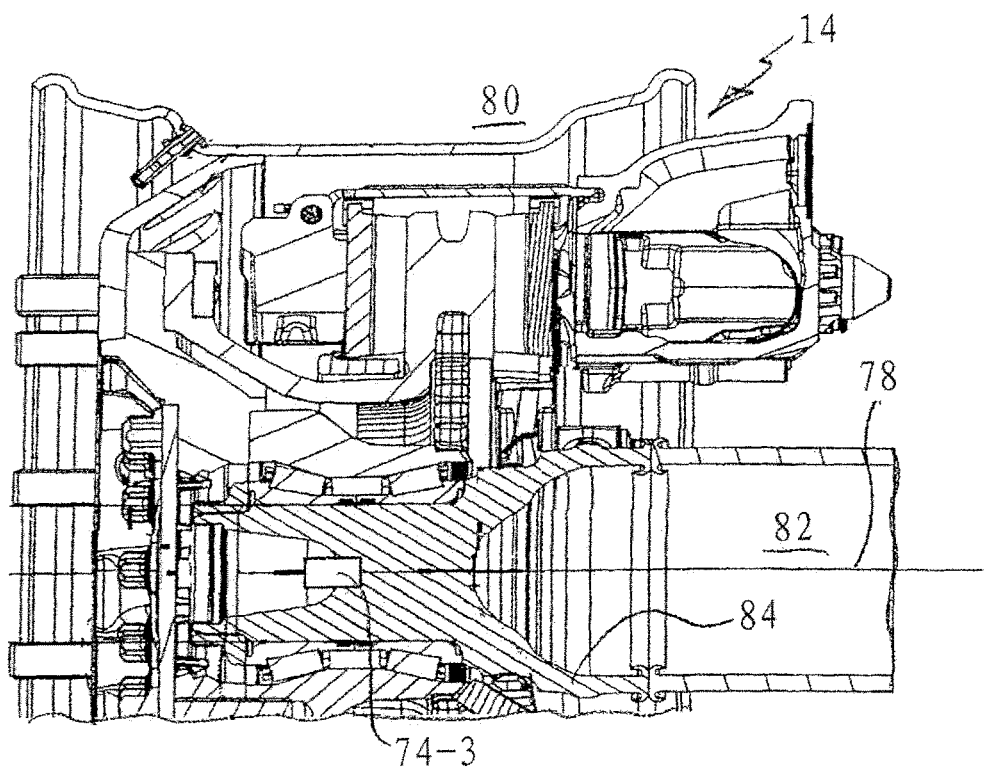
Figure 6D:
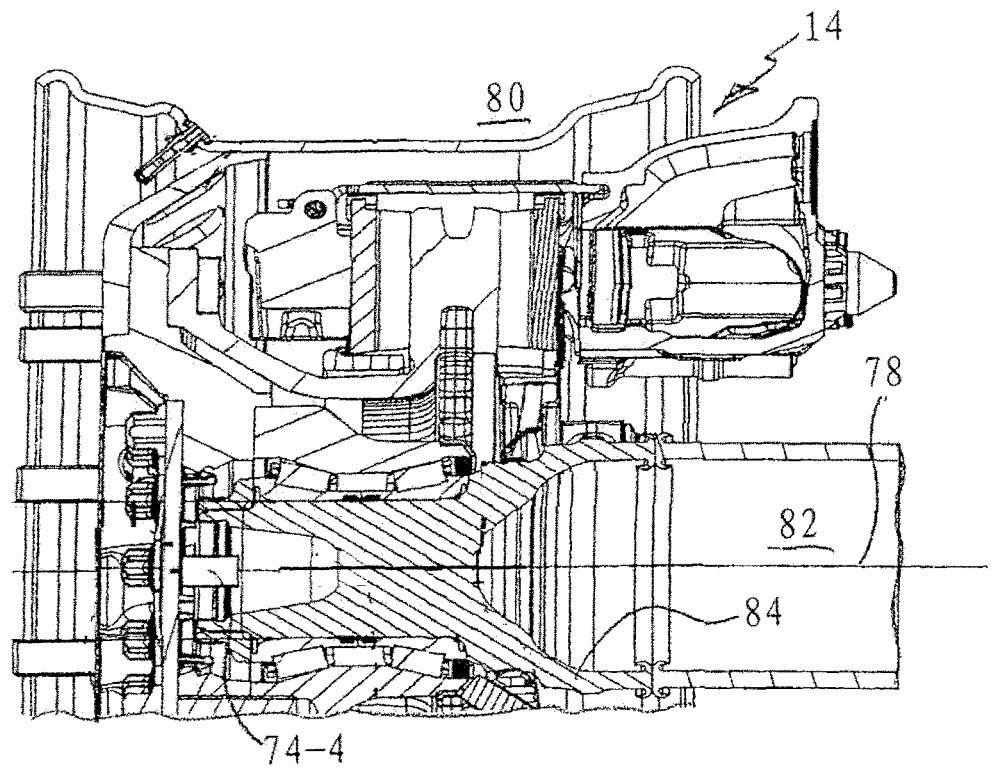
Figure 6E:
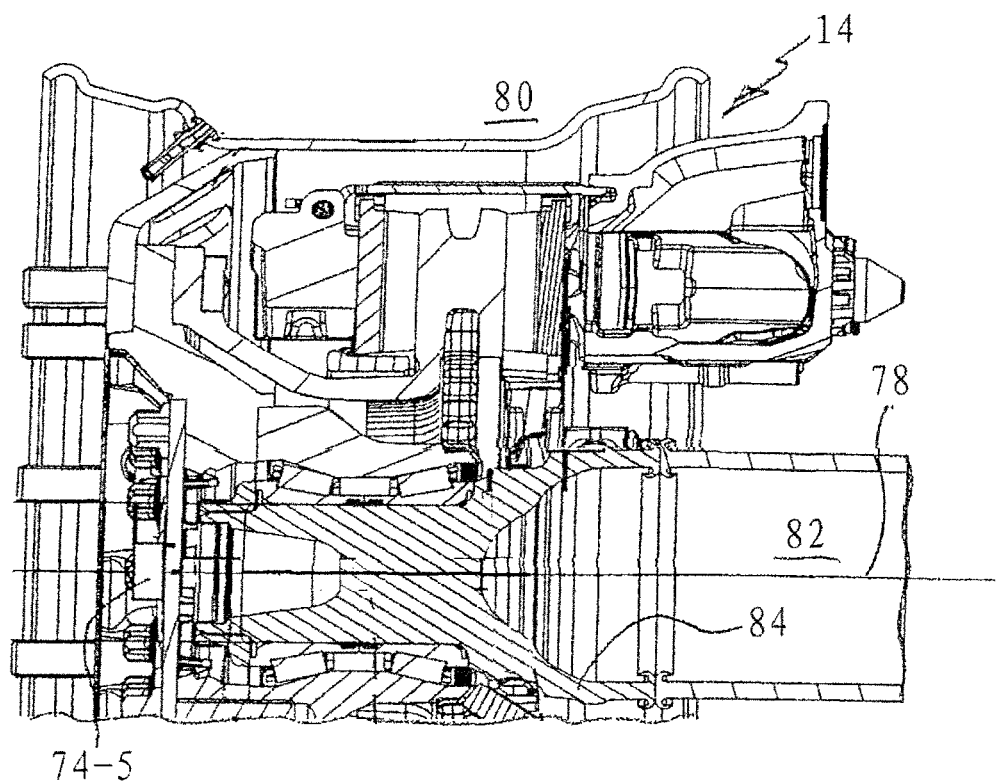
Figure 6F:
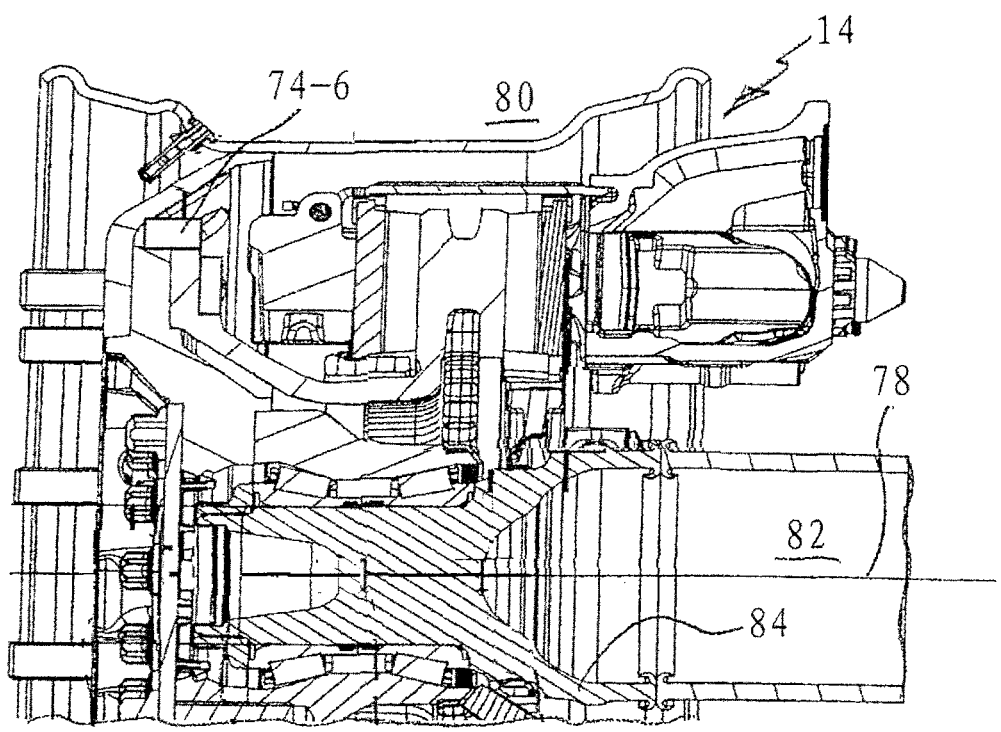
Figure 6G:
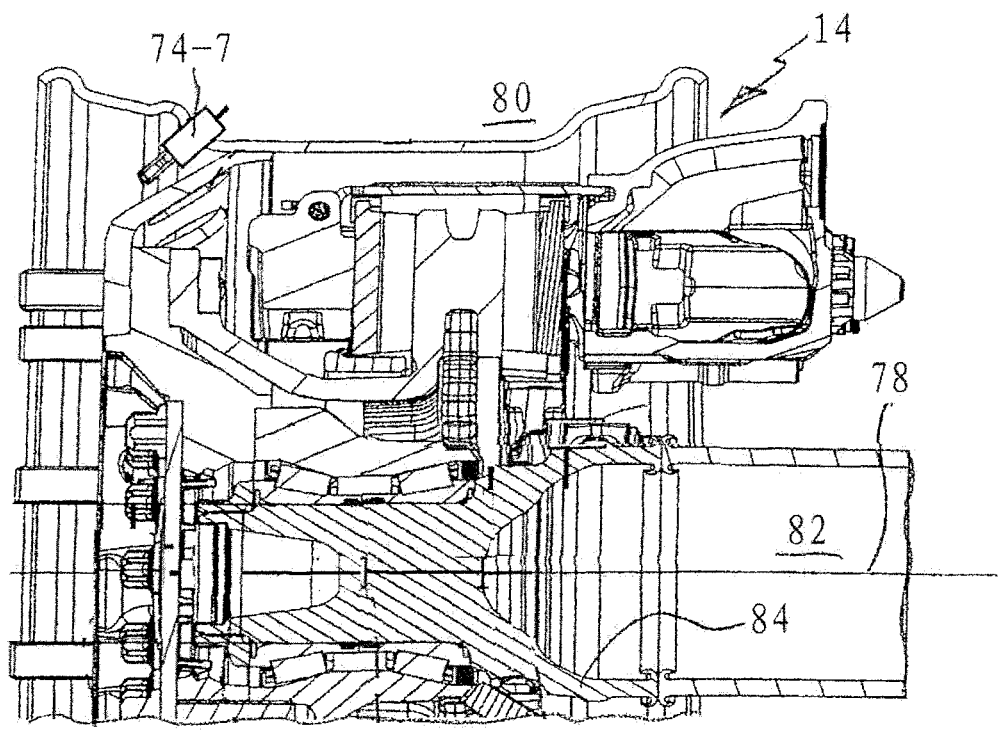
Figure 6H:
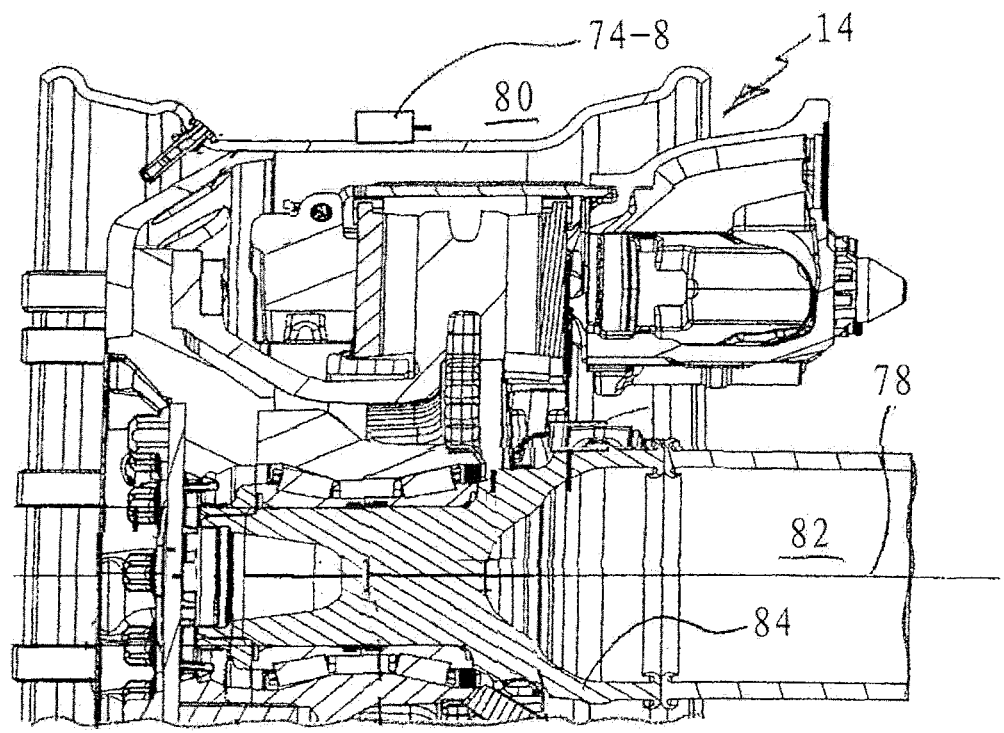
Figure 7A:
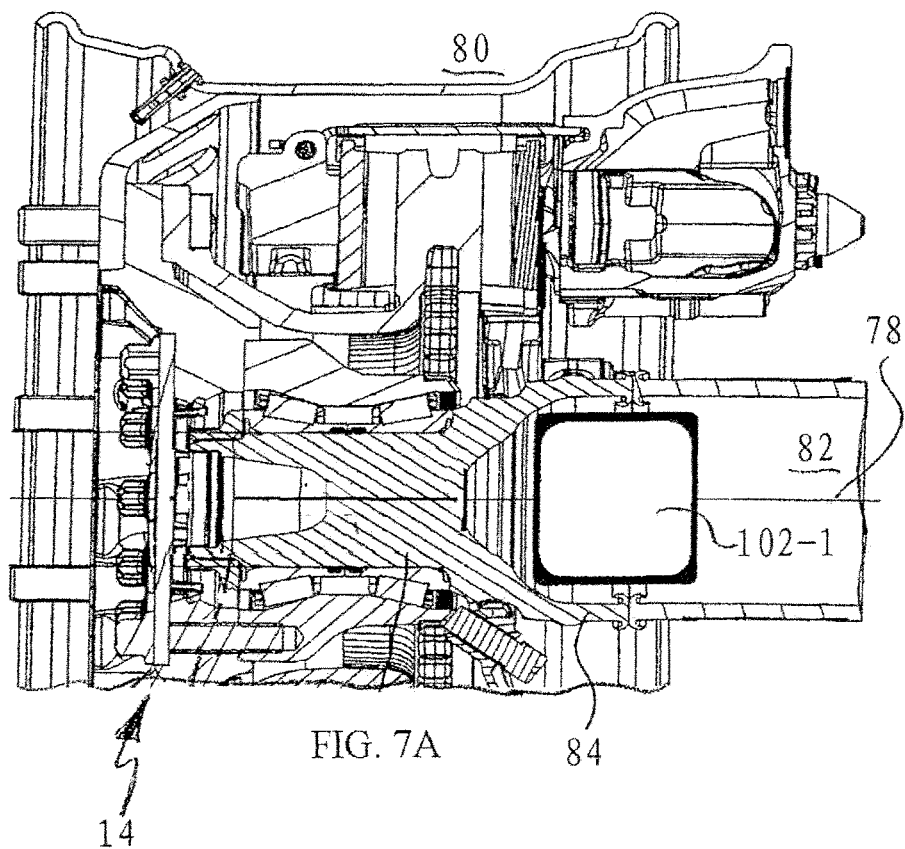
FIGS. 7A-D each show a sectional view of a wheel unit showing possible installation locations of buffer units for energy storage.
Figure 7B:
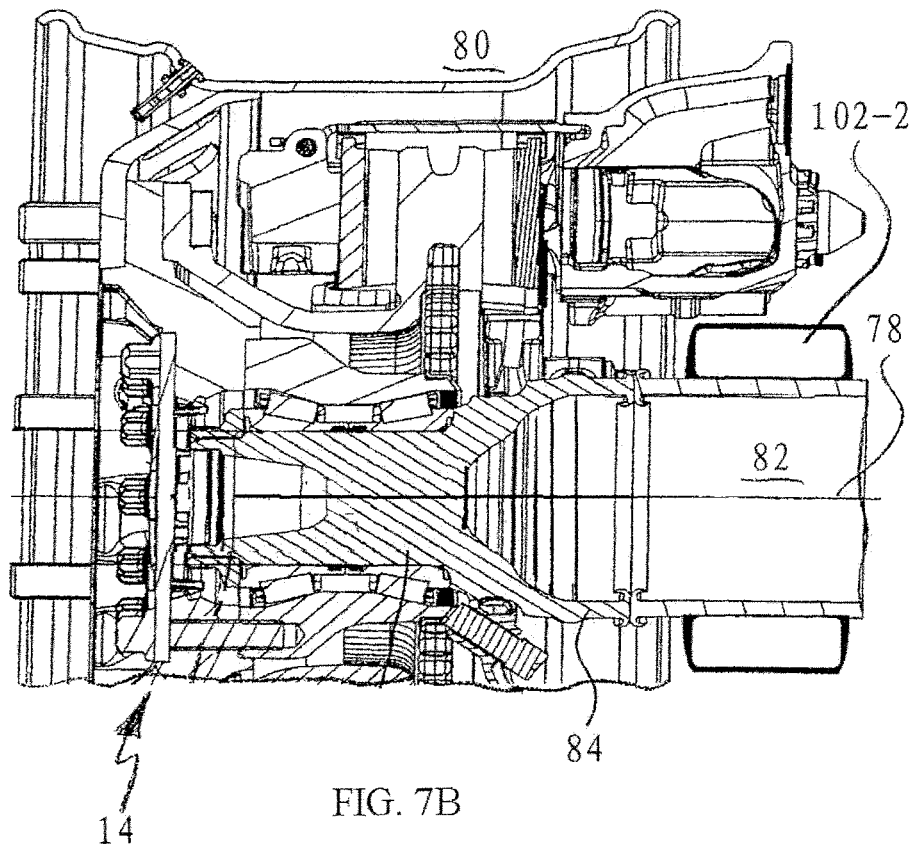
Figure 7C:
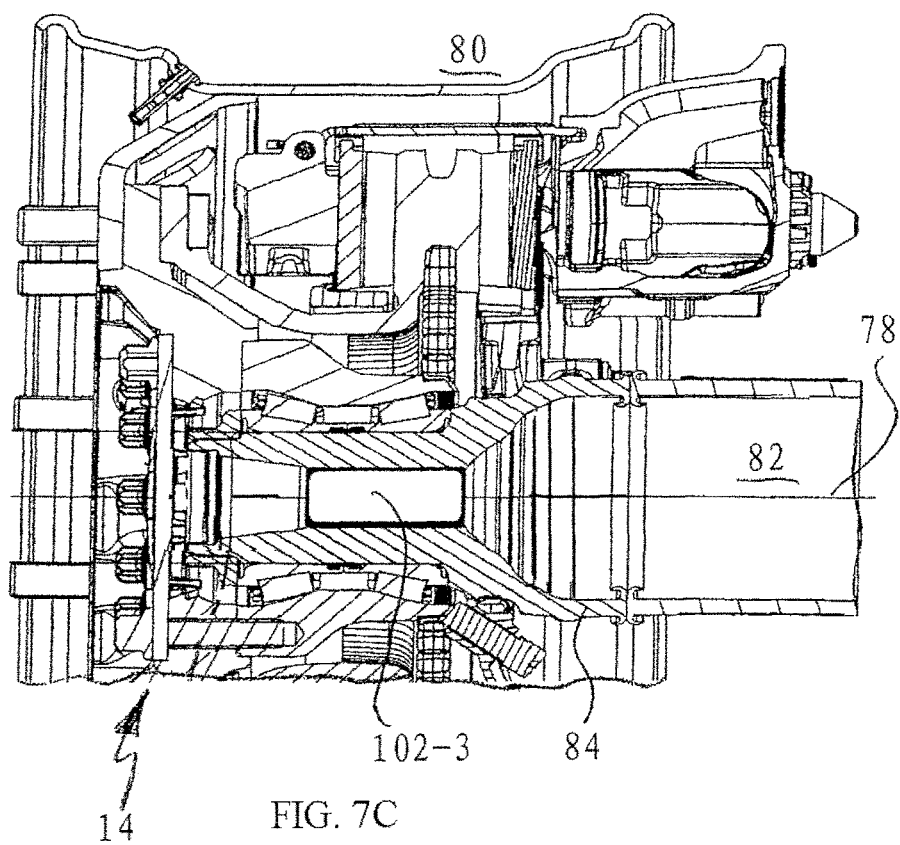
Figure 7D:
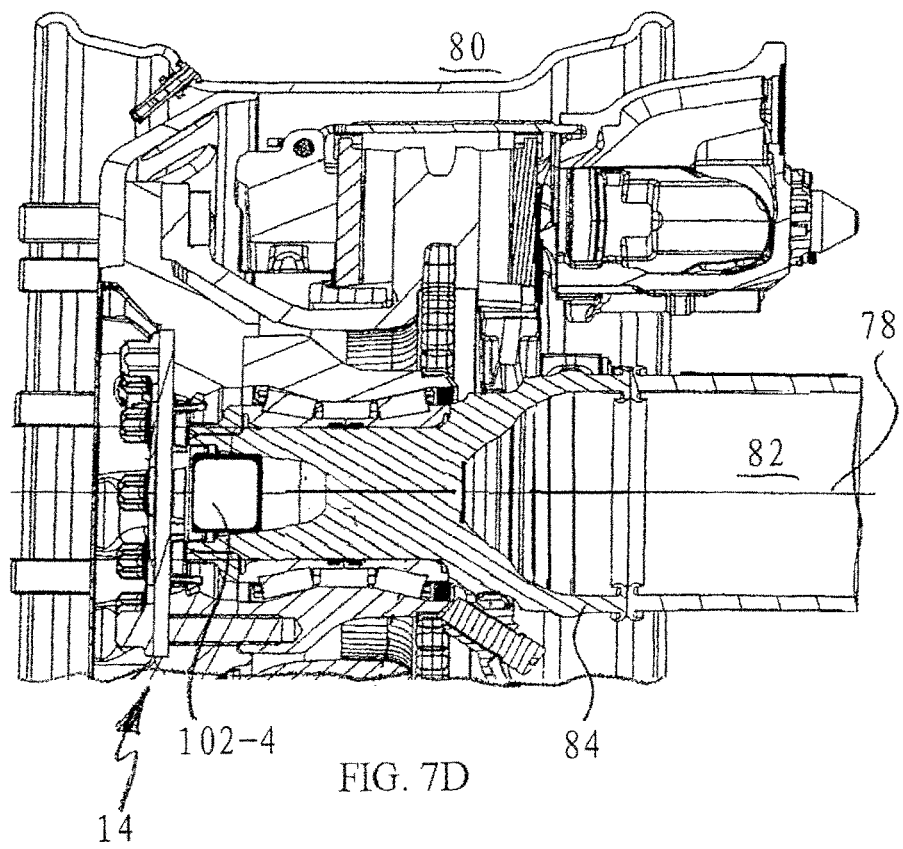

FIGS. 6A-6H show sample placements of the compressor unit 74. Basically, it can include a placement on the support side 82, see the compressor units 74-1 (FIG. 6A), 74-2 (FIG. 6B), and 74-3 (FIG. 6C). Alternatively, the compressor units 74 can also be positioned on the wheel body side 80, see reference numerals 74-4 (FIG. 6D), 74-5 (FIG. 6E), 74-6 (FIG. 6F), 74-7 (FIG. 6G), and 74-8 (FIG. 6H). In particular, a placement on the rim well of the rim body 92, i.e. "in" the tire, is also conceivable. This can further reduce the required line distances, also see reference numerals 74-7 and 74-8. The compressor units 74-2, 74-3, 74-4, and 74-5 are positioned coaxial to the axle 78. The compressor unit 74-6, 74-7, and 74-8 are offset from the axle 78, in particular are offset eccentrically relative to it.

FIGS. 7A-7D shows various possibilities for the placement of buffer units 102. In particular, the buffer units can be embodied in the form of battery units or capacitor units and are coupled to the compressor unit 74. In particular, the buffer units 102 can drive a motor of the compressor unit 74, which can drive a compressor. Reference numeral 102-1 (FIG. 7A) indicates a placement of a buffer unit in the axle body 84. Reference numerals 102-3 (FIG. 7C) and 102-4 (FIG. 7D) also indicate such a placement. Reference numeral 102-2 (FIG. 7B) indicates another placement of the buffer unit on the support side. The buffer unit 102-2, however, is accommodated on the outside of the axle body 84. In particular, a plurality of buffer units 102-2 can be accommodated with an angular offset from one another on the axle body 84. Basically, it can be preferable for the buffer units 102 to be accommodated on the axle body 84, i.e. on the support side 82. There are also conceivable embodiments, however, in which the buffer units 102 are also accommodated on the wheel body side 80.

Figure 8:
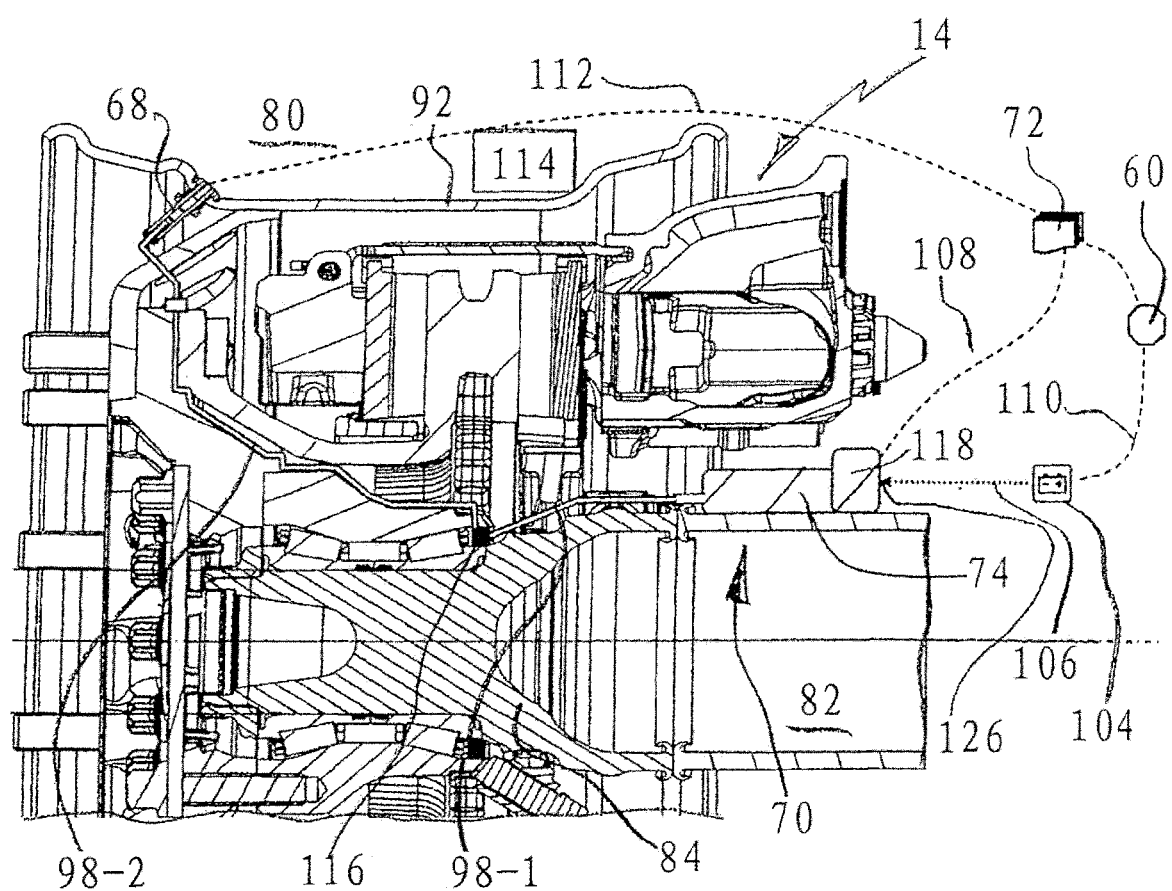
FIG. 8 is a sectional view of a wheel unit showing an exemplary embodiment of a pressurized medium supply device.

FIG. 8 shows a first embodiment of a decentralized pressurized medium supply device 70. The pressurized medium supply device 70 has a compressor 74 that is accommodated on the outside of the axle body 84. The compressor 74 is connected to the valve 68 via a pressurized medium path 98. The compressor 74 can have a buffer unit 102 (no longer shown in FIG. 8). The compressor 74 can be associated with a motor 118. The motor 118 can drive the compressor 74. The compressor 74 can be coupled to an energy supply unit 104. This can, for example, be the onboard electrical system of the vehicle. The energy supply unit 104 can be connected to the compressor 74 via an energy supply path 106. For this purpose, the compressor 74 can be provided with a supply connection 126. The compressor 74 can also be coupled via a control line 108 to a control element 72 or to a control unit 70. The control unit 70 can be coupled via other lines 110, 112 to other components of the wheel unit 14. For example, the control unit 60 can be coupled via a control line 110 to the energy supply unit 104 in order to communicate with the latter. It is also conceivable for the valve 68 and in particular a pressure sensor 114 on the rim side, to be connected via a message line 112 to the control element 72 or the control unit 60. Naturally, at least the lines 108, 110, and 112 are basically embodied as wired connections, but can alternatively be at least partially embodied as wireless.

The energy supply via the energy supply path 106 can basically occur by wire or conductor. It is also conceivable, however, for a contactless energy transmission to be provided at least in some parts of the energy supply path 106.

The pressurized medium supply device 70 also has a rotary/stationary transition 116, which in the present instance is provided, for example, in the pressurized medium path 98. A first section 98-1 of the pressurized medium path is thus positioned on the support side 82. A second section 98-2 of the pressurized medium supply paths is positioned on the wheel body side 80.

The embodiments of the pressurized medium supply device 70 disclosed below in conjunction with FIGS. 9 through 29b can be similar in design to the embodiment according to FIG. 8. In particular, this can involve the communication and data exchange with the control unit 60 and the control element 72. In many of the embodiments explained below, it is also conceivable to provide an energy supply path 106 that can be connected to an energy supply unit 104. For this reason, the above-described components are not necessarily discussed in detail.

Figure 9:
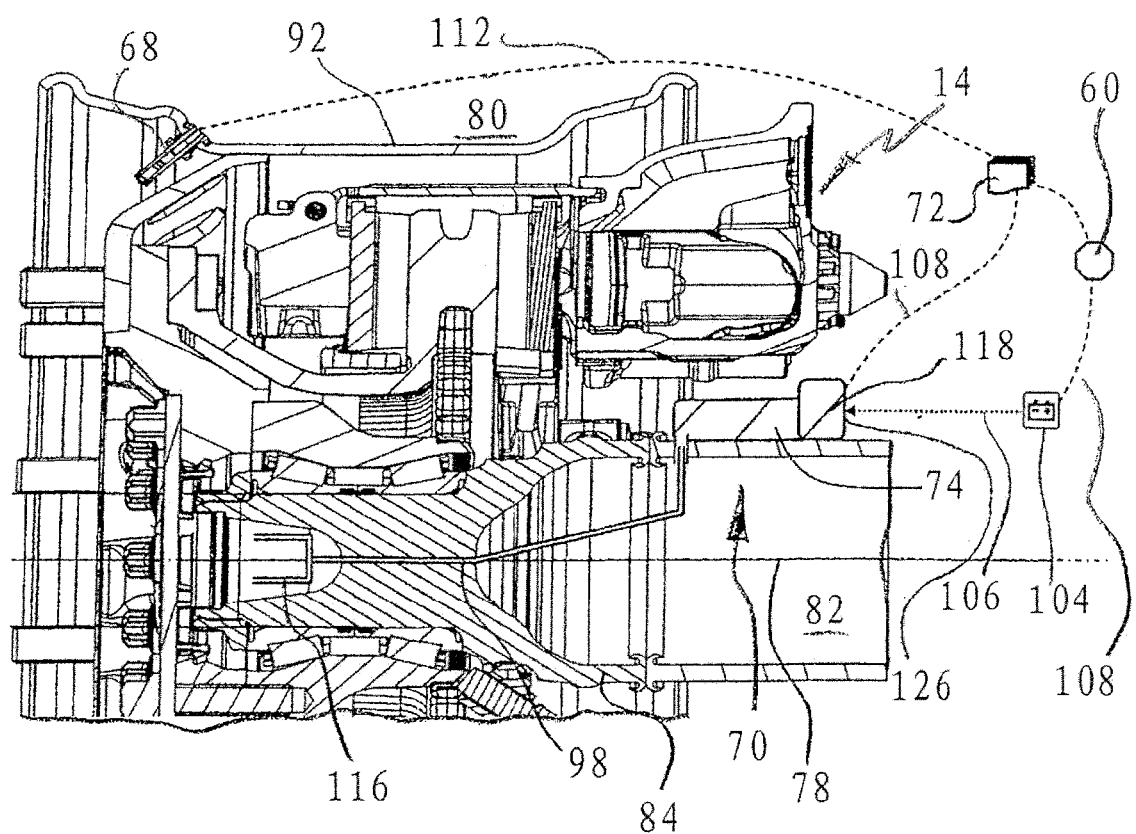
FIG. 9 is a sectional view of a wheel unit showing another embodiment of a pressurized medium supply device.

FIG. 9 shows an alternative embodiment of a pressurized medium supply device 70. The compressor unit 74 is placed on the outside of the axle body 84. From there, the pressurized medium path 98 is first routed toward the axle 78 and feeds into a rotary/stationary transition 116 at an axial end of the axle body 84. The remainder of the course of the pressurized medium path 98 can be embodied, for example, in accordance with that of FIG. 4 or 5.

Figure 10:
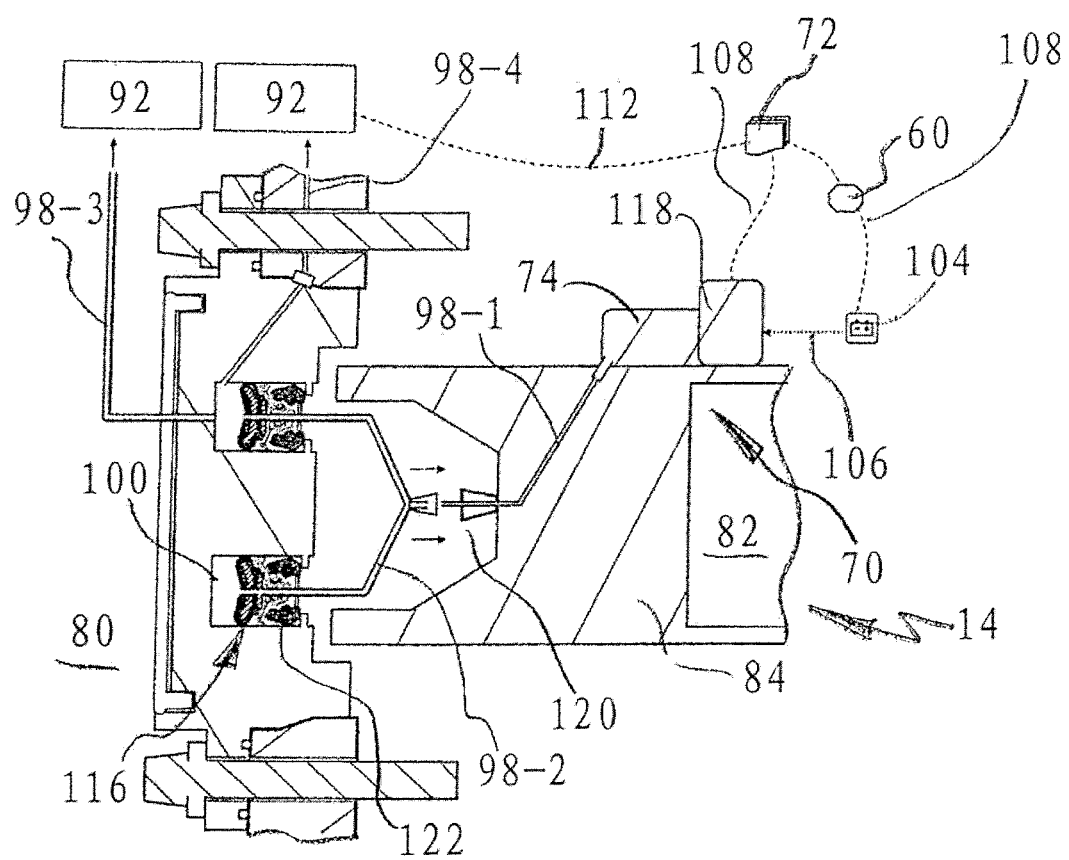
FIG. 10 is a highly simplified sectional view of a wheel unit showing another embodiment of a pressurized medium supply device.

FIG. 10 shows another embodiment of another pressurized medium supply device 70. The figure shows the design of the rotary/stationary transition 116 in greater detail. The pressurized medium path 98 has a first section 98-1, which feeds into an axial coupling valve 120 at an axial end of the axle body 84. The coupling valve 120 can be adjoined by a section 98-2, which is associated with a rotary feed-through. This can occur, for example, by means of a seal 122 that permits at least the pressurized medium path 98-2 to pass through. The seal 122 can be referred to as a support side-mounted seal 122. The seal can seal a circumferential gap 100 so that it allows only the pressurized medium path 98-2 to flow through. The gap 100 can be alternatively adjoined by the sections 98-3 and 98-4 of the pressurized medium path, which can feed into the rim body 92.

Figure 11:
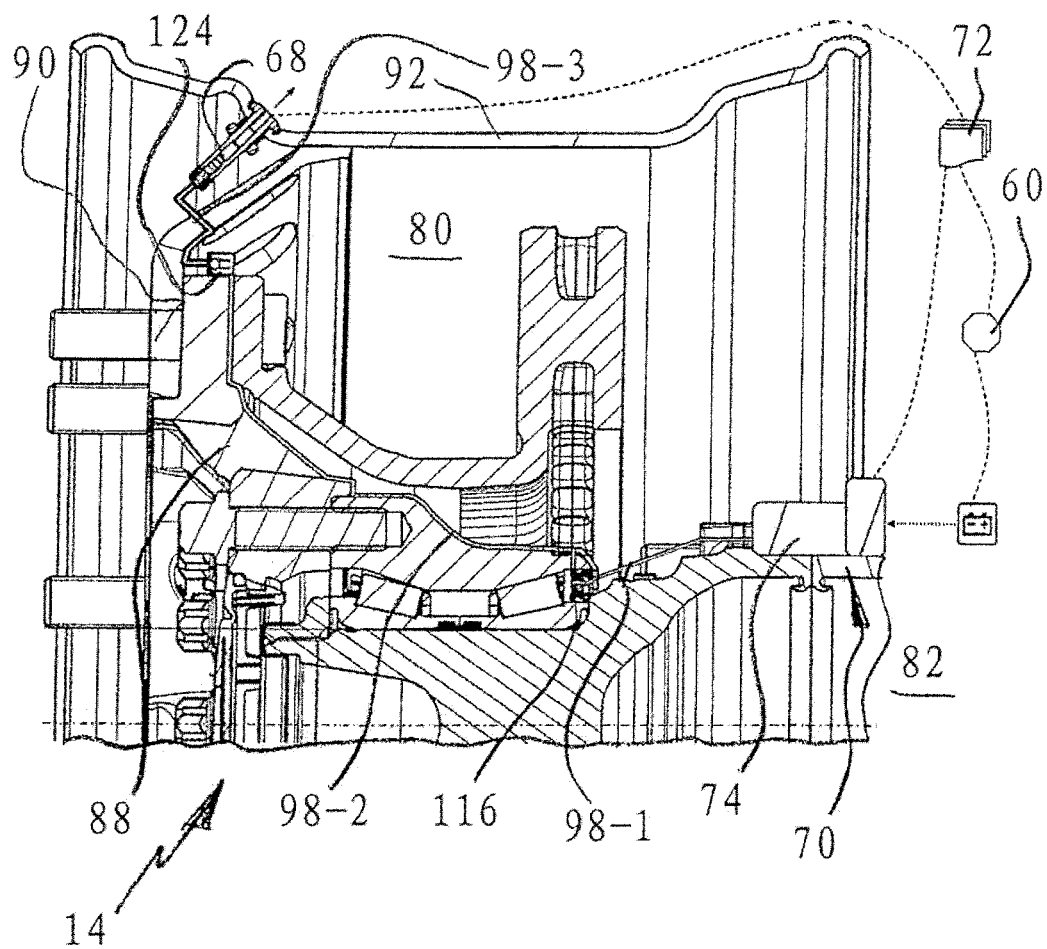
FIG. 11 is a sectional view of a wheel unit showing another embodiment of a pressurized medium supply device.

FIG. 11 shows another embodiment of a pressurized medium supply device 70. The compressor unit 74 is positioned on the outside of the axle body 84. The pressurized medium path 98 is routed toward the valve 68. The pressurized medium path 98 has different sections 98-1, 98-2, and 98-3. A rotary/stationary transition 116 is positioned between the sections 98-1 and 98-2. This transition can, for example, include an embodiment with the seal 122 according to FIG. 10. An eccentrically placed coupling valve 124 can be positioned between the sections 98-2 and 98-3. The coupling valve 124 can make it easier to change the tire 16 or rim body 92. If the rim body 92 is removed from the wheel mount 90, then the coupling valve 124 can close to prevent dirt from getting into the pressurized medium path 98.

Figure 12:
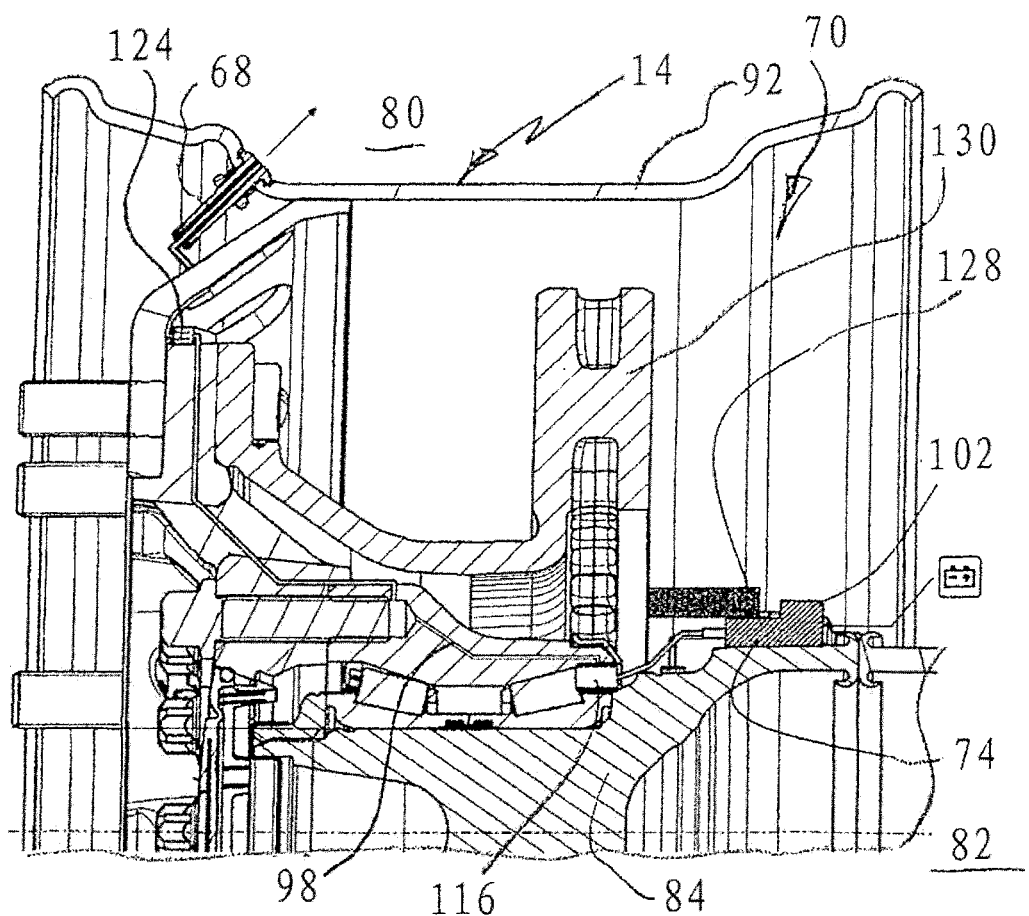
FIG. 12 is a sectional view of a wheel unit showing another embodiment of a pressurized medium supply device.

FIG. 12 shows another embodiment of a pressurized medium supply device 70. In its fundamental design, the pressurized medium supply device 70 can be embodied so that it is basically similar to the design according to FIG. 11. The pressurized medium supply device 70, however, can also be connected to a device for generating energy. For example, the wheel body side 80 can be embodied with a brake rotor 130, which is able to rotate together with the rim body 92 relative to the axle body 84. The brake rotor 130 can be provided with a rotor 128, which is able to rotate relative to a counterpart (such as a stator) on the compressor 74. For example, both the rotor 128 and the compressor unit 74 can be embodied as rotationally symmetrical and are embodied in an annular form. In other words, in this embodiment, a generator is provided, which can produce electrical energy, for example, during operation, i.e. during driving, in order to charge the buffer unit 102, for example.

Figure 13:
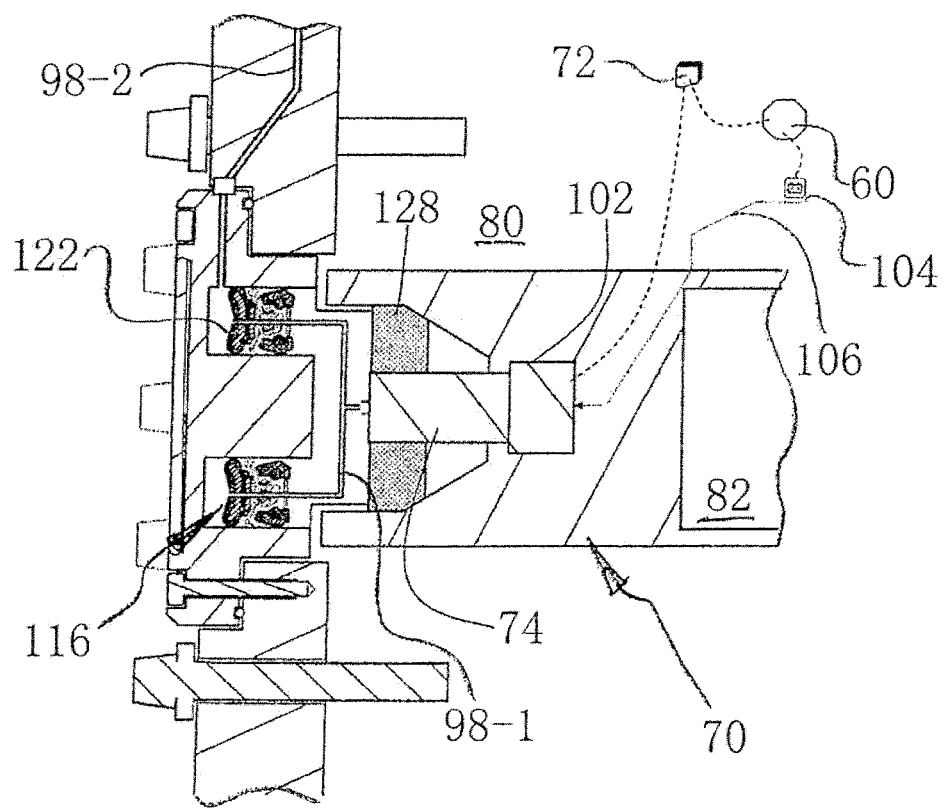
FIG. 13 is a highly simplified sectional view of a wheel unit showing another embodiment of a pressurized medium supply device.

FIG. 13 shows an alternative embodiment of a pressurized medium supply unit 70, which is embodied in a way that is similar to the designs according to FIGS. 11 and 12. In the design according to FIG. 13, a rotor 128 is also provided, which is mounted on the wheel body side 80. The rotor 128 can rotate around the compressor 74 during driving. In this way, energy can be supplied, for example in order to charge the buffer unit 102.

Figure 14:
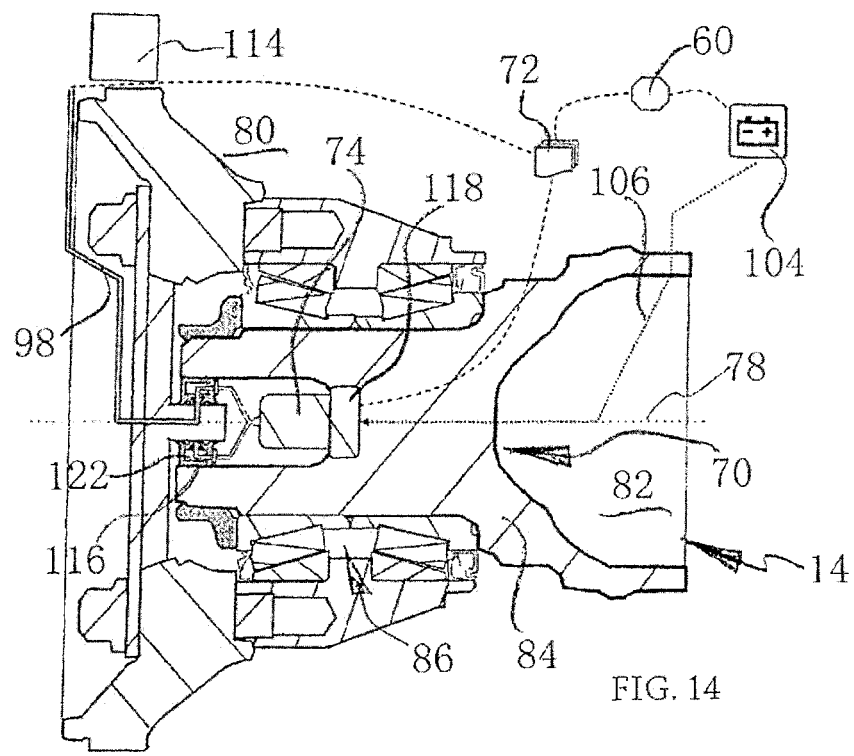
FIG. 14 is a highly simplified sectional view of a wheel unit showing another embodiment of a pressurized medium supply device.

FIG. 14 shows another embodiment of a pressurized medium supply device 70. This differs from some of the embodiments described above essentially in that the compressor 74, together with a motor that is associated with it, is positioned coaxially relative to the axle 78. The rotary/stationary transition 116 for the pressurized medium path 98 is implemented, for example, by means of a seal 122 with an associated annular gap 100.

Figure 15:
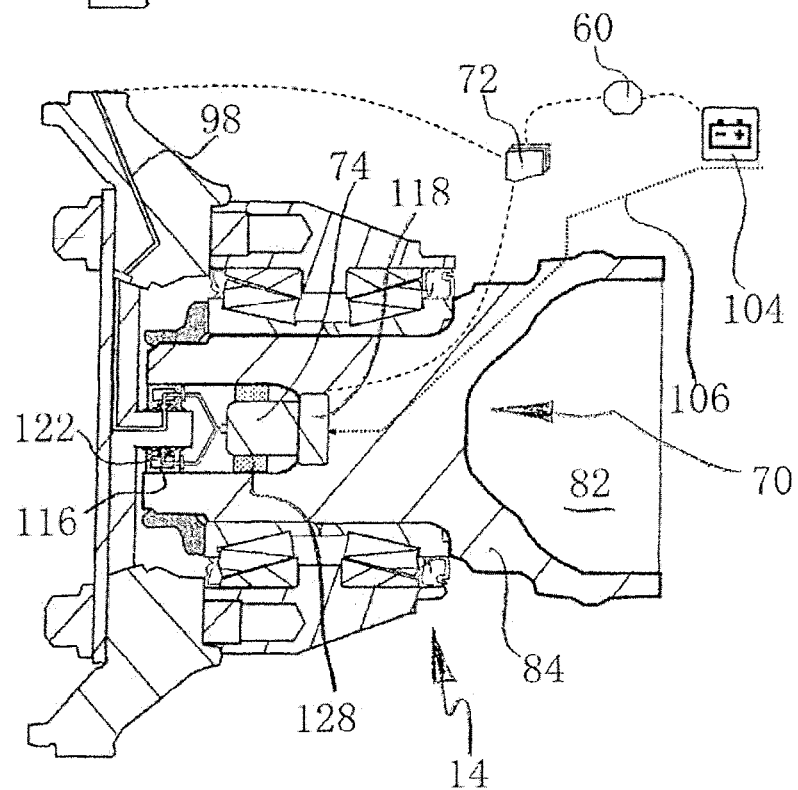
FIG. 15 is a highly simplified sectional view of another wheel unit showing another embodiment of a pressurized medium supply device.

FIG. 15 shows an embodiment of a pressurized medium supply device 70 that is very similar to the design according to FIG. 14. By contrast with the design according to FIG. 14, the pressurized medium supply device 70 in FIG. 15 also has a rotor 128 or a similar element for producing energy, which cooperates with the compressor or compressor unit 74. Another difference between the embodiments according to FIGS. 14 and 15 can lie in the routing of the pressurized medium paths 98. In FIG. 14, the pressurized medium path 98 is routed outside a hubcap in the direction toward the rim body 92. In the design according to the FIG. 15, the pressurized medium path 98 is routed from a hubcap in the direction toward the rim body 92.

Figure 16:
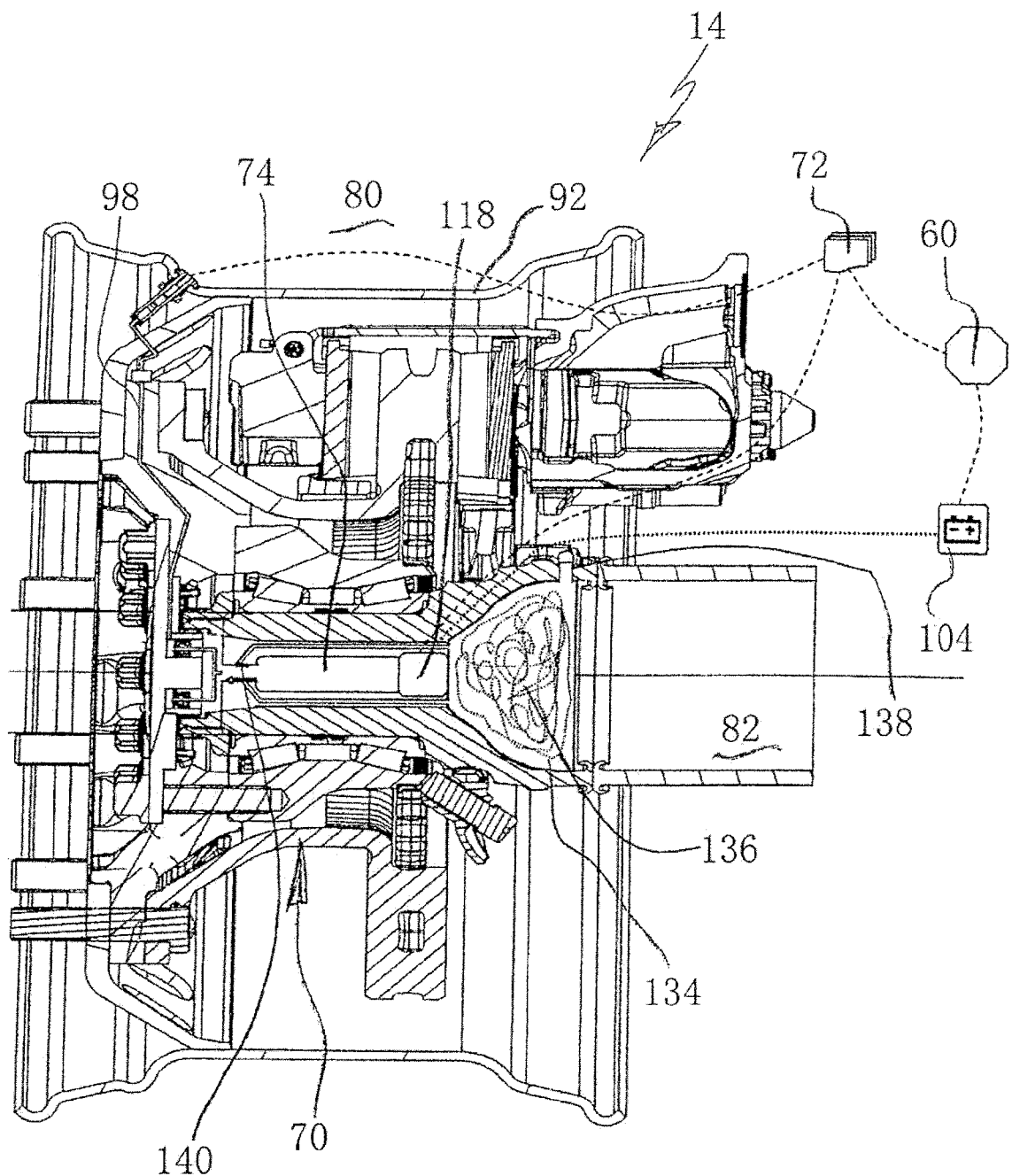
FIG. 16 is a sectional view of a wheel unit showing another embodiment of a pressurized medium supply device.
Figure 17:
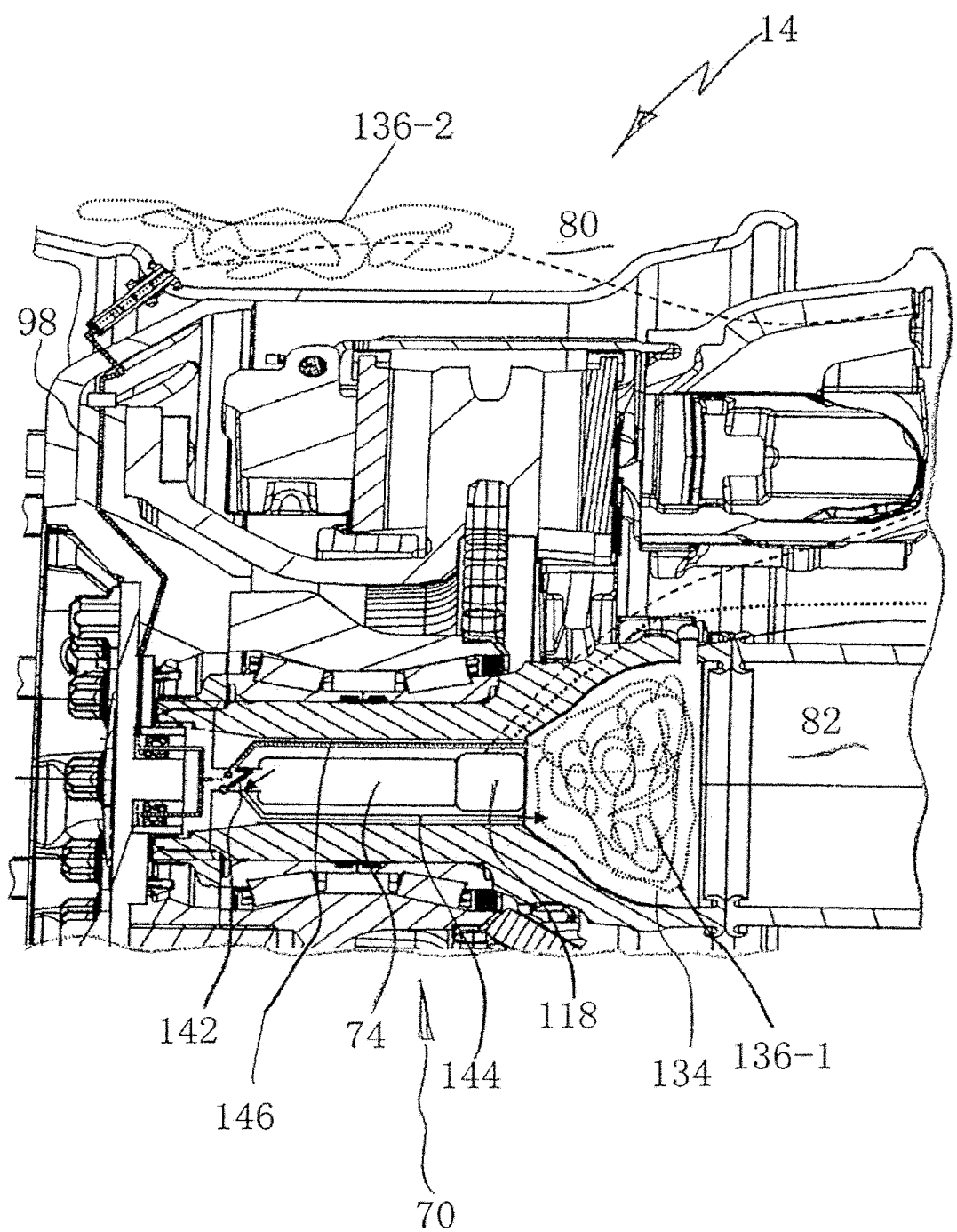
FIG. 17 is another sectional view of a wheel unit showing another embodiment of a pressurized medium supply device.

FIG. 16 shows another embodiment of a pressurized medium supply device 70. This design is distinguished essentially by the fact that in addition, a reservoir 134 for a tire sealant or sealant 136 is provided in the axle body 84. FIG. 17 shows a slightly enlarged depiction of this design. A valve arrangement 140 is provided to permit the reservoir 134 with the sealant 136 to be selectively triggered as needed. In this way, the sealant 136 can be introduced into the tire 16 by means of the pressurized medium path 98 in order to seal the tire, also see reference numerals 136-1, 136-2 in FIG. 17. The reservoir 134 also has a filling connection 138.

FIG. 16 shows the valve arrangement 140 in a closed or disconnected position. The compressor unit 74 then basically functions as a compressed air supply unit, without exerting pressure on the reservoir 134 containing the sealant 136. This can also be referred to as normal operation or normal compressed air regulating operation. But if a sudden pressure drop occurs or if damage to a tire is detected, then the valve arrangement 140 can be triggered. For example, an on/off valve 142 is provided for this purpose, also see FIG. 17. The on/off valve 142 can be switched and in this way, activates a propellant path 144. In other words, pressurized medium, which is supplied by the compressor or compressor unit 74, can be diverted. The pressurized medium flows through the propellant path 144 into the reservoir 134 and exerts pressure on the sealant 136. As a result, the sealant 136 is conveyed via the sealant path 146 in the direction toward the pressurized medium path 98 and finally into the tires 16.

Figure 18A:
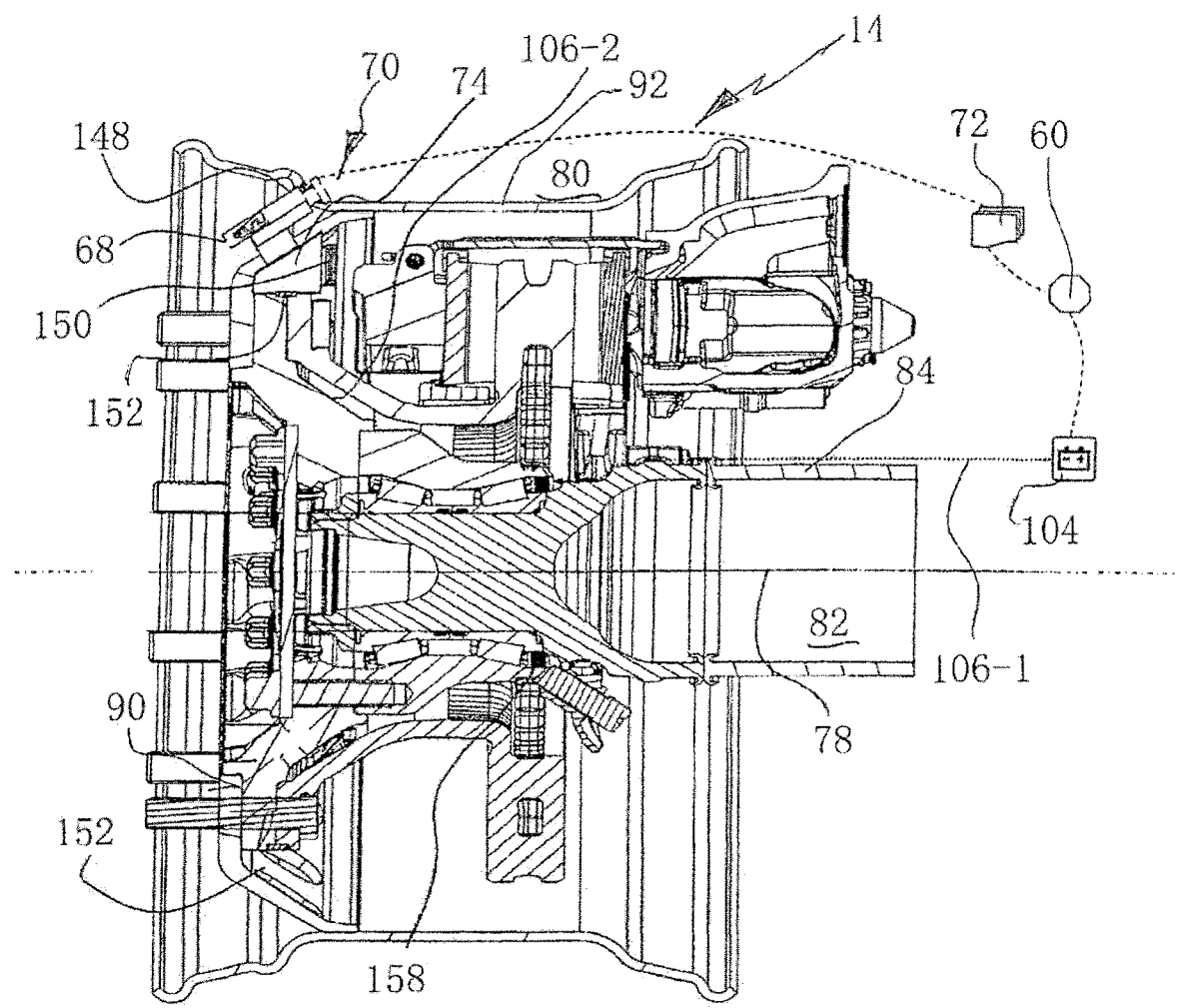
FIG. 18A is a sectional view of a wheel unit showing another embodiment of a pressurized medium supply device.
Figure 18B:
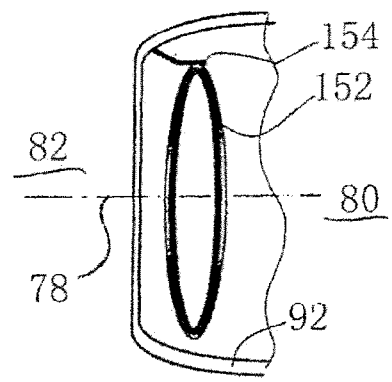
FIG. 18B is a schematic partial view of a sliding contact of the pressurized medium supply device according to FIG. 18A.

FIG. 18A shows another alternative embodiment of a pressurized medium supply device 70. In this embodiment, the compressor unit 74 is mounted to the rim body 92 or to its wheel flange 94. In this way, a required pressurized medium path 98 can be embodied as especially short. In particular, the compressor unit 74 can be coupled via a valve connection 148 parallel to the valve 68 or its socket. In this way, the valve 68 is once again accessible for external pressure regulating procedures. The compressor unit 74 can aspirate air via a suction opening 150 and compress it. The suction opening 150 can also be used for cooling purposes. The compressor unit 74 can be provided with an electric motor (not shown in detail in FIG. 18A).

To supply energy to the compressor unit 74, the latter is connected to an energy supply unit 104 via the energy supply path 106. The energy supply path 106 can have two sections 106-1 and 106-2. The section 106-1 is associated with the support side 82. The section 106-2 is associated with the wheel body side 80. The contact between the support side 82 and the wheel body side 80 can be produced by means of a rotary/stationary transition 158. This can, for example, include a slip ring contact. Another contact, which is embodied in the form of a ring contact (reference numeral 152), is provided for contacting the compressor unit 74, also see FIG. 18B in this regard. It is advantageous to embody the contact 152 in the form of a circumferential ring contact. In this way, the rim body 92 can be fastened to the wheel mount 90 in any (rotational) orientation. A contact element or contact spring 154 can then contact the annular contact 152.

Figure 19:
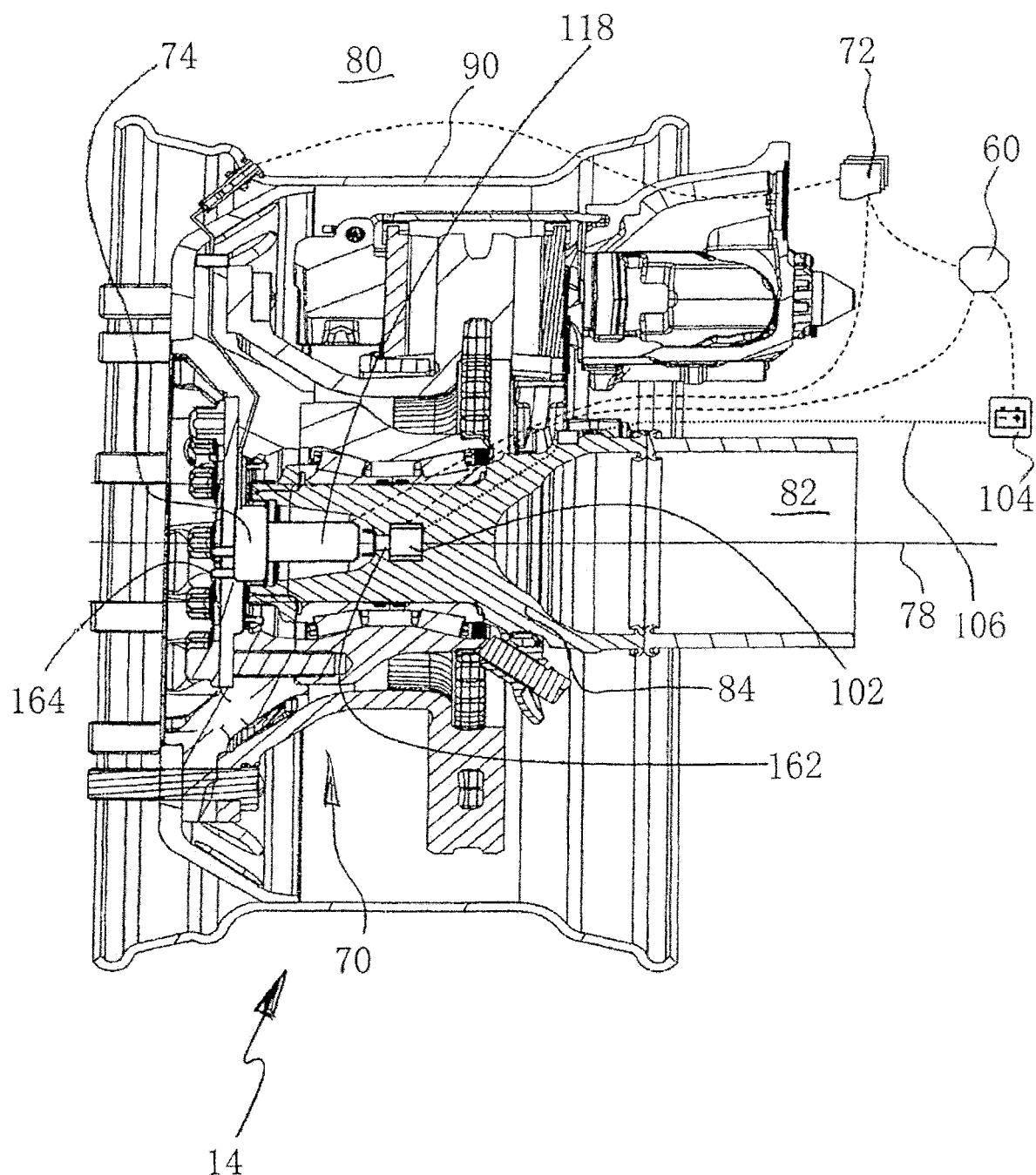
FIG. 19 is a sectional view of a wheel unit showing another embodiment of a pressurized medium supply device.

FIG. 19 shows another embodiment of a pressurized medium supply device 70. The compressor unit 74 is positioned coaxially relative to the axle 78 and is mounted to the wheel body side 80. As a result, the compressor unit 74 rotates together with the wheel body side 80 relative to the support side 82. A contacting of the compressor unit 74, in particular of a motor 118 that is associated with the latter, can be produced by means of an actuator 162, which includes a servomotor, for example. A contacting can, for example, be produced by means of slip rings or in a similar way. For example, the contacting can produce a contact with a buffer unit 102. This design has the essential advantage that a contact is produced only when the energy is needed, for example when an air pressure regulating procedure is initiated. In this way, the wear on the contact elements can be kept within limits. The compressor unit 74 can also be coupled to an external energy supply via an external connection 164. In this way, it is possible to achieve an emergency operation of the compressor unit 74 and pressurized medium supply device 70.

Figure 20:
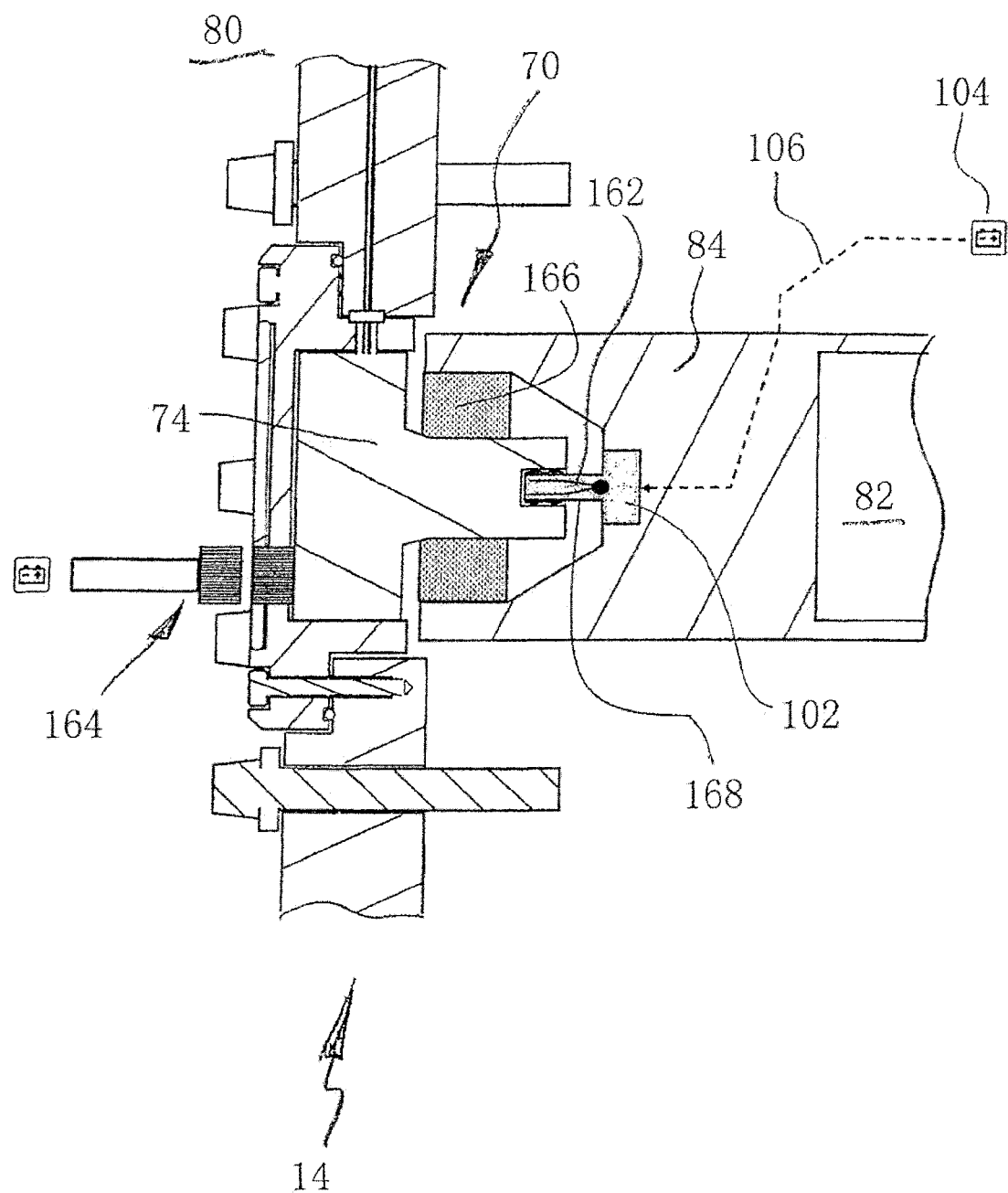
FIG. 20 is a highly simplified sectional view of a wheel unit showing another embodiment of a pressurized medium supply device.

FIG. 20 shows another embodiment of a pressurized medium supply device 70. The compressor unit 74 is accommodated on the wheel body side 80 and is able to rotate relative to the support side 82. On the support side 82, a stator 166 is accommodated on the axle body 84 and can cooperate with the compressor unit 74 (which is then functioning as a rotor) in generator fashion in order to produce energy. In addition, the compressor unit 74 can also be selectively activated or deactivated by means of an actuator 162, which can cause contact elements 168 to engage with or disengage from the compressor unit 74. The external connection 164 can, for example, contact the energy supply by means of an external connecting cable.

Figure 21A:
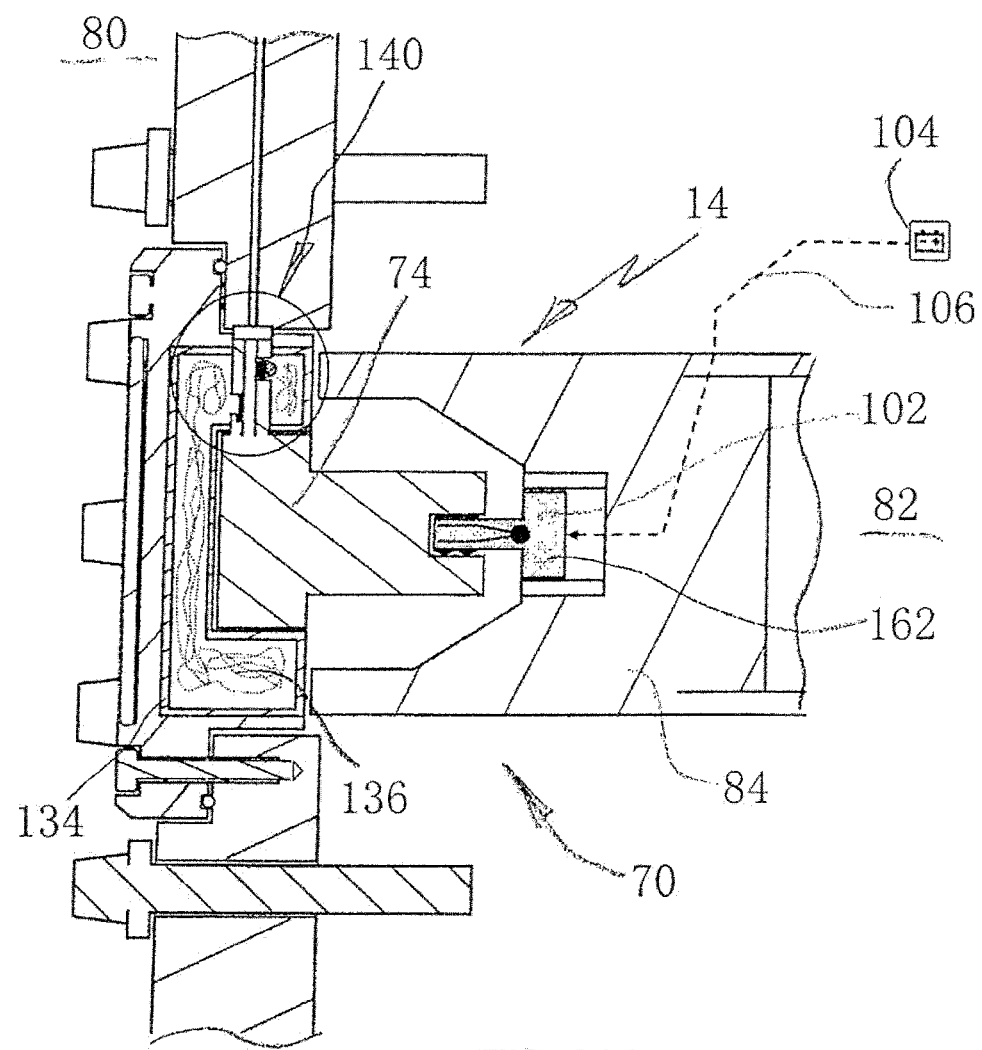
FIG. 21A is a highly simplified sectional view of a wheel unit showing another embodiment of a pressurized medium supply device.
Figure 21B:
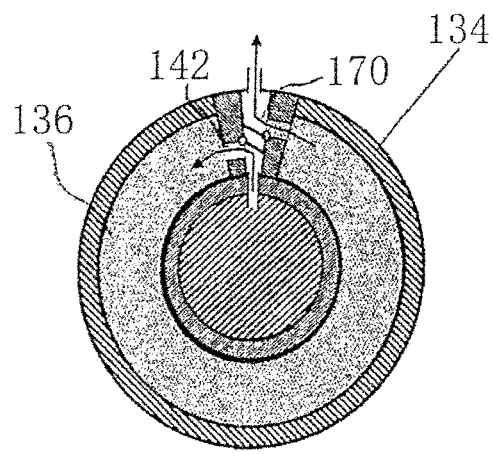
FIGS. 21B and 21C are highly simplified axial sections through a reservoir according to FIG. 21A containing a sealant, shown in an open position (FIG. 21B) and a closed position (FIG. 21C)
Figure 21C:
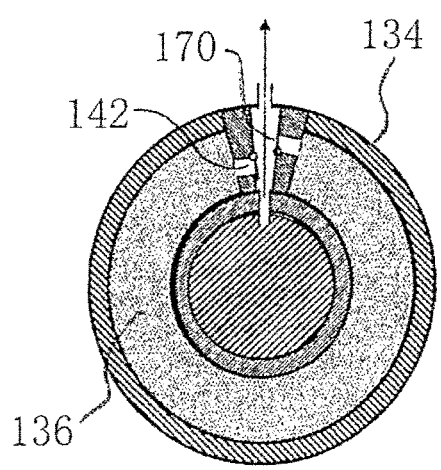

FIG. 21A shows another embodiment of a pressurized medium supply device 70 in which the compressor unit 74 is accommodated on the wheel body side 80. The (selective) contacting and activation can, for example, be carried out in accordance with FIG. 20. The compressor unit 74 is also associated with a reservoir 134 for a sealant 136, which is likewise positioned on the wheel body side 80. FIGS. 21a, 21b, and 21c show a valve arrangement 140 for selectively controlling and activating the reservoir 134 with the sealant 136. The valve arrangement 140 can be provided with an on/off valve 142 and a release valve 170. The on/off valve 142 can be activated if a supply of sealant 136 into the tire 16 is desired. FIG. 21B depicts such an active state. FIG. 21C shows a deactivated state, which is equivalent to the normal state. In the activated state, the on/off valve 142 diverts the pressurized medium into the reservoir in order to exert pressure on the sealant 136 and convey it through the valve 170 in the direction toward the pressurized medium path 98 and the tire 16.

Figure 22:
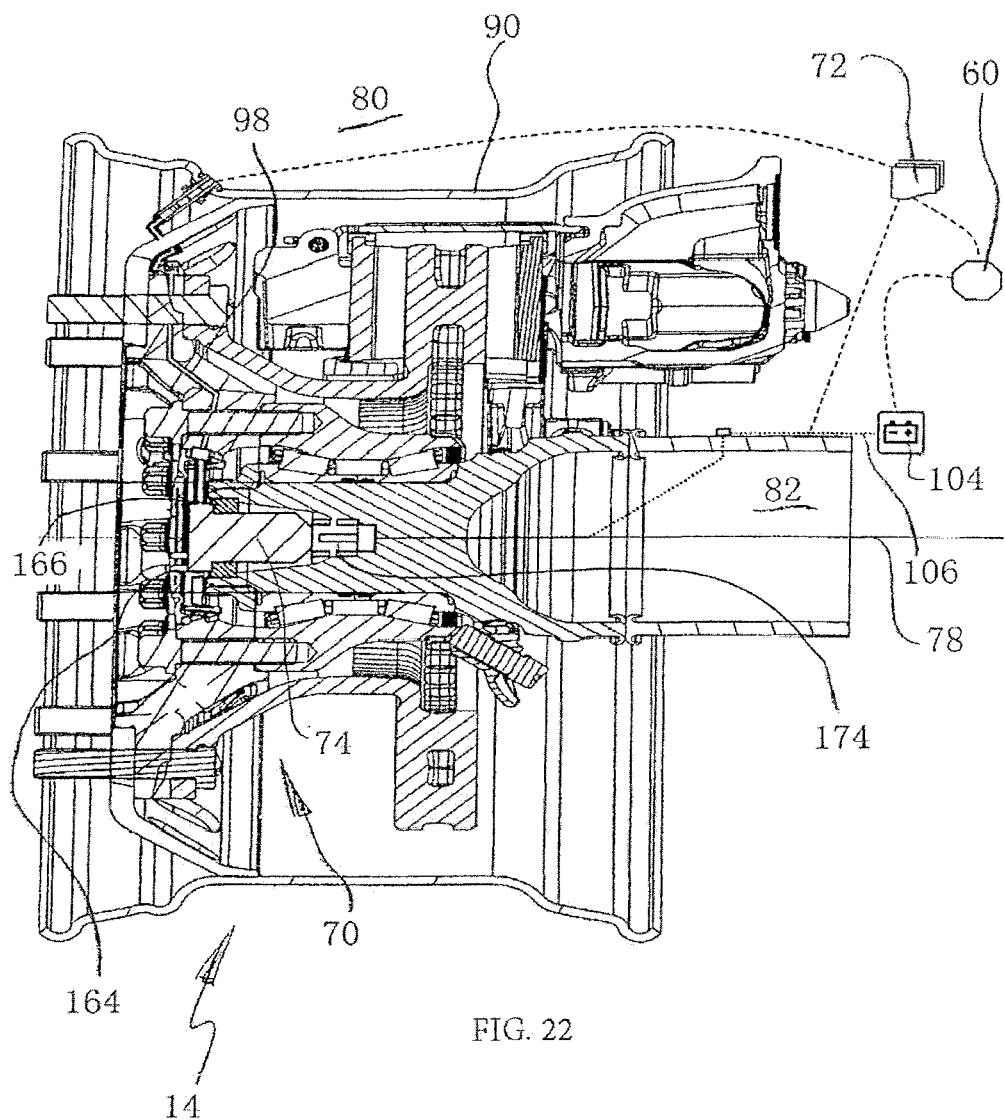
FIG. 22 is a sectional view of a wheel unit showing another embodiment of a pressurized medium supply device.

FIG. 22 shows another embodiment of a pressurized medium supply device 70. The pressurized medium supply device 70 has a particularly embodied rotary/stationary transition, which is embodied in the form of a contactless contact 174. In other words, the contact can be embodied for contactless energy transmission. This can occur, for example, in an inductive, capacitive, or electromagnetic fashion. In this way, there are no parts that are in direct (mechanical) contact with one another in the rotary/stationary transition. This can have an advantageous impact on the wear behavior. The compressor unit 74 is also associated with a stator 166 on the support side by means of which energy can be produced during operation. Finally, the pressurized medium supply device 70 also has an external connection 164.

Figure 23:
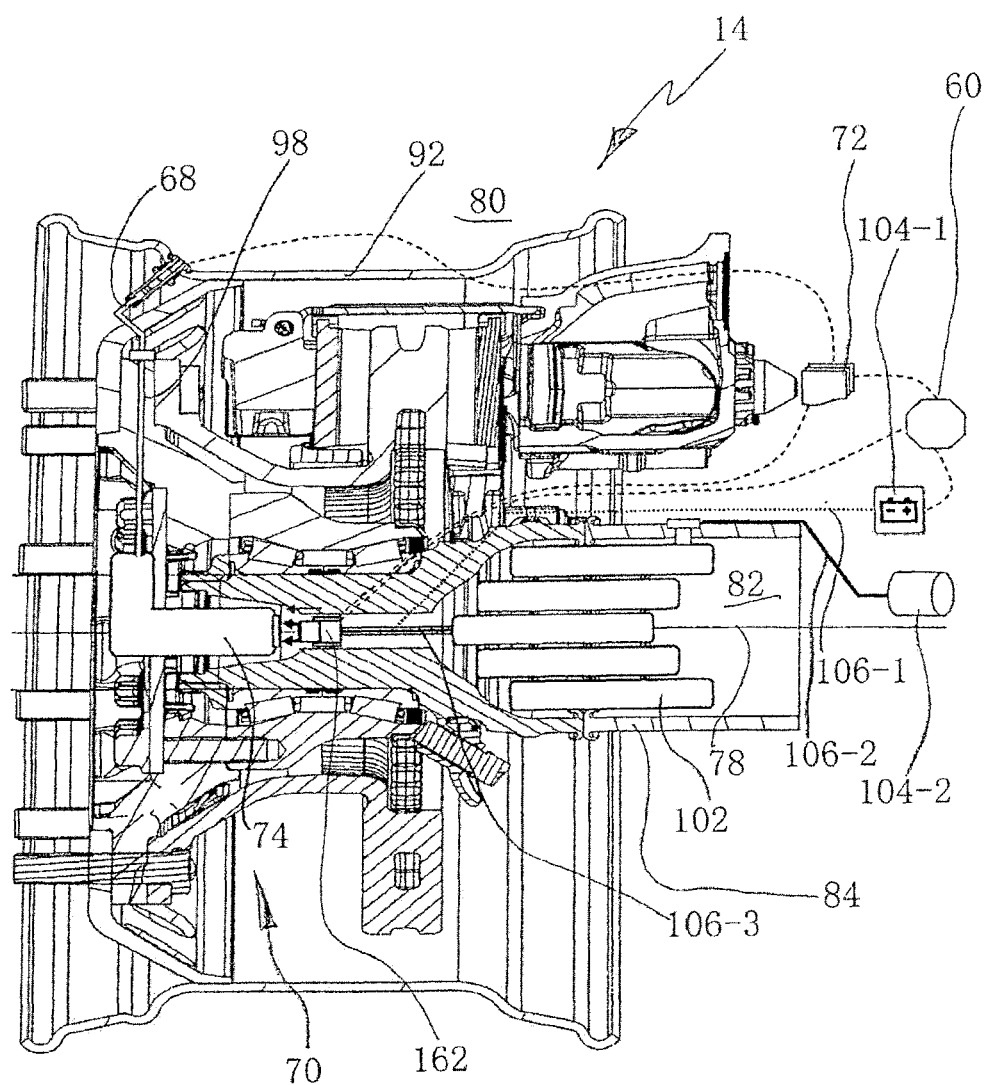
FIG. 23 is a sectional view of a wheel unit showing another embodiment of a pressurized medium supply device.

FIG. 23 shows another embodiment of a pressurized medium supply device 70. The compressor unit 74 of the pressurized medium supply device 70 is positioned on the wheel body side 80 and can be selectively contacted by means of an actuator 162. The compressor unit 74 has an L-shaped design. On the axle body 84 side, the compressor unit 74 is associated with a buffer unit 102, which for example has a plurality of battery cells. These are accommodated in the axle body 84. In addition, the compressor unit 74 can be connected via energy supply paths 106-1, 106-2 to energy supply units 104-1, 104-2. The energy supply unit 104-1 can, for example, be a battery mounted in the vehicle. The energy supply unit 104-2 can, for example, be an alternator mounted in the vehicle. The buffer unit 102 can be selectively connected to the compressor unit 74 via an energy supply path 106-3.

Figure 24A:
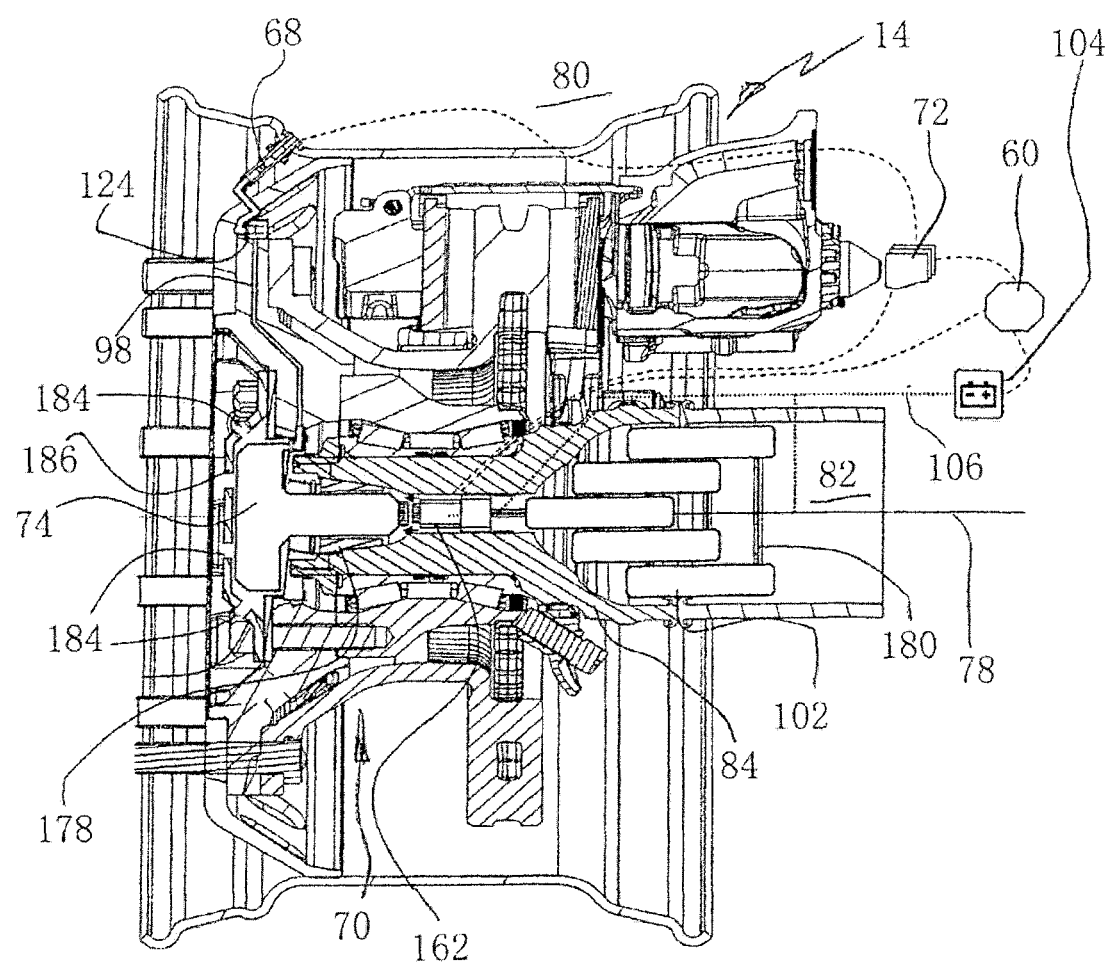
FIG. 24A is a sectional view of a wheel unit showing another embodiment of a pressurized medium supply device.
Figure 24B:
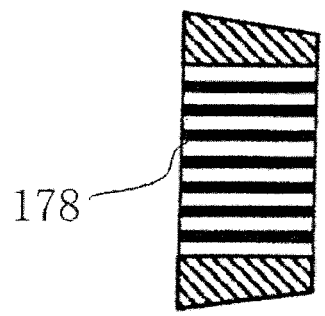
FIGS. 24B and 24C show a lateral section (FIG. 24B) and an axial section (FIG. 24C) through the compressor unit according to the embodiment shown in FIG. 24A.
Figure 24C:
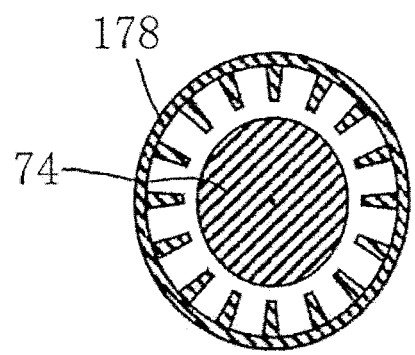

FIG. 24A shows another embodiment of a pressurized medium supply device 70. With regard to its fundamental design, it is embodied as approximately similar to the embodiment according to FIG. 23. The compressor unit 74 is concentrically embodied and positioned. The compressor unit 74 can be selectively coupled by means of an actuator 162 when there is a need for regulation. In addition, a cap 186 is provided on the outside of the wheel body side 80 and has a plurality of recesses 184. The cap 186 with the recesses 184 can provide cooling air openings for the compressor unit 74. The axle body 84 has a conical indentation at its end oriented toward the compressor unit 74. A cooling element 178 can be positioned there, which is affixed to the support side in order to cool the (rotating) compressor unit 74. FIG. 24B shows a lateral section through the cooling element 178. FIG. 24C shows an axial section through the cooling element 178 and compressor unit 74. The embodiment according to FIG. 24A also has a coupling valve 124, as described above.

Figure 25:
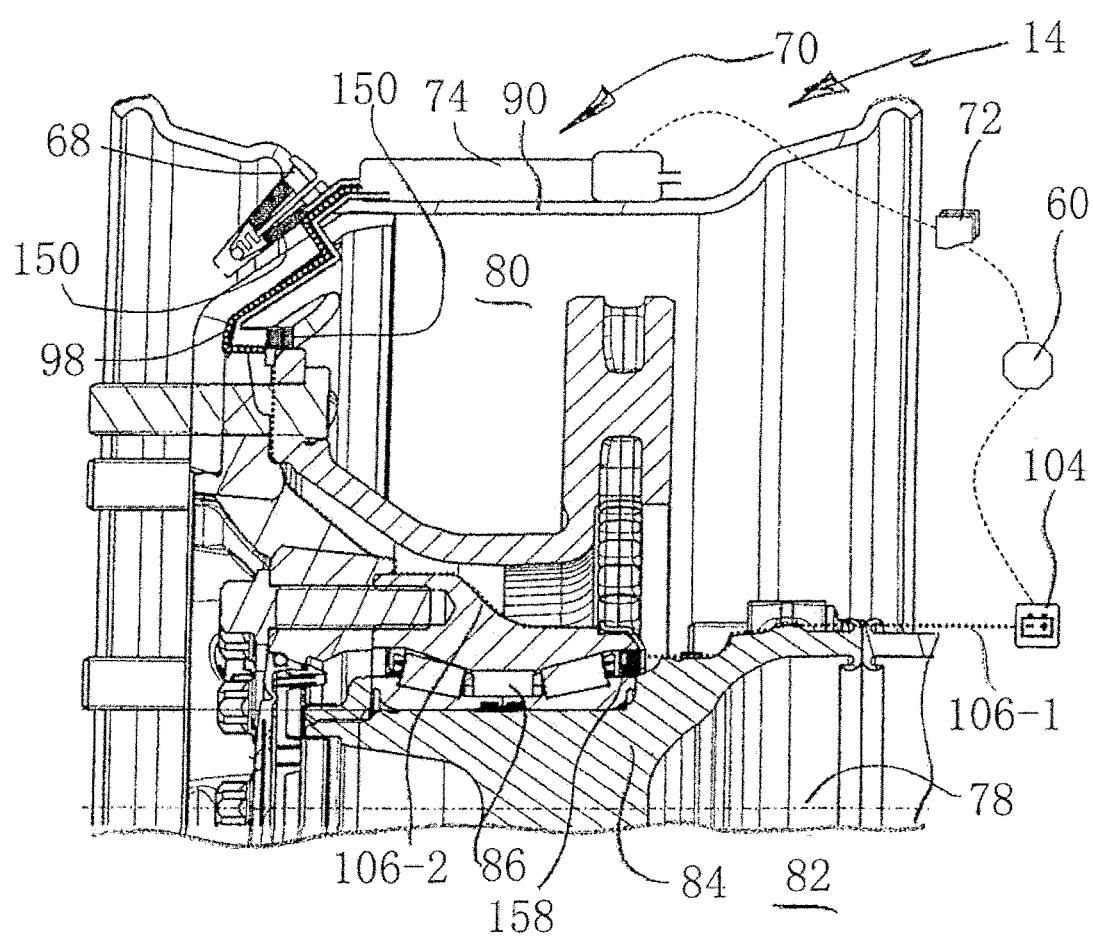
FIG. 25 is a sectional view of a wheel unit showing another embodiment of a pressurized medium supply device.

FIG. 25 shows another embodiment of a pressurized medium supply device 70 in which the compressor unit 74 is affixed to the rim body 92, i.e. "in" the tire 16. As a result, the pressurized medium path 98 can in particular be used for aspirating air, also see the suction unit labeled with the reference numeral 150, which can additionally be used to supply cooling air. A required energy supply path is represented by the sections 106-1 and 106-2 in FIG. 25. The rotary/stationary transition 158 can be provided at the wheel bearing 86 between the support side 82 and the wheel body side 80. The compressor unit 74 can basically be provided in parallel with the valve 68.

Figure 26:
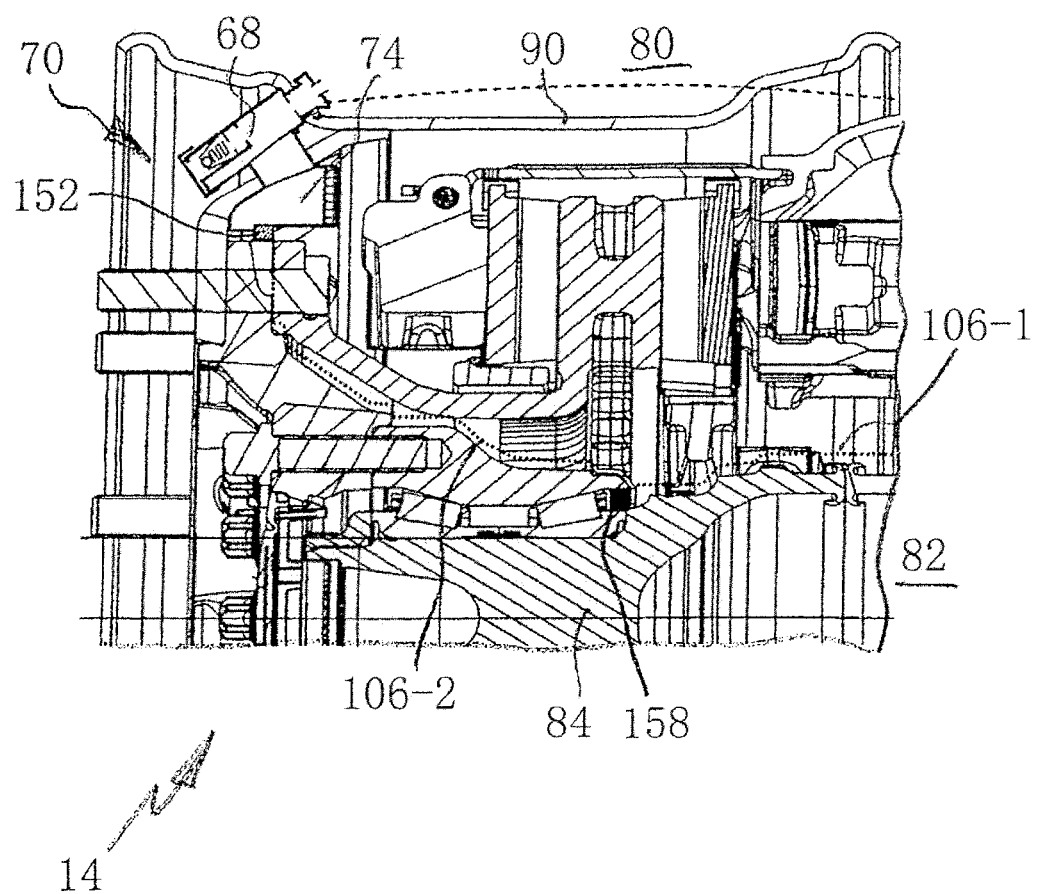
FIG. 26 is a sectional view of a wheel unit showing another embodiment of a pressurized medium supply device.

FIG. 26 shows another alternative embodiment of a pressurized medium supply device 70, which is basically embodied approximately according to FIG. 25. The compressor unit 74 in this case, however, is not positioned directly "in" the tire 16, but rather "outside" the tire 16 on the rim body 92 in the vicinity of the valve 68. Together, the compressor unit 74 and valve 68 can form a unit. This makes it possible to further shorten the pressurized medium path 98 required for aspirating air. The corresponding contact (see the energy supply path 106-1, 106-2) by means of a ring contact 152 can essentially be produced in the above-described way.

Figure 27A:
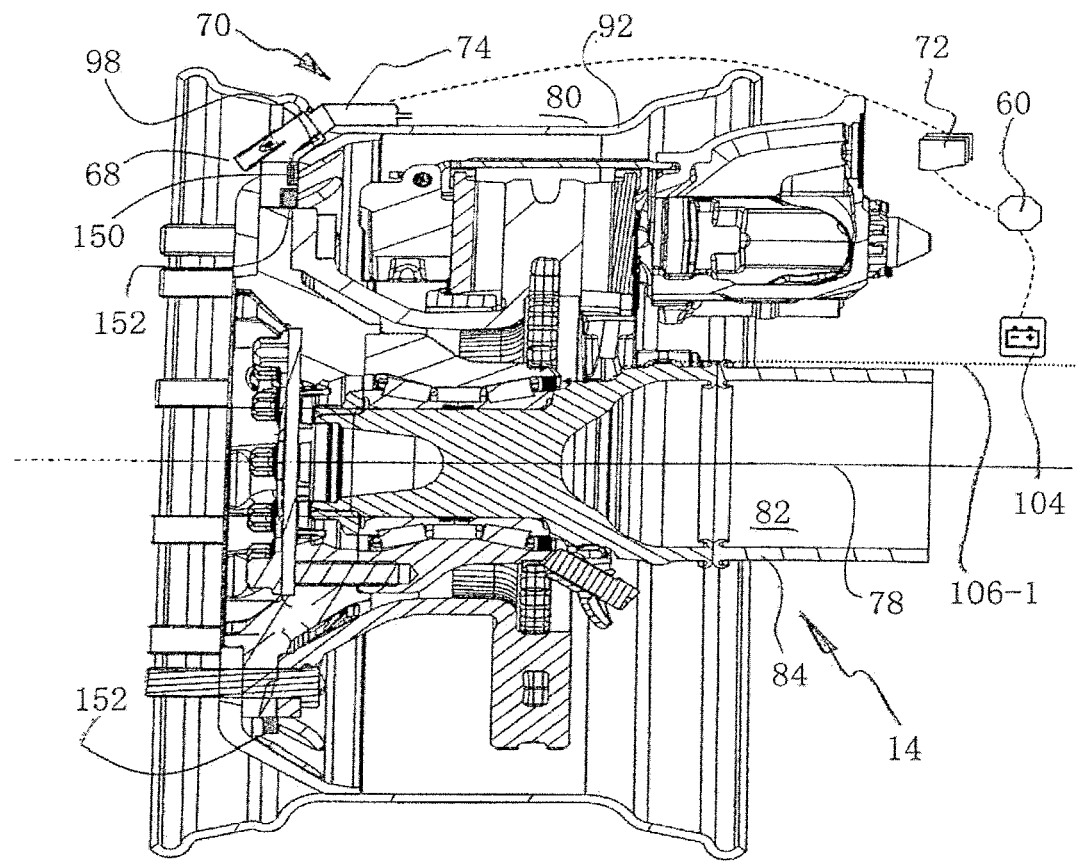
FIG. 27A is a sectional view of a wheel unit showing another embodiment of a pressurized medium supply device.
Figure 27B:
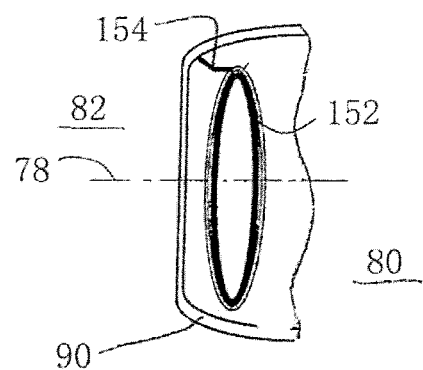
FIG. 27B is a schematic partial view of a slip ring contact, which can be used in the pressurized medium supply device according to FIG. 27A.

FIG. 27A shows another alternative embodiment of a pressurized medium supply device 70. Similarly to the embodiment according to FIG. 25, the compressor unit 74 is positioned on the rim body 92 "in" the tire 16. A contacting can be produced in a known way by means of a ring contact 152, also see FIG. 27B. A contact element 154 embodied on the rim body 92 can contact the ring contact 152.

Figure 28A:
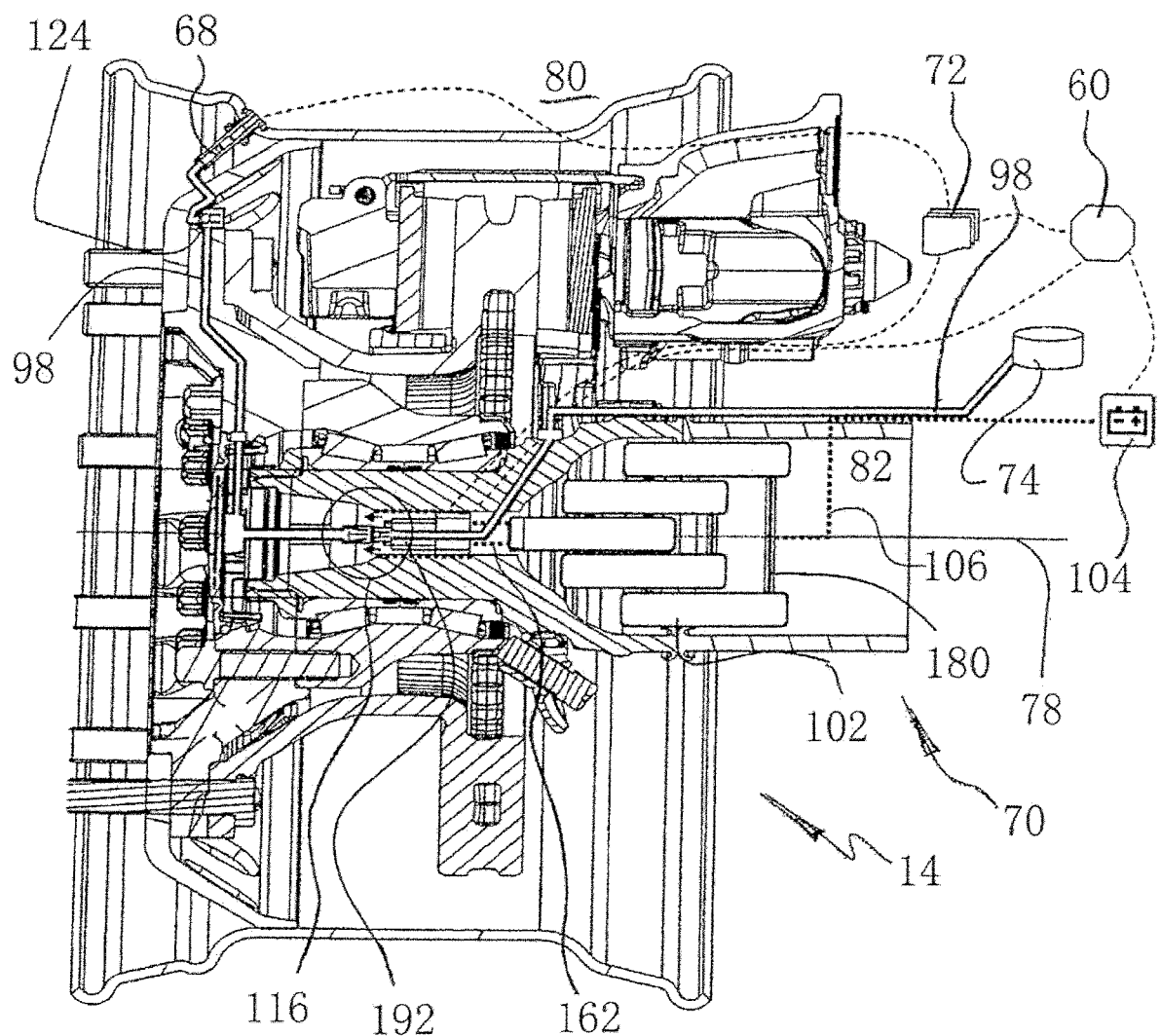
FIG. 28A is a sectional view of a wheel unit showing another embodiment of a pressurized medium supply device.
Figure 28B:
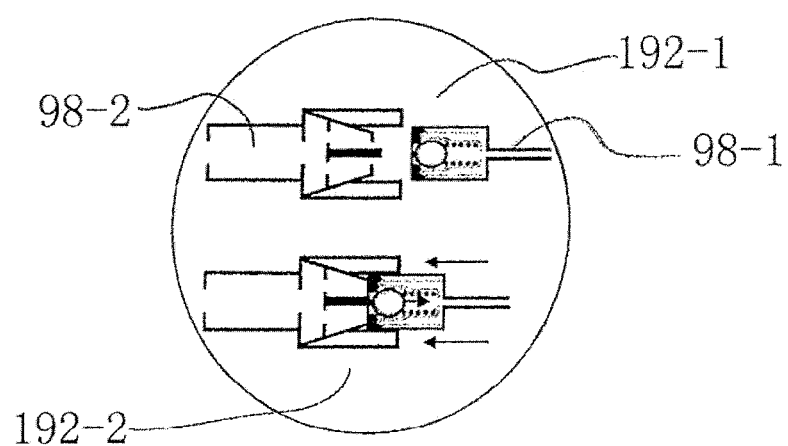
FIG. 28B shows highly simplified views of a pressure-controlled valve that can be used in the pressurized medium supply device according to FIG. 28A, in a closed position and an open position.

FIG. 28A shows another embodiment of a pressurized medium supply device 70. The embodiment according to FIG. 28A has a rotary/stationary transition 116 in the pressurized medium path 98. A pressure-controlled valve 192 is provided for selectively coupling or connecting the pressurized medium path 98, also see FIG. 28B. A switching position labeled with the reference numeral 192-1 in FIG. 28B shows a disconnected state. A depiction labeled with the reference numeral 192-2 in FIG. 28a shows a connected state. The activation of the valve 192 can take place by means of the pressure that contacts it.

Figure 29A:
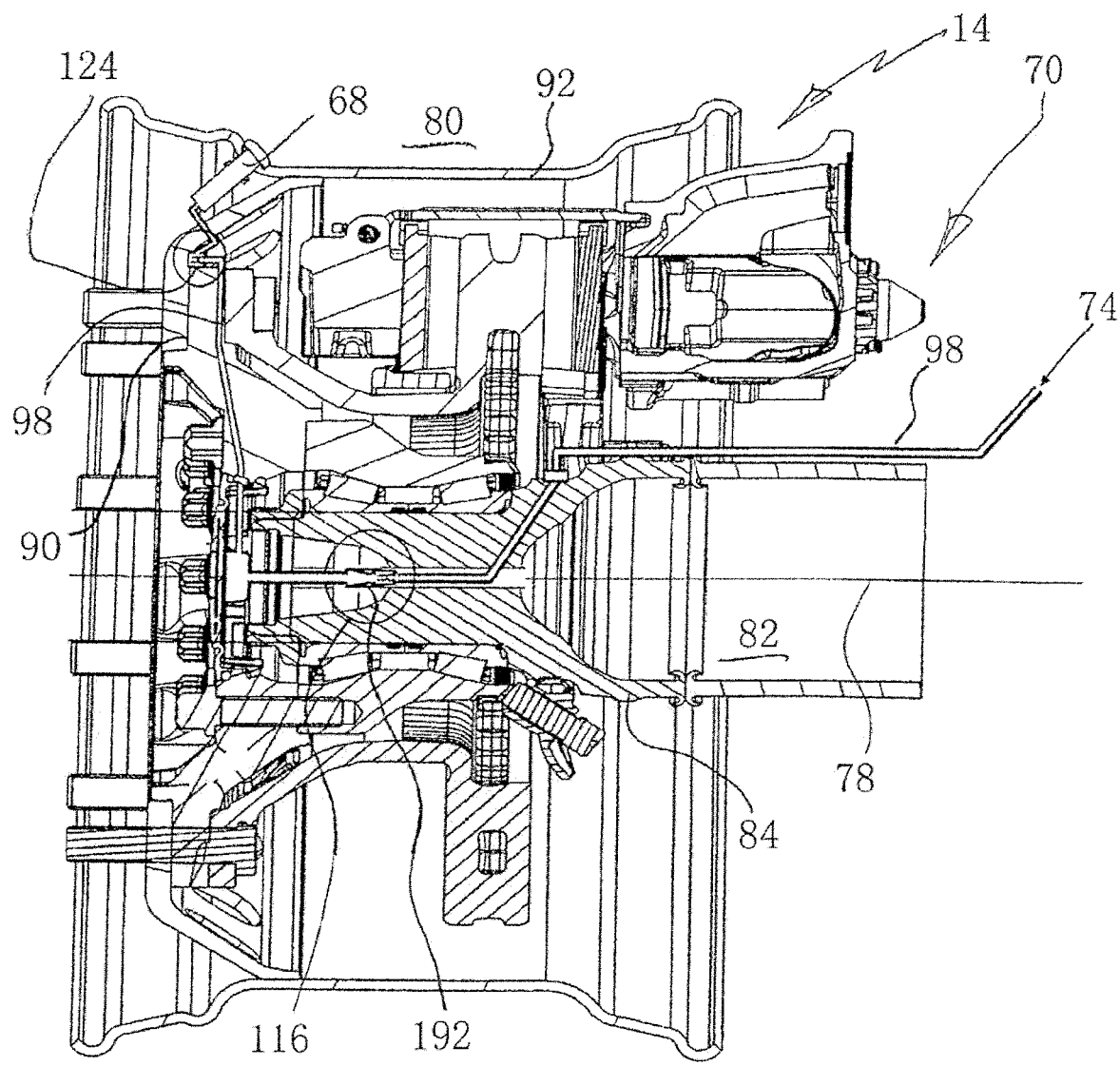
FIG. 29A is a sectional view of a wheel unit showing another embodiment of a pressurized medium supply device.
Figure 29B:
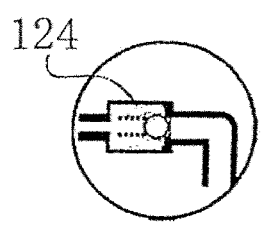
FIGS. 29B and 29C are highly simplified schematic views of a coupling valve (FIG. 29B) and a pressure-controlled valve (FIG. 29C), which can be used in the pressurized medium supply device according to FIG. 29A.
Figure 29C:
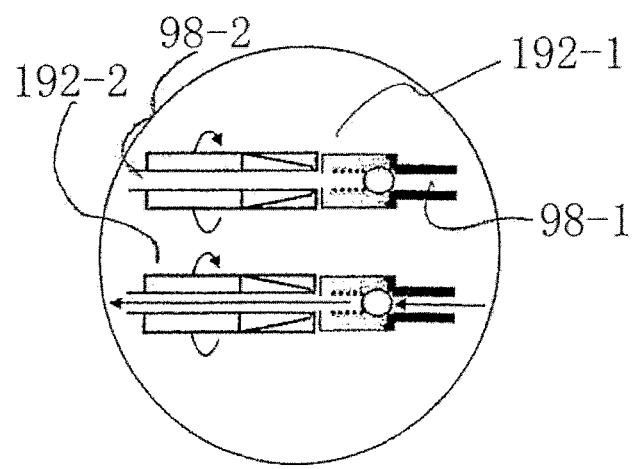

FIG. 29A shows another embodiment of a pressurized medium supply device 70. A pressure-controlled valve 192 is provided in the embodiment according to FIG. 29A as well, also see FIG. 29C. An open position is labeled with the reference numeral 192-1. A closed position is labeled with the reference numeral 192-2. FIG. 29B also shows a schematic section through an exemplary coupling valve 124, which can facilitate an installation, removal of the rim body 92 on the wheel mount 90.

An exemplary embodiment of a piston compressor 200 is explained with reference to FIGS. 30 and 31. Usually, piston compressors 200 have at least one combination composed of a piston and a corresponding cylinder 204, which are matched to each other. With regard to their basic configuration, piston compressors 200 can be at least similar in embodied to known internal combustion engines. As a result, it is naturally conceivable for there to also be multi-piston compressors 200, which have, for example, two, three, or four corresponding piston/cylinder combinations. It is also conceivable for the piston/cylinder combinations to be arranged in a line, in a V shape, in a star pattern, or the like. The piston compressor 200, which is shown in a highly simplified schematic fashion in FIG. 30 merely for illustration purposes, has for example two pistons 202-1 and 202-2, which are arranged in a line. The pistons 202 are each connected by means of a connecting rod 206 to a drive shaft 208, which can for example be embodied in a form similar to a crankshaft. A rotational movement (arrow 210) of the drive shaft 208 produces a longitudinal oscillatory movement (arrow 212) of the pistons 202-1 and 202-2 in their cylinders 204. The drive shaft 208 has corresponding offset sections so that the pistons 202-1 and 202-2 are accommodated on it in eccentric fashion.

As a result, the pistons 202-1 and 202-2 can move up and down in their cylinders 204. A movement direction when the pistons 202 are moving in the direction toward the drive shaft 208 can be referred to as an intake movement or intake stroke. The movement in the opposite direction, in which the pistons 202-1 and 202-2 are moving away from the drive shaft 208, can be referred to as the compression movement or compression stroke. During the intake movement, the pistons 202 can take in a fluid, in particular air, via an inlet 218. To this end, it is possible, for example, to provide an intake valve 214, which (from the point of view of the piston 202) is open when the piston 202 is producing a vacuum in the cylinder 204. When the piston 202 is moved in the opposite direction, the aspirated air or aspirated fluid is then compressed. In this way, the pressurized fluid, in particular compressed air, can be supplied to an outlet 220. For this purpose, corresponding exhaust valves 216 can be provided, which (from the point of view of the piston 202) can be opened when a corresponding excess pressure is present.

The movement between the piston 202 and the cylinder 204 or cylinder walls is usually subject to wear. To reduce frictional forces, a defined play is usually provided in the piston/cylinder combination. In order to produce a sufficiently good seal, a sealing device 222 is frequently also provided, which includes one or more piston rings, for example.

The piston 202 has a piston deck 226, which is oriented away from the drive shaft 208. On its side oriented away from the piston deck 226, the piston 202 also has a recess, which can also be generally referred to as the piston pocket 230. A circumference wall of the piston surrounding the piston pocket 230 is generally also referred to as the piston skirt 232. In this region, the piston also has through holes or through bores 228, which serve to accommodate a piston pin (not shown in FIG. 31). The piston pin usually serves to couple the piston 202 to an eye of the corresponding connecting rod 206, which in the connected state, is situated in the pocket 230 of the piston 202.

Figure 30:
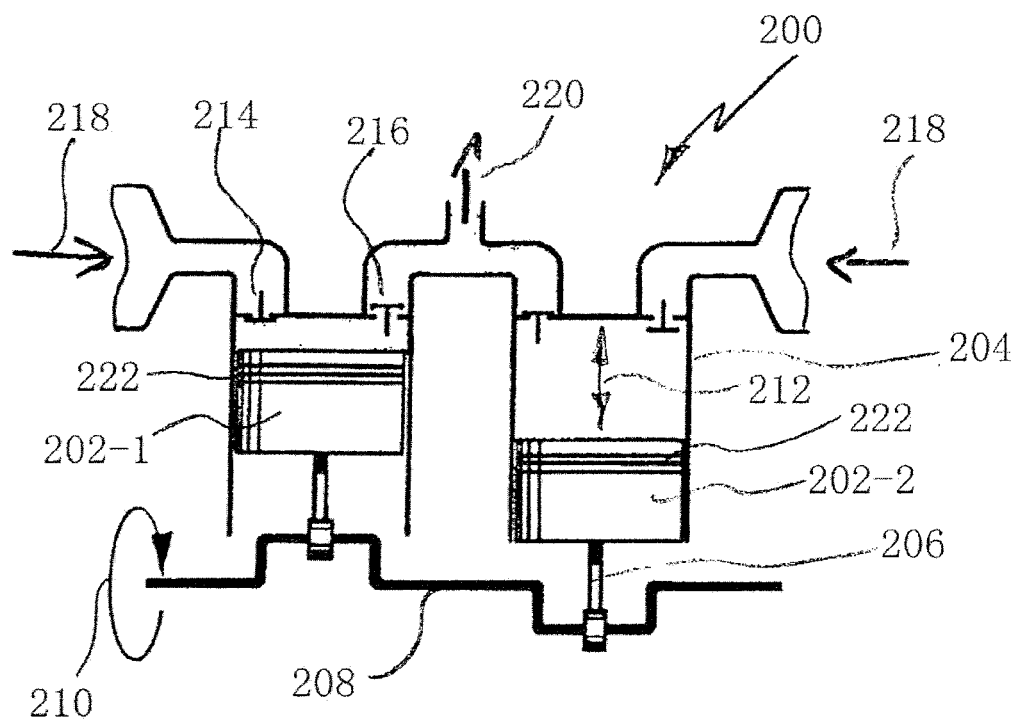
FIG. 30 is a highly simplified schematic representation of a piston compressor.
Figure 31:
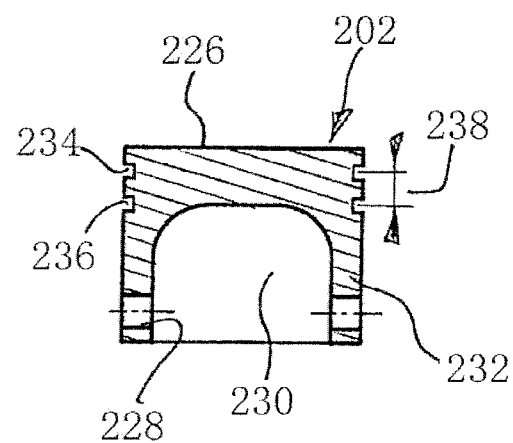
FIG. 31 is a lateral section through a piston, which is suitable for use in a piston compressor.

FIG. 31 shows a lateral section through a piston 202, which can be used, for example, in the piston compressor 200 according to FIG. 30. For example, the piston 202 has two grooves 234, 236, which can be embodied in the form of annular grooves. The grooves 234, 236 are spaced apart by a distance 238, which is relatively small. Each of the grooves 234, 236 can accommodate a piston ring. As a result, the piston 202 shown by way of example in FIG. 31 has two piston rings in the installed operating state.

Figure 32:
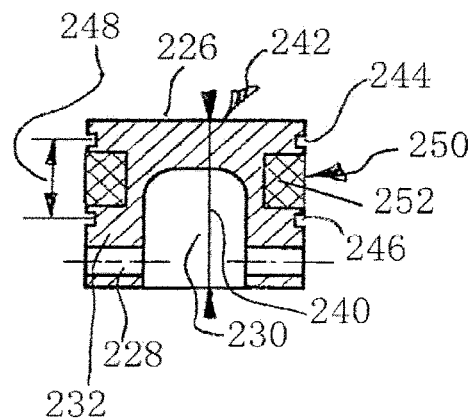
FIG. 32 is a lateral section through a piston for a piston compressor, which is embodied in accordance with various principles of the present disclosure.

FIG. 32 shows an advantageous modification of a piston, which is labeled with the reference numeral 242. The pistons 202, 242 are embodied as at least similar to each other in their basic design. The piston 242 thus has a piston deck 226, corresponding bores 228 for a piston pin, and a piston skirt 232, which encloses a piston pocket 230.

The piston 242 also has, for example, two grooves or annular grooves 244, 246, which are embodied for accommodating piston rings. The annular grooves 244, 246 are spaced apart from each other by a distance 248, which is significantly greater than the distance 238 on the piston 202 that is shown in FIG. 31. For example, the distance 248 between the annular grooves 244, 246 can be at least 30%, preferably at least 40%, even more preferably at least 50% of an overall length 240 of the piston skirt 232. The sections 238, 240 can each correspond to a distance between the centers of the respective annular grooves 234, 236 and 244, 246. The overall length 240 of the piston 242 or piston skirt 232 corresponds approximately to the length of the piston 242 shown in a lateral section in FIG. 32, which can potentially come to rest against a corresponding cylinder wall.

Advantageously, the piston 242 is also provided with a recess 250, in particular a circumferential recess, which serves to accommodate a lubricant depot 252. The lubricant depot 252 can be composed of a lubricant or can include a lubricant carrier that is impregnated or wetted with a lubricant. Since the distance 248 between the annular grooves 244, 246 is chosen to be sufficiently large, it is possible to accommodate a lubricant depot 252 with a substantial length in the recess 240. In this way, a sufficiently large quantity of lubricant can be integrated directly into the piston 242. This makes it possible to provide an integrated lubricant supply.

By contrast with the embodiment of the piston 242 shown in FIG. 32, it would also be potentially conceivable to dispense with the annular grooves 244, 246 in the piston 242 and to embody the lubricant depot 252 itself as the sealing element for producing a seal between an outer wall of the piston 242 and the corresponding cylinder 204. This would also be conceivable, for example, if the lubricant depot 252 or a support material for a lubricant in the lubricant depot 252 were to be embodied as at least partially elastic or deformable. In this way, the lubricant depot 252 can be "overdimensioned" in comparison to a diameter of the cylinder 204 and can thus be guided in the cylinder 204 with a slight prestressing. It is thus possible on the one hand to produce a good seal, which permits higher pressures to be produced. On the other hand, it is possible to minimize the wear between the piston 242 and the cylinder 204.

Figure 33A:
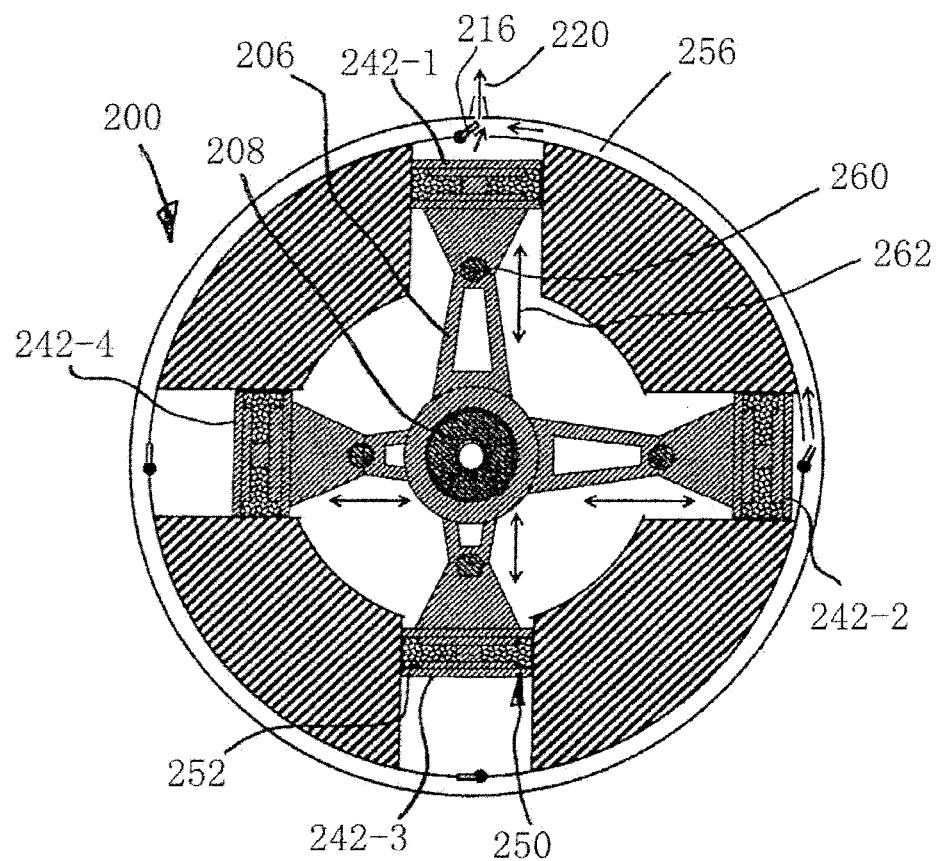
FIG. 33A is a highly simplified schematic sectional depiction of a compressor, which includes, for example, four piston/cylinder combinations arranged in a star pattern.
Figure 33B:
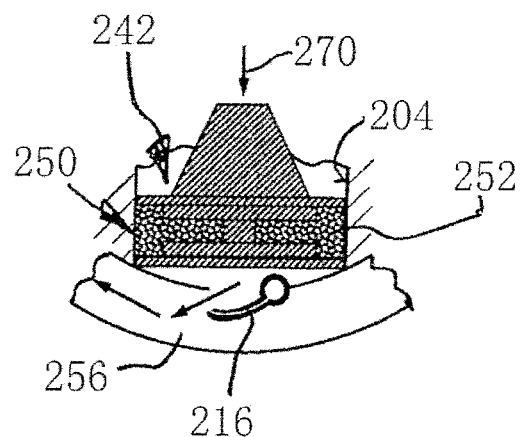
FIGS. 33B and 33C are enlarged partial depictions of the compressor according to FIG. 33A showing the functionality of the compressing procedure FIGS. 34A-34E each show a schematic, highly simplified sectional depiction of one embodiment of a valve arrangement, which is associated with a pressurized medium path.

An exemplary embodiment of another form of a piston compressor is particularly shown in FIGS. 33, 33a, and 33b. FIGS. 33, 33a, and 33b are schematic diagrams that depict the piston compressor in a schematic, highly simplified fashion. For example, the piston compressor 200 is a compressor that includes four—or an integral multiple of four—piston/cylinder combinations. In FIG. 33A, there are a total of four pistons 242-1, 242-2, 242-3, and 242-4 and corresponding cylinders 204 arranged in a star pattern. Naturally, the pistons 242-1, 242-2, 242-3, and 242-4 do not necessarily have to be positioned in one and the same plane (from the point of view of the observer in FIG. 33A). Instead, they can be positioned offset from one another perpendicular to the plane of projection in FIG. 33A.

In a basically known way, the pistons 242 are each accommodated eccentrically on a shaft 208 by means of a respective connecting rod 206 (not shown in detail in FIG. 33A). A respective piston pin 260 is provided for the coupling between the piston 242 and the connecting rods 206. A double arrow labeled with the reference numeral 262 shows the longitudinal oscillatory movement of the piston 242-1, which can be produced by corresponding rotations of the drive shaft 208. As a result, each of the pistons 242-1, 242-2, 242-3, and 242-4 can execute corresponding intake movements and compression movements. Each of the pistons 242-1, 242-2, 242-3, and 242-4 can also be coupled to corresponding valves 214 and 216 (see FIG. 30), with only the exhaust valves 216 being explicitly shown by way of example in FIG. 33A. The exhaust valves 216 can, for example, be embodied as flap valves or pivot valves, in particular see FIGS. 33a and 33b. During an intake movement of the piston 242 (see reference numeral 272 in FIG. 33C), the corresponding exhaust valve 216 closed. As a result, during the intake movement, a corresponding intake valve 214 can be open, but this is not explicitly shown in FIGS. 33, 33a, and 33b. A compression movement in the opposite direction from the intake movement 272 is indicated in FIG. 33B by an arrow labeled with the reference numeral 270.

As a result, a compressed fluid, in particular compressed air, can be displaced through the exhaust valve 216 into a conduit or flow conduit 256. The compressed air or compressed fluid can exit the compressor 200 via an outlet 220. The pistons 242-1, 242-2, 242-3, and 242-4 shown in FIG. 33A can be positioned offset from one another or angularly offset from one another, thus making it possible to produce staggered intake- and compression procedures during a rotation of the drive shaft 208. It is thus possible to avoid excessively powerful pressure fluctuations at the outlet 220. Similar to the embodiment of the piston 242 shown in FIG. 32, the piston 242 according to FIGS. 33A, 33B, and 33C also has a recess 250, which is provided to accommodate a lubricant depot 252 in a circumference of the piston 242. In this way, an integrated lubricant supply can also be achieved in the embodiments of the piston 242 according to FIGS. 33, 33a, and 33b. In the extreme case, a sliding surface 242, i.e. the part of the piston circumference that can usually come into contact with the wall of the cylinder 204, can be reduced to a few disc-shaped sections 280, 282 between which the lubricant depot 252 extends. As a result, the lubricant depot can have a height 284 that can constitute at least 50%, more preferably at least 70%, and even more preferably at least 80% of an effective height 240 of the sliding surface.

Figure 33C:
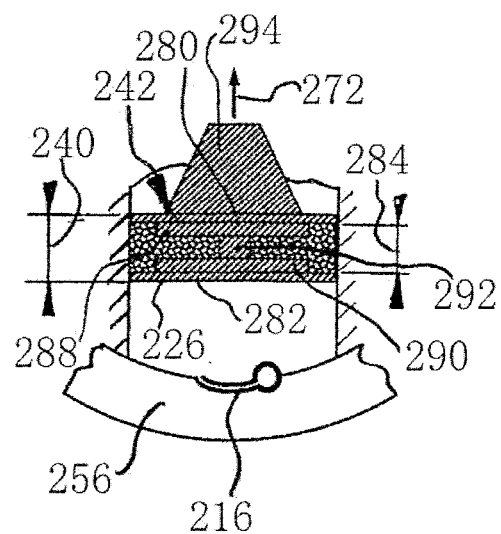
Figure 34A:
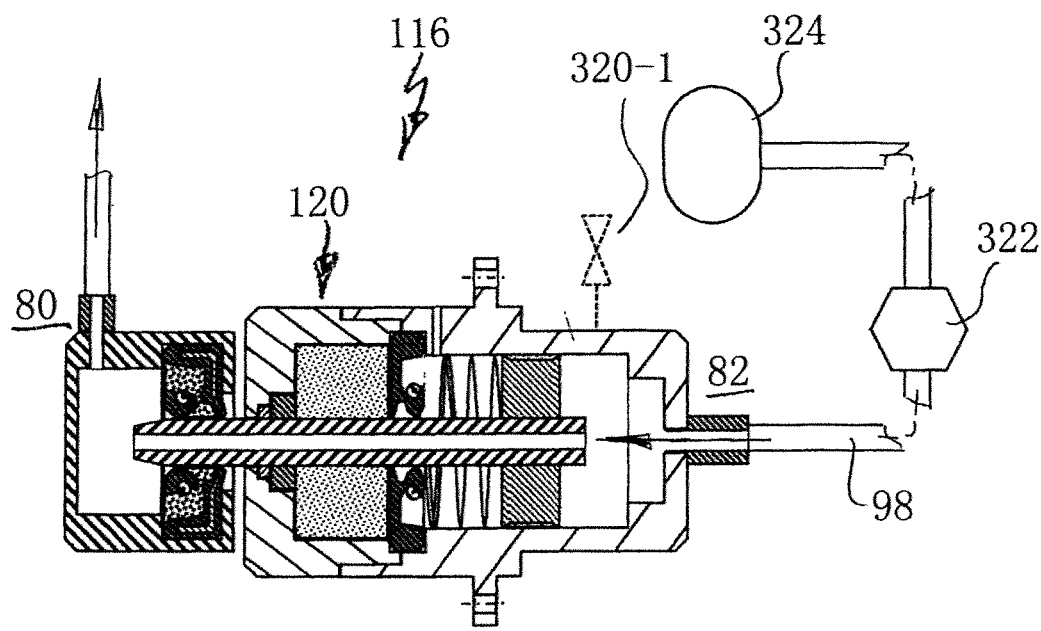
Figure 34B:
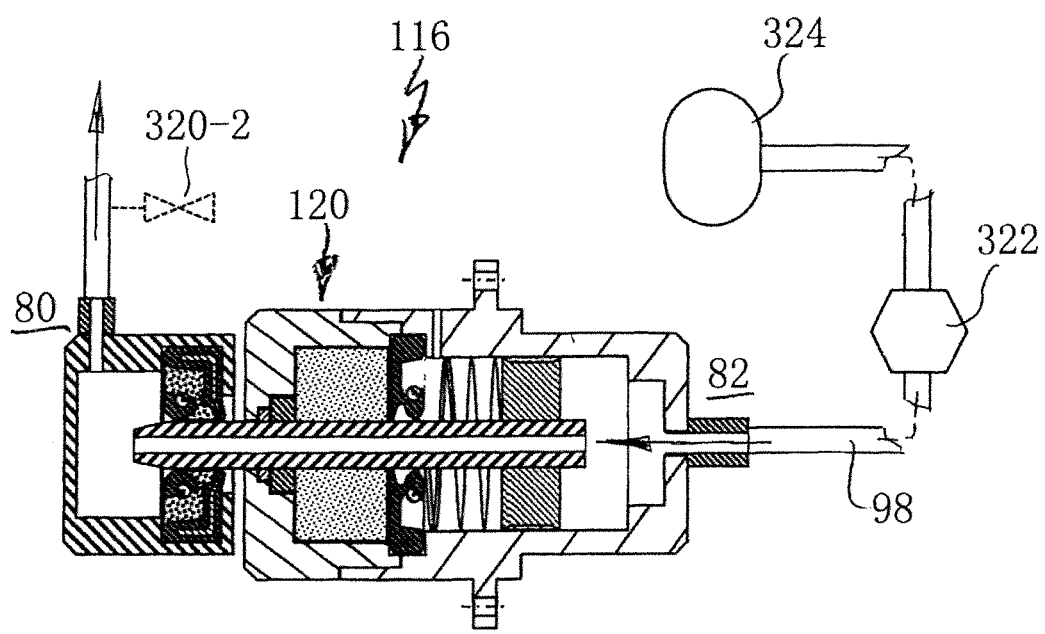
Figure 34C:
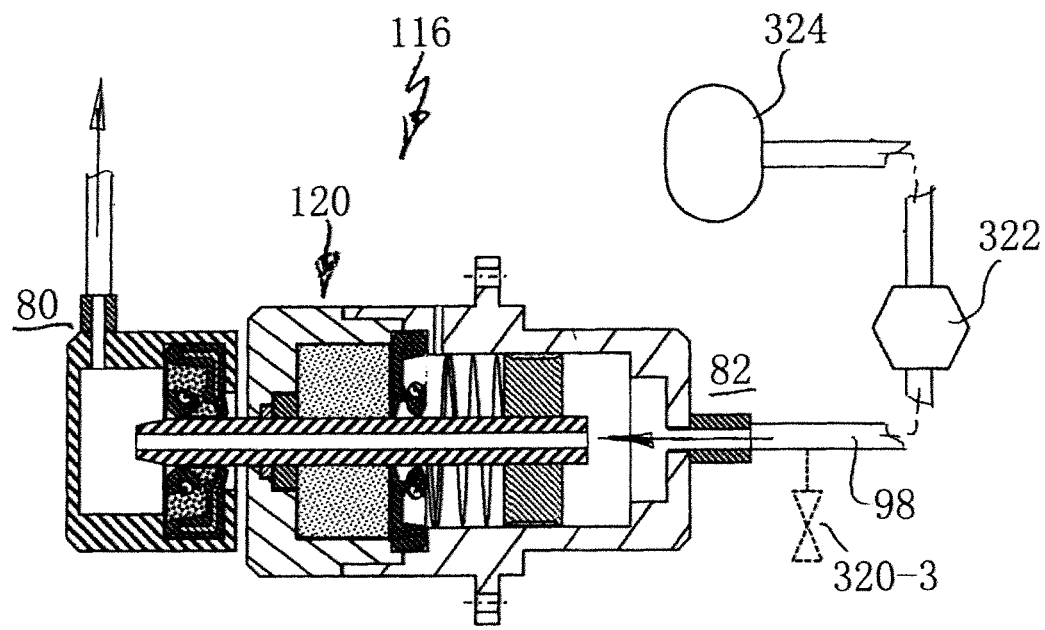
Figure 34D:
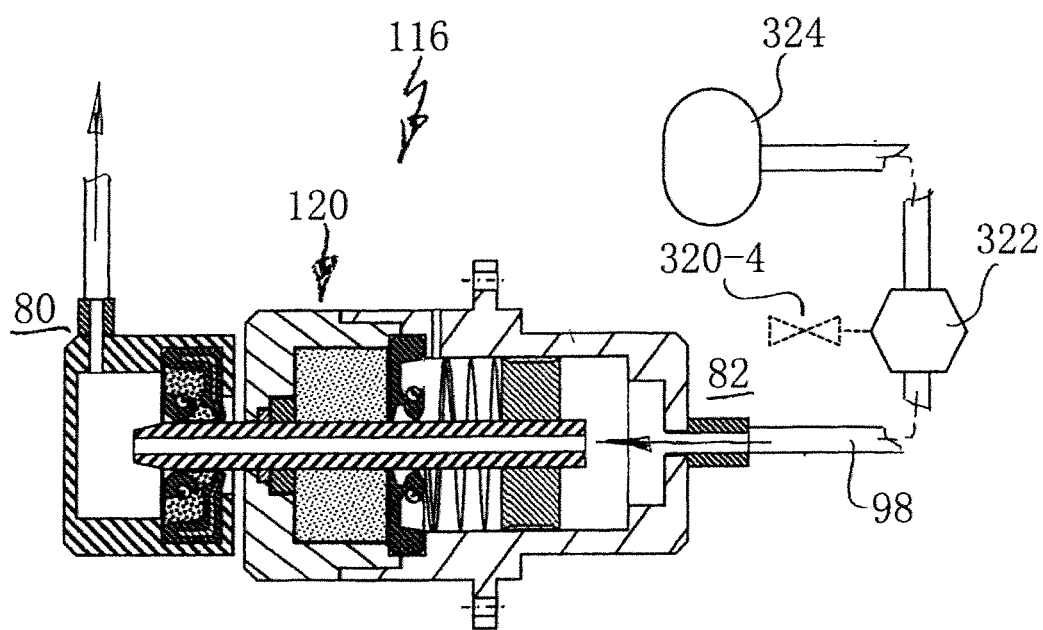

FIGS. 33A, 33B, and 33C also show that the piston can be embodied as a so-called "assembled" piston 242. It would thus be conceivable for the piston 242 to be composed of a plurality of individual parts, for example a plurality of disc-shaped sections 280, 282 and plates 288, 290, which are connected to one another by means of a core 292. At its end oriented away from the piston deck 226, the piston 242 can also be provided with a support 294 that is used to couple to the piston pin 260 and the connecting rod 206.

Each of FIGS. 34A-34E is a schematic, highly simplified sectional view of an embodiment of a rotary/stationary transition 116 in a pressurized medium path 98. The rotary/stationary transition 116 routes the pressurized medium path 98 from a support side 82 to a wheel body side 80. The rotary/stationary transition 116 can also be referred to as a rotary feed-through. The rotary/stationary transition 116 has a coupling valve 120, which has a valve piston that can be moved between a retracted position and an extended position in order to produce the pressurized medium path 98 from the support side 82 to the wheel body side 80.

Pressurized medium can flow through the coupling valve 120 from the support side 82 to the wheel body side 80. The pressurized medium can be supplied, for example, by a pressure reservoir 324 or a pressure generator (compressor). The pressurized medium can flow through a distributor block 322, which can control individual wheels, for example. It is advantageous to position at least one pressure-reducing opening 320 in the pressurized medium path 98. The pressure-reducing opening 320 facilitates the function of the coupling valve 120, in particular a restoring of the valve piston. For this purpose, a definite leakage or a definite volumetric flow loss is provoked. It is thus possible to reduce the pressure in the pressurized medium path 98, even if the tire is being inflated and it would actually be necessary for a higher pressure to prevail in the pressurized medium path 98. The pressure-reducing opening 320 can be embodied in, and connected to, different positions in the pressurized medium path, see reference numerals 320-1 in FIG. 34A, 320-2 in FIG. 34B, 320-3 in FIG. 34C, 320-4 in FIG. 34D, and 320-5 in FIG. 34E, which describe alternative positions.

FIGS. 35A through 35D show exemplary embodiments of such pressure-reducing openings 320, which are provided with blocking elements 328, 330. A flow direction is labeled with the reference numeral 326 in FIGS. 35a through 35d. The pressure-reducing openings 320 according to FIGS. 35A and 35B are provided with blocking elements 328 in the form of check valves. As a result, the pressurized medium basically can only flow through the pressure-reducing openings 320 in one direction. As an example, FIG. 35A shows a ball seat valve with a closing ball. As another example, FIG. 35B shows a flap valve with a closing flap.

FIGS. 35C and 35D show a sleeve-like or diaphragm-like blocking element 330 in a closed position (FIG. 35C) and in an open position (FIG. 35d). Naturally, the embodiment according to FIGS. 35C and 35D also permits a directional flow. The embodiment of the pressure-reducing openings 320 according to FIGS. 35A through 35D permits the desired pressure decrease and at the same time, prevents dirt from getting into the pressurized medium path 98.

Figure 36A:
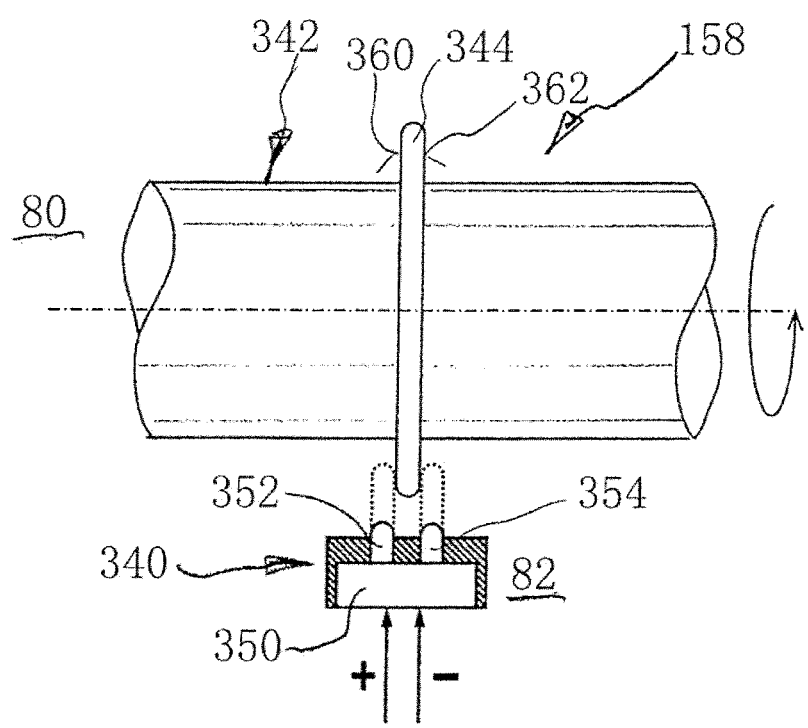
FIGS. 36A-36C are schematic, highly simplified side views of sample embodiments of a rotary/stationary transition for an energy supply path of a pressurized medium supply device.
Figure 36B:
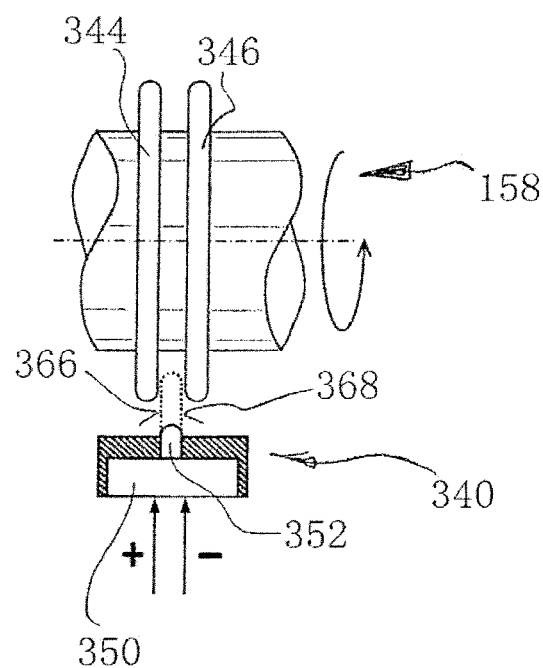
Figure 36C:
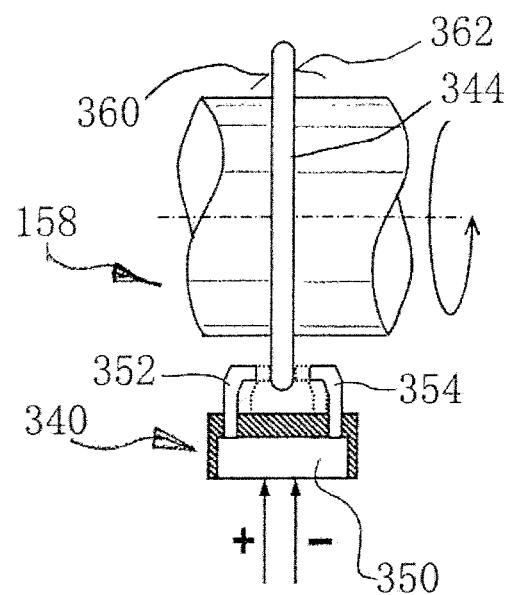

FIGS. 36A, 36B, and 36C show embodiments of rotary/stationary transitions 158 for an energy supply path 106 of a pressurized medium supply device 70. Basically, it is conceivable to use sliding contacts for this purpose. The rotary/stationary transitions 158 are each associated with a contacting unit 340, which is accommodated on the support side 82. For example, a rotor 342 is accommodated on the wheel body side 80. The rotor 342 has one or more respective contact sections 344, 346, which are in particular embodied as disc-shaped and extend radially out from the rotor 342.

The contacting unit 340 preferably has an actuator 350, which is embodied, for example, as solenoid actuator, an electromotive actuator, or the like. At least one contact body 352, 354 can be accommodated on the actuator 350 and cooperates with the at least one contact section 344, 346 in a suitable fashion in order to transmit energy, for example to drive a compressor for supplying pressurized medium. The actuator 350 can move the at least one contact body 352, 354 between a non-contact position and a contact position.

In FIG. 36A, a contact section 344 is provided on which two contact surfaces 360, 362 are embodied, which constitute a plus contact and a minus contact, for example. The contact section 344 can be contacted by the contact bodies 352, 354 of the actuator 350 and contacting unit 340, respectively. In an extended position, the contact bodies 352, 354 can embrace the contact section 344 between themselves in order to deliberately contact the contact surfaces 360, 362.

In FIG. 36B, a contact body 352 is provided on which two contact surfaces 366, 368 are embodied, which constitute a plus contact and a minus contact, for example. In an extended position, the contact body 352 can contact two contact sections 344, 346 in order to transmit electrical energy. In FIGS. 36A and 36B, the movement of the at least one contact body 352, 354 occurs radially relative to the rotor. In FIG. 36C, the actuator 350 is embodied to move or pivot the contact bodies 352, 354 axially so that they axially contact the contact section 344 on the opposing contact surfaces 360, 362.

In FIGS. 36A through 36C, the extended positions of the contact bodies 352, 354 are each indicated with dashed lines. It is advantageous if no separate control lines for the actuator 350 are provided. In other words, the actuator 350 can be activated or actuated by supplying power to the energy supply path 106.

Figure 37A:
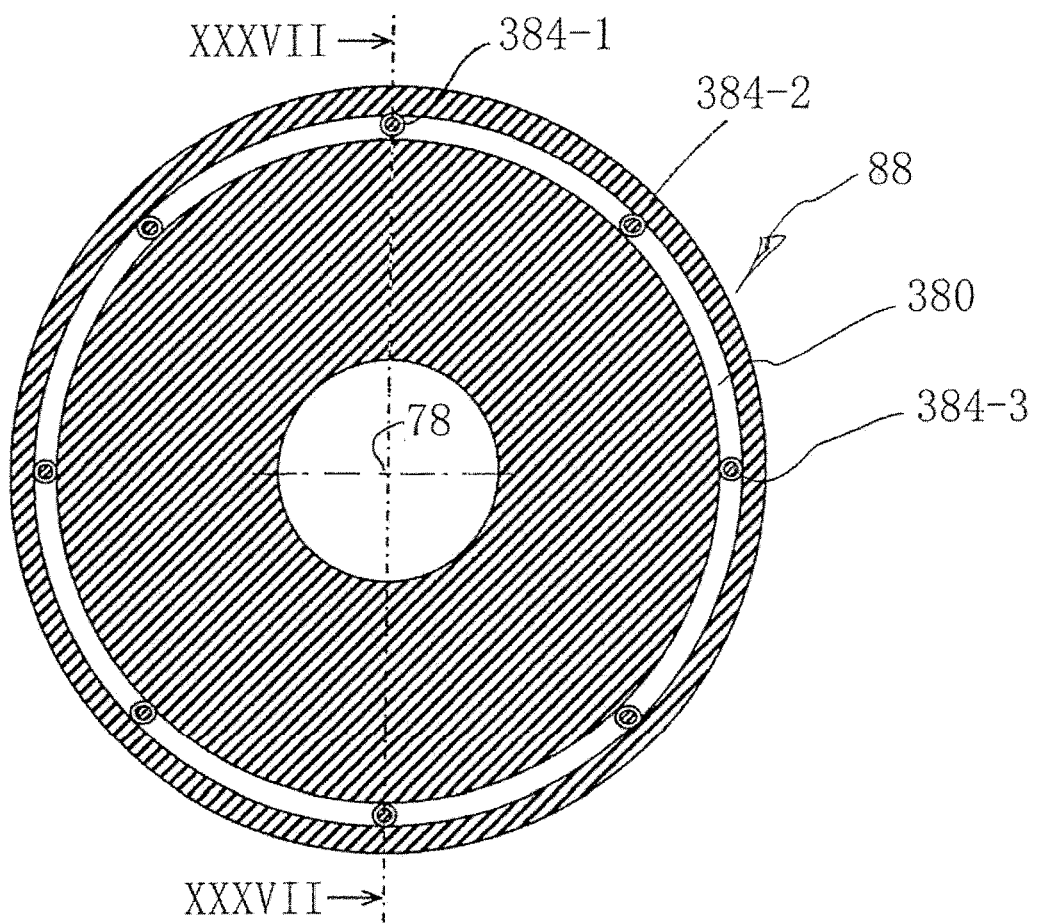
FIG. 37A is a schematic, highly simplified front sectional view of an embodiment of a hub body that is provided with an annular conduit and is for a pressurized medium supply device.
Figure 37B:
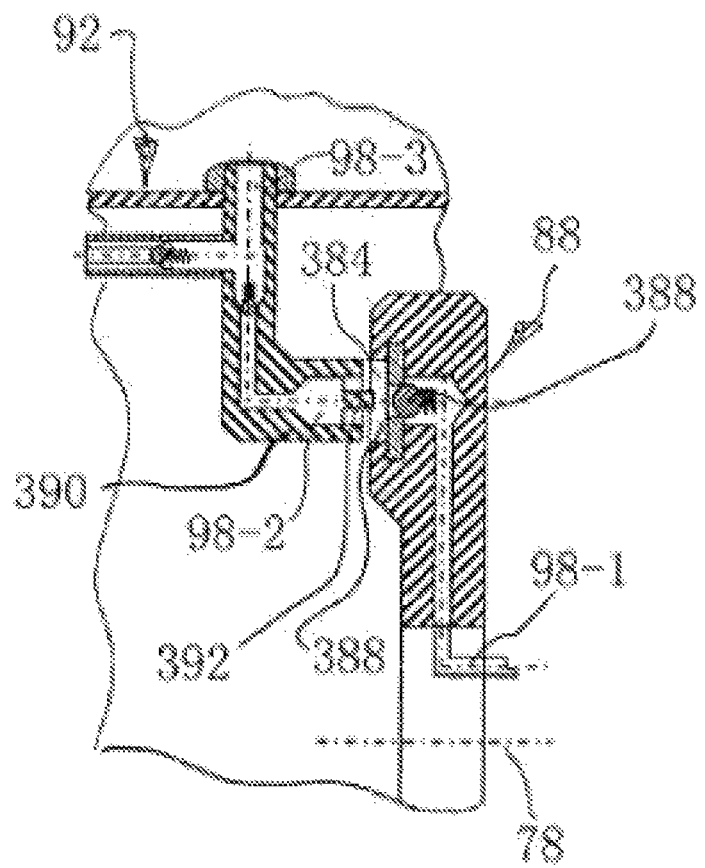
FIGS. 37B and 37C are schematic, highly simplified lateral, partially sectional views along the line XXXVII-XXXVII in FIG. 37A, showing cross-sectional design.
Figure 37C:
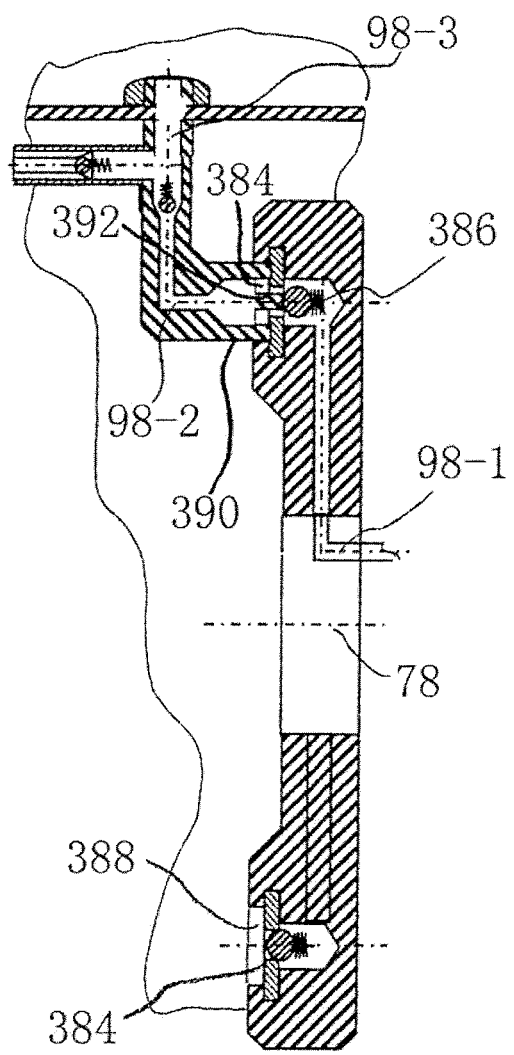
Figure 38:
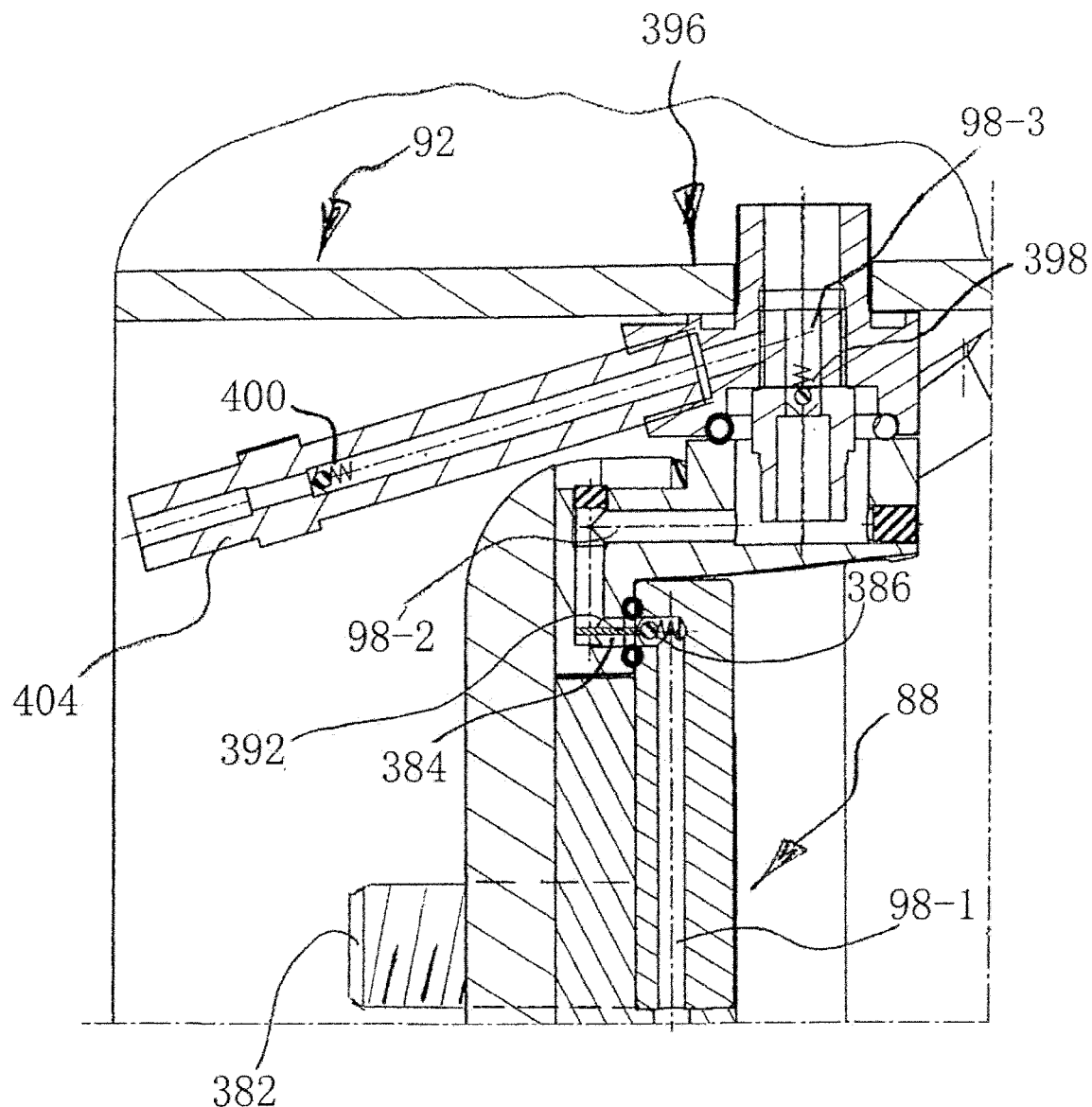
FIG. 38 is a laterally sectional partial depiction of a pressurized medium supply device with a hub body and a wheel body, which engage with each other in order to form a pressurized medium path.

FIG. 37A shows a schematic, highly simplified front sectional view of an embodiment of a hub body 88, provided with an annular conduit 380, for a pressurized medium supply device 70. FIGS. 37B and 37C show corresponding lateral sections through a device according to FIG. 37A. FIG. 38 shows a partial depiction of a section through an alternative embodiment of a pressurized medium supply device 70. In FIG. 38, a lug bolt or lug screw with which the rim body 92 can be mounted on the hub body 88 is labeled with the reference numeral 382. This usually takes place in certain preferred orientations. The annular conduit 380 makes it possible to match the pressurized medium supply device 70 to these preferred orientations, particularly to relative rotational orientations between the rim body 92 and the hub body 88.

In the annular conduit 380, there are a plurality of connections 384-1, 384-2, and 384-3, which are preferably matched to the number and position of the lug bolts 382. The connections 384 preferably have blocking elements or reflux blocking elements 386, which close the respective connection whenever no rim body 92 is mounted. The connections 384 also have orientation aids or position-securing elements, for example recesses or sockets 388. If a wheel with the rim body 92 is then mounted, then a plug-like contact element 390 is embodied, which can engage in one of the connections 384. FIG. 37B shows an approach state in which a direct contact has not yet been produced. FIG. 37C shows a mounted state. FIG. 38 also shows a mounted state.

On the contact element 390, a pin or shaft 392 is provided, which is embodied to engage with a reflux blocking element 386 in the mounted state so that the affected connection 384 is opened. All of the other connections are still closed since none of the pins 392 are opening the corresponding reflux blocking elements 386.

It is clear from FIGS. 37B, 37C, and 38 that the pressurized medium supply device 70 once again permits a conventional inflation of the tire. For this purpose, a Y-like selective coupler 396 is provided, one leg of which is associated with the pressurized medium supply device 70 or fluid path 98 and the other leg of which is coupled to a conventional valve 404 for the external filling. Corresponding reflux blocking elements 398, 400 permit an activation or deactivation of the respective leg of the selective coupler 396 without additional complexity. This permits an emergency operation bypassing the pressurized medium supply device 70.

The invention claimed is:

1. A decentralized integrated pressurized medium supply device (70) for supplying compressed air, for a wheel unit (14) with a rotatably supported vehicle tire (16), comprising:
   a decentralized compressor unit (74) driven by an electric motor, and having a pressurized medium path (98) that extends between the decentralized compressor unit (74) and a rim body (92) supporting the vehicle tire (16), and the rim body coupled to a support of the wheel unit (14);
   an energy supply connection (126) of the decentralized compressor unit (74) connected to an energy supply unit (104) through an energy supply path (106);
   a pressurized medium supply device (70) at least partially associated with the support and with the wheel unit (14); and
   at least one of the pressurized medium path (98) or energy supply path (106) includes a rotary/stationary transition (116, 158) between the support and the rim body (92), wherein the rotary/stationary transition (158) is positioned in the energy supply path (106), and the compressor unit (74) is at least partially affixed to the wheel unit.

2. The pressurized medium supply device (70) according to claim 1, wherein the compressor unit (74) includes a compressor and a motor (118) integrated into a common housing.

3. The pressurized medium supply device (70) according to claim 1, wherein the rotary/stationary transition (158) in the energy supply path (106) includes at least one slip ring contact.

4. The pressurized medium supply device (70) according to claim 1, wherein the rotary/stationary transition (158) for the energy supply path (106) comprises a selectively activatable contacting unit (340), adapted to be moved between a contact position and a non-contact position in order, in the contact position, to contact at least one annular or a disc-shaped contact section (344, 346); and the at least one contacting unit (340) in combination with the support while the at least one contact section (344, 346) in combination with the wheel unit.

5. The pressurized medium supply device (70) according to claim 4, wherein the at least one contacting unit (340) includes an actuator (350), adapted to be activated when the contacting unit (340) is supplied with power, wherein the activation of the actuator (350) occurs through the supply of power to the energy supply path (106).

6. The pressurized medium supply device (70) according to claim 4, wherein two contact sections (344, 346) are provided on the wheel unit, which are spaced axially apart from each other and constitute opposing poles and the contacting unit (340) includes a contact body (352) that has a corresponding opposing poles and can be radially inserted into an intermediate space between and in contact with the contact sections (344, 346).

7. The pressurized medium supply device (70) according to claim 4, wherein a contact section (344) is provided on the wheel unit and is provided with contact surfaces (360, 362) that are spaced apart from each other and that constitute opposite poles; and the contacting unit (340) includes two contact bodies (352, 354) that are spaced apart from each other and that constitute the poles in combination with the contact surfaces (360, 362); and the contact bodies (352, 354) are adapted to be moved radially or axially toward the contact section (344, 346) on opposing sides to contact the contact surfaces (360, 362).

8. The pressurized medium supply device (70) according to claim 1, wherein the rotary/stationary transition (158) in the energy supply path (106) comprises a crossover for contactless energy transmission.

9. The pressurized medium supply device (70) according to claim 8, wherein the rotary/stationary transition (158) in the energy supply path (106) is adapted to transmit electrical energy.

10. The pressurized medium supply device (70) according to claim 8, wherein the rotary/stationary transition (158) in the energy supply path (106) converts electrical energy into mechanical energy.

11. The pressurized medium supply device (70) according to claim 8, wherein the rotary/stationary transition (158) in the energy supply path (106) converts mechanical energy into fluidic energy.

12. The pressurized medium supply device (70) according to claim 1, wherein the compressor unit (74) is positioned coaxially relative to an axle (78) of the wheel unit (14).

13. The pressurized medium supply device (70) according to claim 1, wherein the compressor unit (74) is positioned off-center relative to an axle (78) of the wheel unit (14).

14. The pressurized medium supply device (70) according to claim 1, wherein the compressor unit (74) includes an additional interface (164) for supplying energy for an emergency supply connected to an external energy supply.

15. The pressurized medium supply device (70) according to claim 1, wherein a coupling valve (124) is provided in the pressurized medium path (98), which permits a disconnect of the pressurized medium path (98) between the hub body (88) and the rim body (92).

16. The pressurized medium supply device (70) according to claim 1, wherein an annular conduit (380) or an annular segment conduit constituting a section of the pressurized medium path (98) is embodied on the hub body (88) or on the rim body (92) and permits the rim body (92) to be mounted on the hub body (88) in a plurality of relative positions.

17. The pressurized medium supply device (70) according to claim 16, wherein the annular conduit (380) has a plurality of connections (384) that are adapted to a wheel lug arrangement in such a way that in a plurality of relative positions, a contact element (390) of the rim body (92) produces a contact with a respective one of the connections (384) and permits pressurized medium to be conveyed from the hub body (88) to the rim body (92).

18. The pressurized medium supply device (70) according to claim 17, wherein the annular conduit (380) has a plurality of reflux blocking elements (386), which close the pressurized medium path in a closed position and open the pressurized medium path in an open position, and in the mounted state, the contact element (390) of the rim body (92) acts on one of the connections (384) to switch its reflux blocking element (386) into the open position.

19. A compressor unit (72) for a pressurized medium supply device (70) according to claim 1, having a compressor (200) that has at least one piston (242), and a sliding surface of the piston (242) is provided with a recess (250) extending circumferentially and accommodating a lubricant cavity.

20. The compressor unit (72) according to claim 19, wherein in the installed state, the lubricant cavity directly contacts a wall of a cylinder (204).

21. The compressor unit (72) according to claim 19, wherein the recess (250) is positioned between a first groove (244) and a second groove (246) for piston rings and the grooves (244, 246) are spaced apart from each other by a distance (248) that constitutes at least 25% of an overall length (240) of the sliding surface of the piston (242).

22. The compressor unit (72) according to claim 19, wherein the recess (250) in the sliding surface of the piston (242) has a length (284) that constitutes at least 30% of an overall length (240) of the sliding surface of the piston (242).

23. A wheel unit (14) for a vehicle (10), which has an axle body (84) and a rim body (92) with a tire (16), wherein the rim body (92) is coupled to the axle body (84) and is supported on the axle body (84) in rotary fashion and the wheel unit (14) also has an integrated pressurized medium supply device (70) according to claim 1.

24. The wheel unit (14) according to claim 23, further comprising a pressure sensor (114) positioned on the wheel unit to monitor a fluid pressure in the tire (16), with the pressure sensor (114) transmitting a detected fluid pressure value to a tire pressure regulating unit (60).

25. A distributed system (54) for supplying compressed air in a vehicle (10) that has a plurality of wheel units (14) in pairs with at least one axle (12), and at least one of the wheel units (14) is provided with an integrated pressurized medium supply device (70) according to claim 1, wherein the system (54) has a tire pressure regulating unit (60) to selectively activate the compressor unit (74) of the respective pressurized medium supply device (70).

26. A decentralized integrated pressurized medium supply device (70) for supplying compressed air, for a wheel unit (14) with a rotatably supported vehicle tire (16), comprising:
 a decentralized compressor unit (74) driven by an electric motor, and having a pressurized medium path (98) that extends between the decentralized compressor unit (74) and a rim body (92) supporting the vehicle tire (16), and the rim body coupled to a support of the wheel unit (14);
 an energy supply connection (126) of the decentralized compressor unit (74) connected to an energy supply unit (104) through an energy supply path (106);
 a pressurized medium supply device (70) at least partially associated with the support and with the wheel unit (14); and
 a rotary/stationary transition (116, 158) between the support and the rim body (92) and positioned in the pressurized medium path (98), wherein the compressor unit (74) is mounted on the support and the rotary/stationary transition (116) is positioned eccentrically relative to an axle (78) connected to the wheel unit (14), wherein the rotary/stationary transition (116) is positioned in the pressurized medium path (98) and the compressor unit (74) is mounted on the support.

27. The pressurized medium supply device (70) according to claim 26, wherein the rotary/stationary transition (116) in the pressurized medium path (98) includes a fluidic rotary feed-through.

28. The pressurized medium supply device (70) according to claim 26, wherein the rotary/stationary transition (116) is configured to be switched between an activated state and a deactivated state and in the activated state a contact is produced between a stationary component and a rotatable component of the rotary/stationary transition (116).

29. The pressurized medium supply device (70) according to claim 26, wherein the rotary/stationary transition (116) is switched as a function of a corresponding pressure of the pressurized medium.

30. A decentralized integrated pressurized medium supply device (70) for supplying compressed air, for a wheel unit (14) with a rotatably supported vehicle tire (16), comprising:
- a decentralized compressor unit (74) driven by an electric motor, and having a pressurized medium path (98) that extends between the decentralized compressor unit (74) and a rim body (92) supporting the vehicle tire (16), and the rim body coupled to a support of the wheel unit (14);
- an energy supply connection (126) of the decentralized compressor unit (74) connected to an energy supply unit (104) through an energy supply path (106);
- a pressurized medium supply device (70) at least partially associated with the support and with the wheel unit (14); and
- at least one of the pressurized medium path (98) or energy supply path (106) includes a rotary/stationary transition (116, 158) between the support and the rim body (92); and
- an electrical energy buffer unit (102), positioned between the energy supply unit (104) and the compressor unit (74).

31. The pressurized medium supply device (70) according to claim 30, wherein the buffer unit (102) is positioned together with the compressor unit (74) on the wheel unit or the compressor unit (74) is positioned on the wheel unit and the buffer unit (102) is positioned on the support.

32. The pressurized medium supply device (70) according to claim 30, wherein the rotary/stationary transition (158) is positioned in the energy supply path (106), and the compressor unit (74) is at least partially affixed to the wheel unit.

33. A decentralized integrated pressurized medium supply device (70) for supplying compressed air, for a wheel unit (14) with a rotatably supported vehicle tire (16), comprising:
- a decentralized compressor unit (74) driven by an electric motor, and having a pressurized medium path (98) that extends between the decentralized compressor unit (74) and a rim body (92) supporting the vehicle tire (16), and the rim body coupled to a support of the wheel unit (14);
- an energy supply connection (126) of the decentralized compressor unit (74) connected to an energy supply unit (104) through an energy supply path (106);
- a pressurized medium supply device (70) at least partially associated with the support and with the wheel unit (14); and
- at least one of the pressurized medium path (98) or energy supply path (106) includes a rotary/stationary transition (116, 158) between the support and the rim body (92);
- wherein the compressor unit (74) is coupled to a reservoir (134) for tire sealant (136) as needed in order to act on the tire sealant with pressure and supplied along the pressurized medium path (98) to the wheel unit and at least one on/off valve (142) is provided to control the reservoir (134) as needed.

34. The pressurized medium supply device (70) according to claim 33, wherein the rotary/stationary transition (116) is positioned in the pressurized medium path (98) and the compressor unit (74) is mounted on the support.

35. The pressurized medium supply device (70) according to claim 34, wherein the rotary/stationary transition (116) is positioned coaxially relative to an axle (78) connected to the wheel unit (14).

36. The pressurized medium supply device (70) according to claim 1, A decentralized integrated pressurized medium supply device (70) for supplying compressed air, for a wheel unit (14) with a rotatably supported vehicle tire (16), comprising:
- a decentralized compressor unit (74) driven by an electric motor, and having a pressurized medium path (98) that extends between the decentralized compressor unit (74) and a rim body (92) supporting the vehicle tire (16), and the rim body coupled to a support of the wheel unit (14);
- an energy supply connection (126) of the decentralized compressor unit (74) connected to an energy supply unit (104) through an energy supply path (106);
- a pressurized medium supply device (70) at least partially associated with the support and with the wheel unit (14); and
- at least one of the pressurized medium path (98) or energy supply path (106) includes a rotary/stationary transition (116, 158) between the support and the rim body (92);
- wherein the compressor unit (74) includes an electrical machine (118) that can be operated as a motor or as a generator; the electrical machine (118) when operating as a generator, charges a buffer unit (102) and when operating as a motor, is supplied by the buffer unit (102) with energy for driving the compressor unit (74).

37. A decentralized integrated pressurized medium supply device (70) for supplying compressed air, for a wheel unit (14) with a rotatably supported vehicle tire (16), comprising:
- a decentralized compressor unit (74) driven by an electric motor, and having a pressurized medium path (98) that extends between the decentralized compressor unit (74) and a rim body (92) supporting the vehicle tire (16), and the rim body coupled to a support of the wheel unit (14);
- an energy supply connection (126) of the decentralized compressor unit (74) connected to an energy supply unit (104) through an energy supply path (106);
- a pressurized medium supply device (70) at least partially associated with the support and with the wheel unit (14); and
- at least one of the pressurized medium path (98) or energy supply path (106) includes a rotary/stationary transition (116, 158) between the support and the rim body (92);
- wherein a pressure-reducing opening (320) is provided in the pressurized medium path (98), which when pressurized, produces a defined leakage and, as a function of a pressure level in the pressurized medium path (98), can be driven between an open position in which a quantity of the pressurized medium is able to escape, and a closed position in which the pressurized medium path (98) is protected from external contamination.

38. The pressurized medium supply device (70) according to claim 37, wherein the pressure-reducing opening (320)

has a flow direction and a blocking direction, and is embodied as a diaphragm seal or has a sleeve-like design.

* * * * *